United States Patent
Poghosyan et al.

(10) Patent No.: US 10,241,887 B2
(45) Date of Patent: Mar. 26, 2019

(54) DATA-AGNOSTIC ANOMALY DETECTION

(71) Applicant: VMware, Inc., Palo Alto, CA (US)

(72) Inventors: Arnak Poghosyan, Yerevan (AM); Ashot Nshan Harutyunyan, Yerevan (AM); Naira Movses Grigoryan, Yerevan (AM); Mazda A. Marvasti, Irvine, CA (US)

(73) Assignee: VMware, Inc., Palo Alto, CA (US)

( * ) Notice: Subject to any disclaimer, the term of this patent is extended or adjusted under 35 U.S.C. 154(b) by 419 days.

(21) Appl. No.: 13/853,321

(22) Filed: Mar. 29, 2013

(65) Prior Publication Data

US 2014/0298098 A1 Oct. 2, 2014

(51) Int. Cl.

| | | |
|---|---|---|
| *G06F 11/00* | (2006.01) | |
| *G06F 11/34* | (2006.01) | |
| *G06F 17/18* | (2006.01) | |
| *G06F 11/07* | (2006.01) | |
| *G05B 23/02* | (2006.01) | |
| *G06K 9/00* | (2006.01) | |
| *G06K 9/62* | (2006.01) | |

(52) U.S. Cl.
CPC ...... *G06F 11/3452* (2013.01); *G05B 23/0235* (2013.01); *G06F 11/0706* (2013.01); *G06F 11/0751* (2013.01); *G06F 17/18* (2013.01); *G06K 9/00536* (2013.01); *G06K 9/6284* (2013.01)

(58) Field of Classification Search
CPC . G06F 15/78; G06F 13/22; G06F 7/22; G06F 11/0793; G06F 11/1032; G06F 11/104; G06F 11/3452; G06F 12/04; G06F 13/12; G06F 17/30595; G06F 2003/0691; G06F 3/0601; G06F 7/24; G06F 9/4812; G06F 11/0751; G06F 11/076
USPC ................. 714/26, 37, 47.2, 47.3
See application file for complete search history.

(56) References Cited

U.S. PATENT DOCUMENTS

| | | | | |
|---|---|---|---|---|
| 6,216,066 | B1* | 4/2001 | Goebel | G05B 23/0232 340/438 |
| 7,076,695 | B2* | 7/2006 | McGee | G06F 11/0709 702/179 |
| 7,467,067 | B2 | 12/2008 | Marvasti | |
| 7,707,285 | B2* | 4/2010 | Marvasti | 709/224 |
| 7,801,703 | B2 | 9/2010 | Marvasti | |
| 7,934,126 | B1* | 4/2011 | Bennett | G06F 11/079 714/26 |
| 8,060,342 | B2 | 11/2011 | Marvasti | |
| 8,078,913 | B2* | 12/2011 | Goldszmidt et al. | 714/26 |
| 8,171,033 | B2 | 5/2012 | Marvasti | |
| 8,457,928 | B2* | 6/2013 | Dang et al. | 702/186 |

(Continued)

*Primary Examiner* — Elmira Mehrmanesh

(57) ABSTRACT

This disclosure presents computational systems and methods for detecting anomalies in data output from any type of monitoring tool. The data is aggregated and sent to an alerting system for abnormality detection via comparison with normalcy bounds. The anomaly detection methods are performed by construction of normalcy bounds of the data based on the past behavior of the data output from the monitoring tool. The methods use data quality assurance and data categorization processes that allow choosing a correct procedure for determination of the normalcy bounds. The methods are completely data agnostic, and as a result, can also be used to detect abnormalities in time series data associated with any complex system.

36 Claims, 50 Drawing Sheets

(56) References Cited

U.S. PATENT DOCUMENTS

| | | | |
|---|---|---|---|
| 2005/0283680 A1* | 12/2005 | Kobayashi | G06F 11/3636 714/39 |
| 2008/0077687 A1* | 3/2008 | Marvasti | 709/224 |
| 2008/0103855 A1* | 5/2008 | Hernandez | G06Q 30/02 705/7.33 |
| 2008/0270071 A1* | 10/2008 | Marvasti et al. | 702/179 |
| 2010/0223499 A1* | 9/2010 | Panigrahy et al. | 714/19 |
| 2012/0041575 A1* | 2/2012 | Maeda | G05B 23/024 700/80 |
| 2013/0158917 A1* | 6/2013 | Uchida | G01R 31/3658 702/63 |
| 2013/0218909 A1* | 8/2013 | Chu et al. | 707/752 |
| 2014/0058705 A1* | 2/2014 | Brill | G06Q 10/063 702/183 |

\* cited by examiner $$\begin{pmatrix} a \\ b \\ c \\ d \\ e \\ f \\ g \end{pmatrix} \rightarrow \begin{pmatrix} a \\ a+b \\ a+b+c \\ a+b+c+d \\ a+b+c+d+e \\ a+b+c+d+e+f \\ a+b+c+d+e+f+g \end{pmatrix}$$

| A | B | C | D | E | F | G | H | I | J | K | L | M | N | O | P |
|---|---|---|---|---|---|---|---|---|---|---|---|---|---|---|---|
| 0 | 0 | 0 | 0 | 1 | 0 | 0 | 1 | 1 | 0 | 0 | 1 | 1 | 1 | 0 | 1 |
| T-cycle | | | | T-cycle | | | | T-cycle | | | | T-cycle | | | |

FIG. 16

| A, E, I, M | B, F, J, M | C, G, K, O | D, H, L, P |
|---|---|---|---|
| 1 | 0 | 0 | 1 |

←————————— T-cycle —————————→

FIG. 17

$$\begin{Vmatrix} 1-time\_unit \\ 2-time\_unit \\ 3-time\_unit \\ 4-time\_unit \\ \vdots \\ 11-time\_unit \\ 12-time\_unit \end{Vmatrix} = \begin{Vmatrix} 0\% \\ 8\% \\ 8\% \\ 6\% \\ \vdots \\ 7\% \\ 17\% \end{Vmatrix}$$

FIG. 18

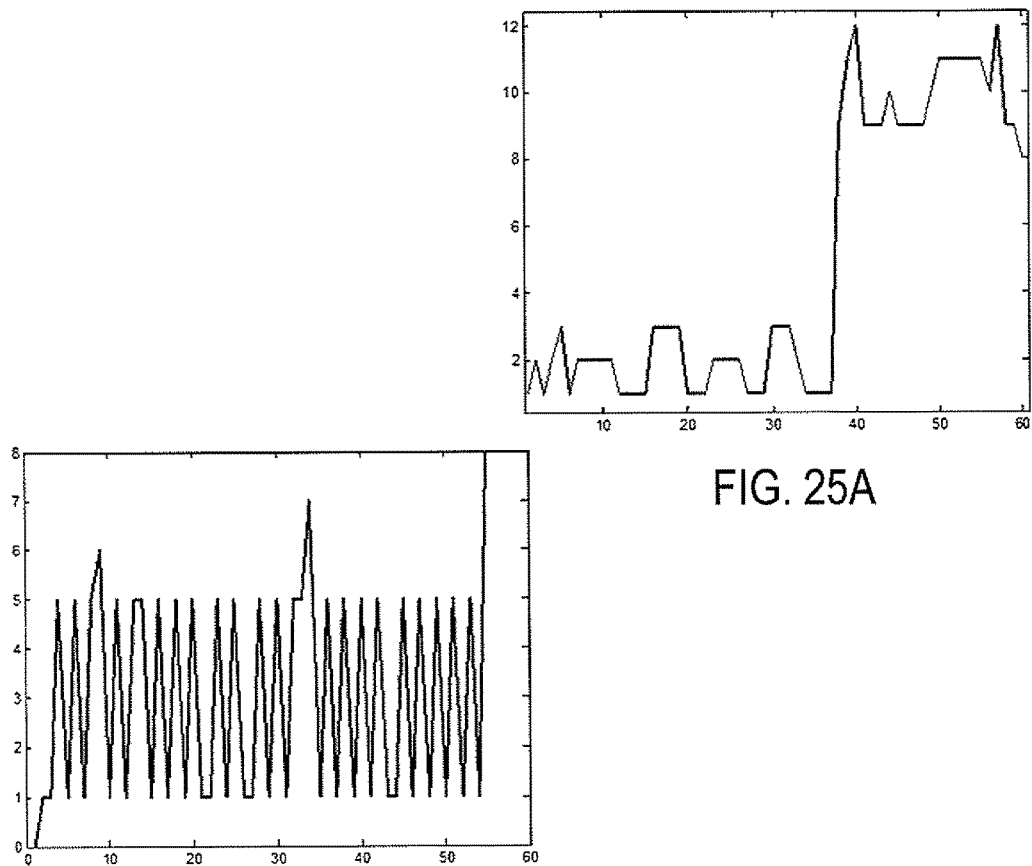
FIG. 25A
FIG. 25B
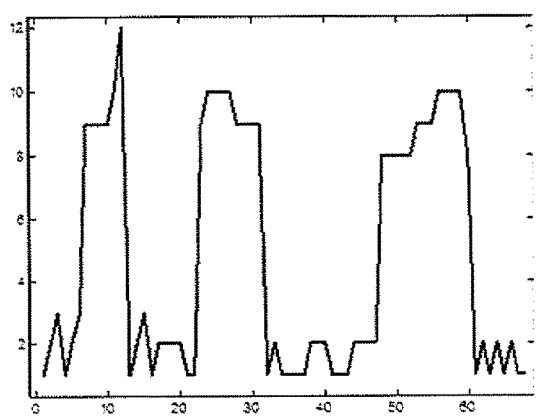
FIG. 25C

| $P_{CC}$ | 0 |
|---|---|
| $P_{BB}$ | 0.81967 |
| $P_{AA}$ | 0.88732 |

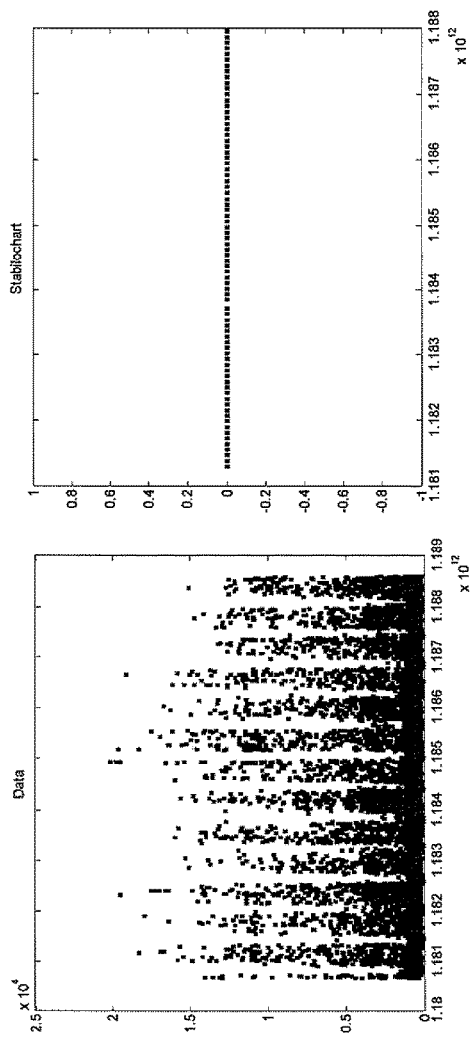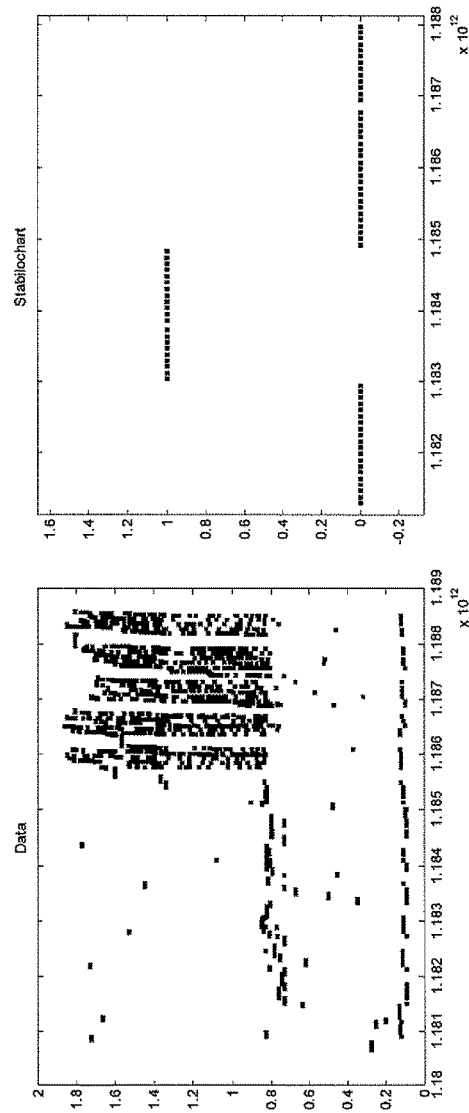
FIG. 39A
FIG. 39B

DATA-AGNOSTIC ANOMALY DETECTION

TECHNICAL FIELD

The present disclosure is directed to electronic data analyzing systems and, in particular, to computational methods and systems for detection of anomalies in data produced by any complex system.

BACKGROUND

With the advent of increased computing power and data storage, the development of computational tools to study ever increasingly complex systems in detail has increased. Examples of complex systems include weather systems, ecosystems, biological systems, and information technology systems. These computational tools enable vast amounts of information regarding a complex system to be collected, analyzed and presented for human understanding. Of particular importance to those who study these complex systems is the ability to identify variations, such as abnormalities, that occur within the complex system. For instance, in the case of an information technology infrastructure, variations from normal or expected operation could lead to failures, slowdown, threshold violations, and other problems. These types of problems are often triggered by unobserved variations or abnormalities in the operation of one or more nodes that cascade into larger problems.

In recent years, computational techniques have been developed to detect patterns in data produced by a complex system that do not conform to an established normal behavior for the complex system. These anomalies may translate into critical and actionable information in several application domains. However, many anomalies in complex systems do not adhere to common statistical definitions of an outlier. As a result, many anomaly detection techniques cannot be applied to a wide variety of different types of data generated by different complex systems. For instance, typical techniques for anomalous detection of time-series data rely heavily on parametric analysis. These techniques assume a known set of distributions for the metrics and perform simple calculations to detect percent out of normal. On the other hand, non-parametric techniques make no assumption about the data distribution and, as a result, can be applied to any data set but at the cost of complexity and more resource intensive algorithms. Those working in the computing industry continue to seek tools that can be used to detect anomalies in a given data set regardless of the type of data.

SUMMARY

This disclosure presents computational systems and methods for detecting anomalies in data output from any type of monitoring tool. The data is aggregated and sent to an alerting system for abnormality detection via comparison with normalcy bounds. The anomaly detection methods are performed by construction of normalcy bounds of the data based on the past behavior of the data output from the monitoring tool. The methods use data quality assurance and data categorization processes that allow choosing a correct procedure for determination of the normalcy bounds. The methods are completely data agnostic, and as a result, can also be used to detect abnormalities in time series data associated with any complex system. The methods described herein are comprehensive for addressing both accuracy and scalability and determination of the types of metrics that should not be analyzed due to a lack of proper information. In other words, the methods avoid false positive alerts.

DESCRIPTION OF THE DRAWINGS

FIG. 16 shows an example of a T-cycle checking procedure.

FIG. 17 shows periodic columns of a two-dimensional footprint matrix.

FIG. 18 shows a cyclochart in a tabular format.

FIGS. 25A-25C show example plots of bimodal data.

FIGS. 39A-39C shows example stabilocharts of data.

DETAILED DESCRIPTION

Figure 1:
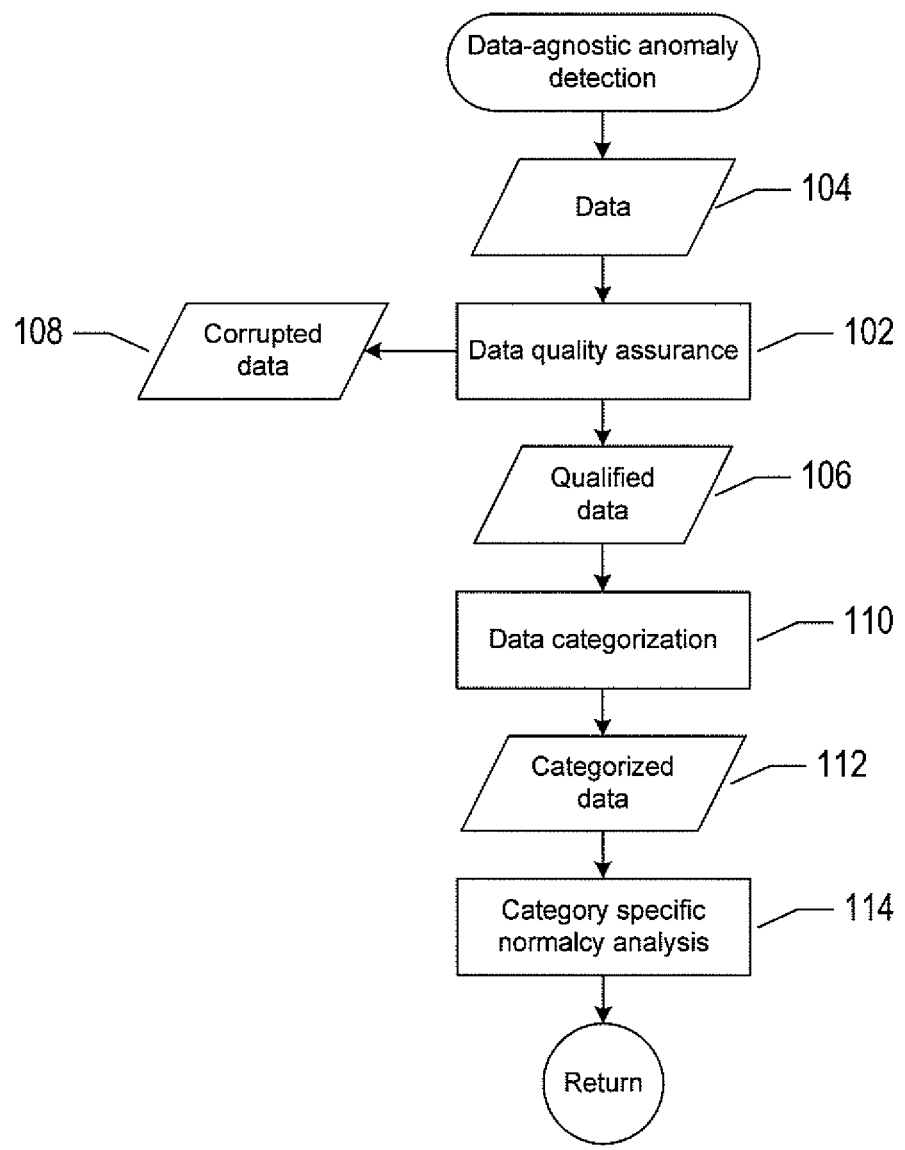
FIG. 1 shows a flow-control diagram that provides an overview of data normalcy analysis.

This disclosure presents computational systems and methods for fully data-agnostic anomaly detection using time-series data based on normalcy analysis. FIG. 1 shows a flow-control diagram that provides an overview of data normalcy analysis. In block 102, data quality assurance ("DQA") receives input data 104 supplied by any one of various different types of monitoring tools. For example, the monitoring tools can be sensors, such as biosensors, and network monitoring tools, such as HTTP, SMTP, or status requests, network traffic measurements, and network tomography. The DQA operation identifies the input data 104 as qualified data 106 or corrupted data 108 by checking the input data 104 against different statistical characteristics defined for data qualification. Corrupted data 108 is useless for further analysis and may be discarded. In block 110, data categorization ("DC") is used to identify and sort the qualified data 106 into categorized data 112. In other words, for each time series, the DC operation performs category checking and identification with hierarchical/priority ordering on the qualified data 106. For example, the qualified data 106 can be interpreted as being composed of subsets, where each subset belongs to a different data category:

$$\text{Data Set} = C_1 \cup C_2 \cup \ldots \cup C_n \quad (1)$$

where $C_i$ stands for the ith statistical data category.
The DC operation performed in block 110 produces statistically categorized data 112. When the categorized data 112 belongs to a statistical category $C_j$ determined in block 110, no further categorization is performed, and in block 114, category specific normalcy analysis is performed on the specified data 112 to end the process. It should be noted that the type of specific normalcy analysis applied to the categorized data 112 depends on the statistical category to which the categorized data 112 belongs. The categorized data 112 may be input to an alerting engine for abnormality detection via comparison with normalcy states for the data.

It should be noted at the onset that the input data 104, categorized data 112, any intermediately generated data, and normalcy bounds are not, in any sense, abstract or intangible. Instead, the input data is necessarily digitally encoded and stored in a physical data-storage computer-readable medium, such as an electronic memory, mass-storage device, or other physical, tangible, data-storage device and medium. It should also be noted that the currently described data-processing and data-storage methods cannot be carried out annually by a human analyst, because of the complexity and vast numbers of intermediate results generated for processing and analysis of even quite modest amounts of data. Instead, the currently described methods are necessarily carried out by electronic computing systems on electronically stored data, with the results of the data processing and data analysis digitally encoded and stored in one or more tangible, physical, data-storage devices and media.

Figure 2:
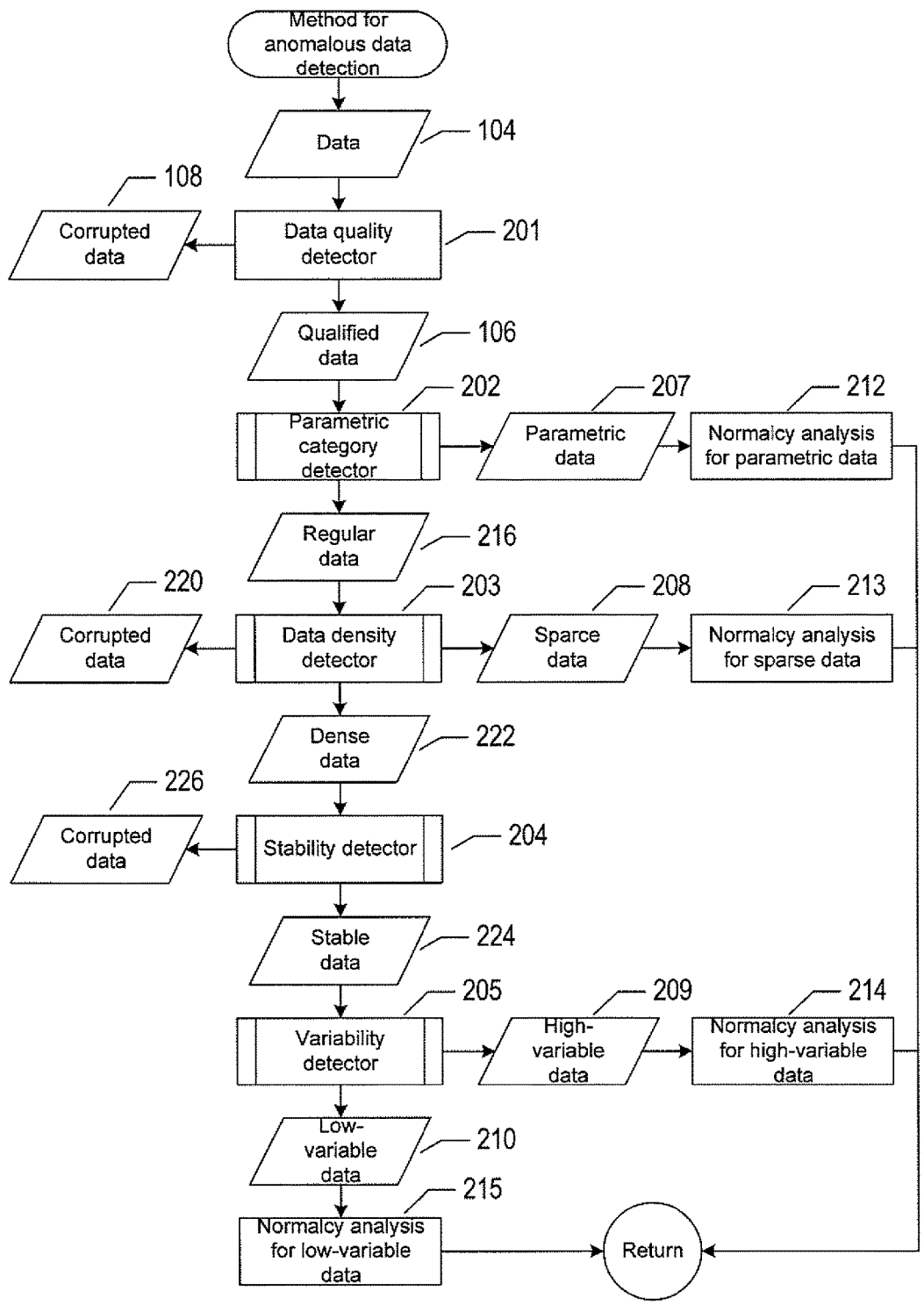
FIG. 2 shows a flow-control diagram of a method for normalcy analysis.

FIG. 2 shows a flow-control diagram of a method for normalcy analysis that provides an expansion of the processes of blocks 102 and 110 introduced in FIG. 1. The method includes calls to three routines 201, 203, and 204 that comprise the DQA described above with reference to block 102 of FIG. 1 and calls to two routines 202 and 205 that comprise the DC operation described above with reference to block 110 of FIG. 1. The method receives the input data 104 generated by a monitoring tool, and the routines 202-205 indentify the input data 104 as belonging to one of the data categories: parametric data 207, sparse data 208, high-variability data 209, and low-variability data 210, respectively. In block 201, a data quality detector receives the input data 104 and performs a check of sufficient statistics. Sufficient statistics can be certain user defined parameters about the data. For example, sufficient statistics can be a minimum number of available data points and a minimum data-time duration. Block 201 identifies the input data 104 as qualified data 106 when available data points and length of data are sufficient for further analysis or identifies the input data 104 as corrupted data 108 that may be discarded. In block 202, a routine "parametric category detector" is called to perform data categorization by verifying qualified data 106 against selected statistical parametric models. When parametric data categorization is possible, the qualified data 106 is identified as parametric data 207, otherwise, the qualified data 106 is identified as regular data 216. The parametric category detector 202 further categorizes the parametric data 207 as multinomial data, transient data, semi-constant data, and trendy data, as described below with reference to a flow-control diagram in FIG. 4. In block 203, a routine "data density detector" is called to assess gaps in the regular data 216. When the regular data 216 has a high percentage of gaps the data is considered corrupted data 220 that may be discarded; otherwise, the regular data 216 has a lower percentage of gaps and is identified as dense data 222. The data density detector 203 also categorizes regular data 216 with a high percentage of gaps that are uniformly distributed in time as sparse data 208 and regular data 216 with a high percentage of gaps that are localization in time is further processed in block 203 with a gap filter that outputs dense data 222 or corrupted data 220. In block 204, a routine "stability detector" is called to analyze the dense data 222 in terms of statistical stability. When the dense data 222 is piecewise stable and the latest stable region is enough for further processing the block 204 categorizes the data as stable data 224, otherwise, the data 222 is categorized as corrupted data 226 that may be discarded. In block 205, a routine "variability detector" is called to receive the stable data 224 and categorizes the data as high-variability data 209 or low-variability data 210. For each of the data categories identified in blocks 202-205, normalcy analysis is performed in blocks 212-215, which is different for each data category. The categorized data with normalcy bounds output from the blocks 212-215 may be input to an alerting engine for abnormality detection.

Figure 3B:
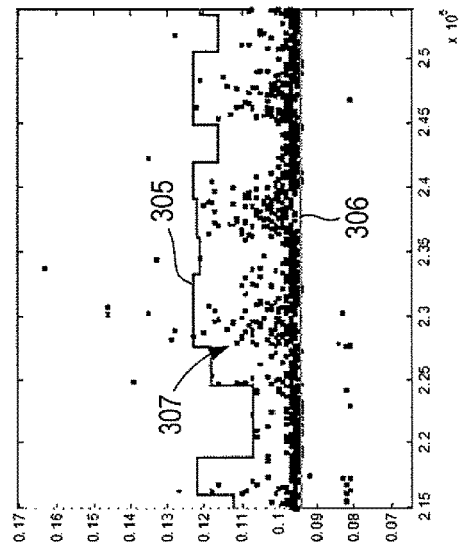
FIGS. 3A-3D show example plots of data from four different data categories with corresponding normalcy bounds.
Figure 3D:
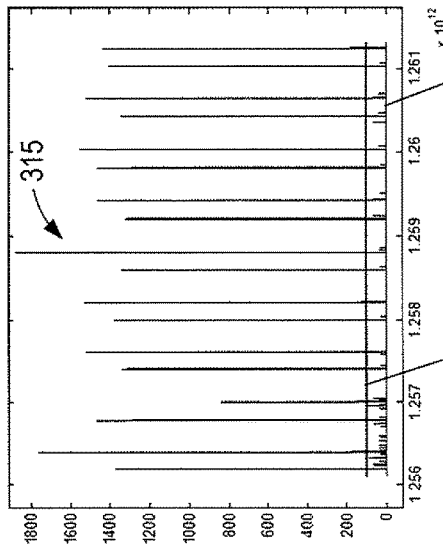
Figure 3A:
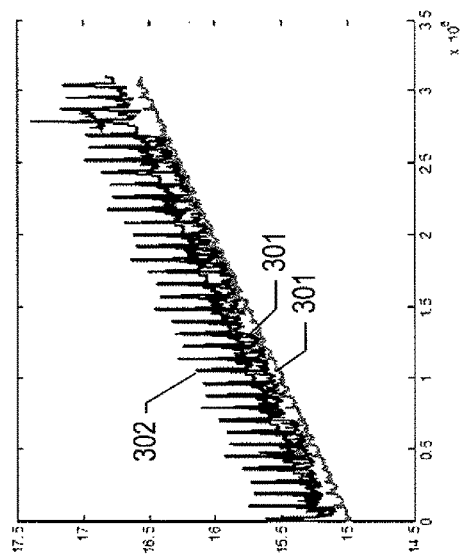
Figure 3C:
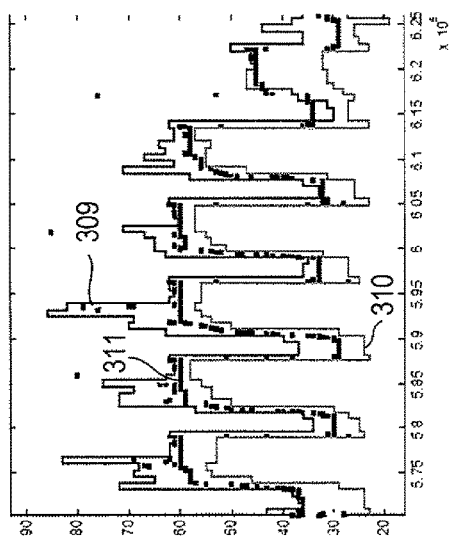

FIGS. 3A-3D show example plots of data that belongs to four different data categories with corresponding normalcy bounds. In FIGS. 3A-3D, horizontal axes represent time and vertical axes represent data values. FIG. 3A shows an example plot of linear periodic data 301 located between an upper linear-periodic normalcy bound 302 and a lower linear-periodic normalcy bound 303. FIG. 3B shows an example plot of normalcy bounds 305 and 306 for high-variability periodic data 307. FIG. 3C shows normalcy bounds 309 and 310 for low-variability periodic data 311. FIG. 3D shows normalcy bounds 313 and 314 for semi-constant non-periodic data 315.

Figure 4:
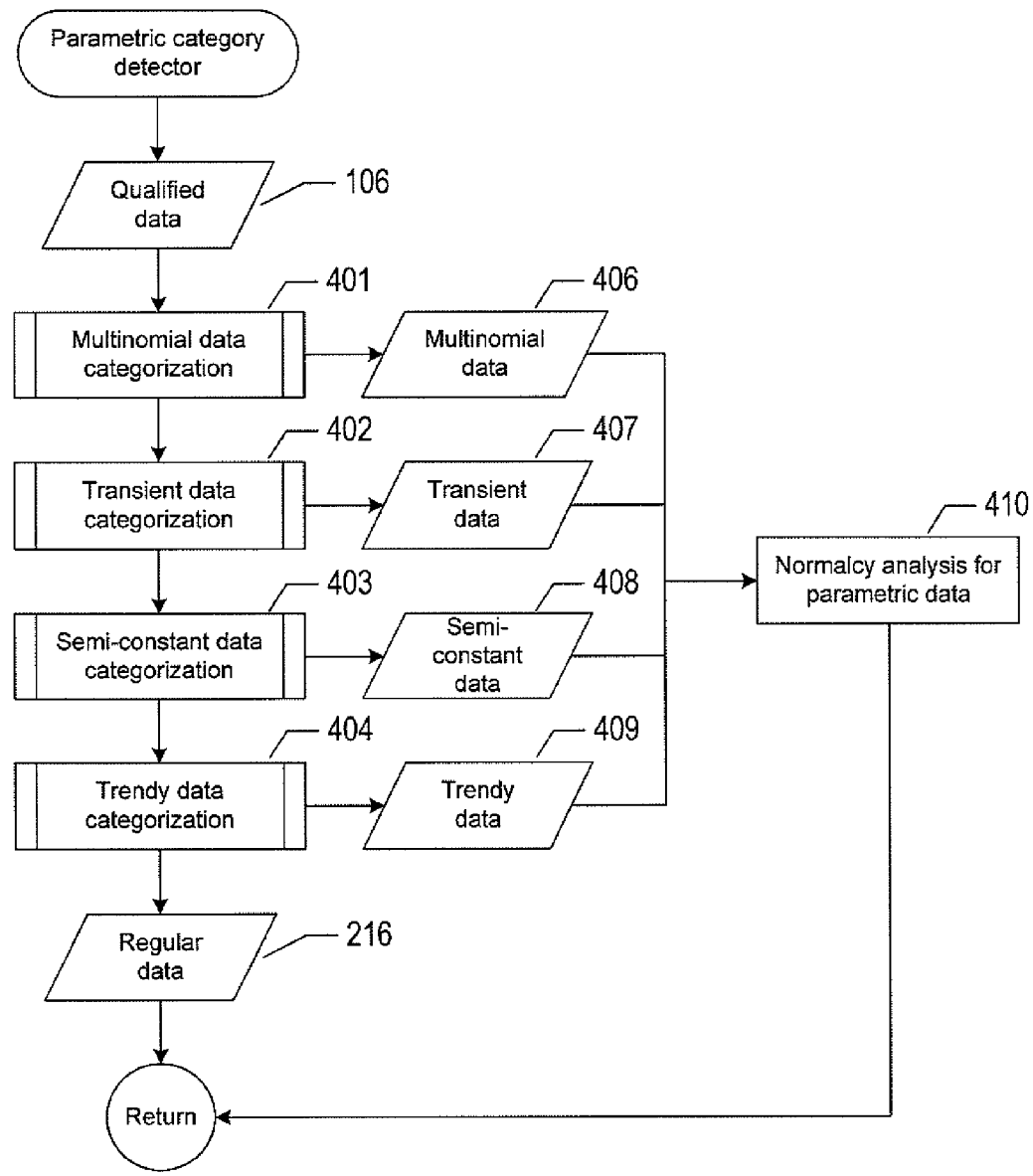
FIG. 4 shows an example flow-control diagram of the routine "parametric category detector" called in block 202 of FIG. 2.

FIG. 4 shows an example flow-control diagram of the routine "parametric category detector" called in block 202 of FIG. 2. In this example, blocks 401-404 represent routines called in the flow-control diagram of FIG. 2. The routines 401-404 are used to categorize the qualified data 106 as belonging to the parametric data categories identified as multinomial data 406, transient data 407, semi-constant data 408, and trendy data 409, respectively. Qualified data 106 that is not categorized as belonging to one of the four parametric categories is categorized as regular data 216. The parametric data output from each of the routines 401-404 undergoes normalcy analysis, which is as represented by a single block 410, is different for each of the parametric categories. The normalcy analysis applied to each of the different parametric data categories includes the operation of determining whether or not the particular category of parametric data is periodic or non-periodic data.

Figure 5:
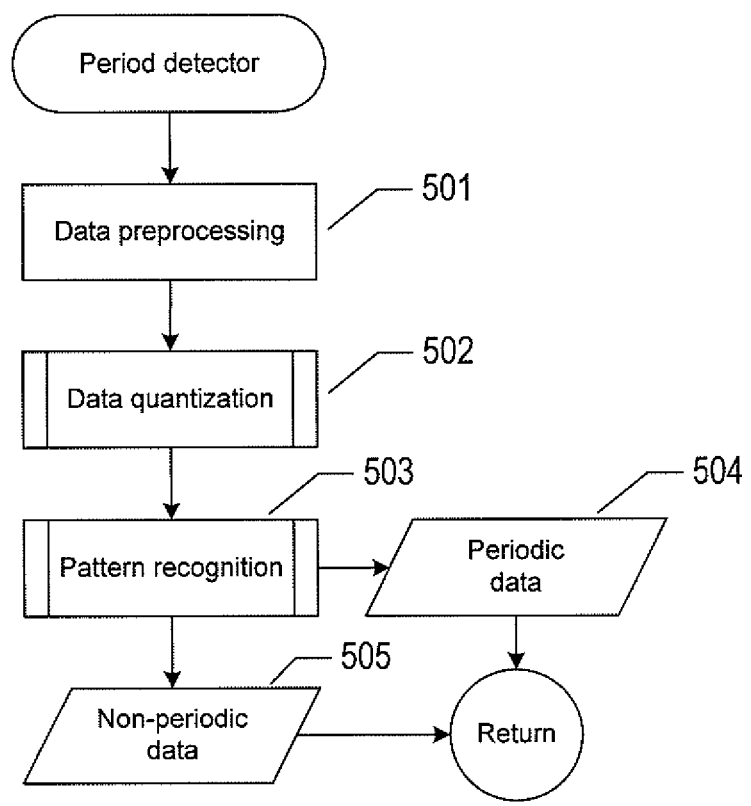
FIG. 5 shows a flow-control diagram of a method for determining whether or not data is periodic data or non-periodic data.

FIG. 5 shows a flow-control diagram of a period detector method for determining whether or not data is periodic data or non-periodic data. The data can fit any of the data categories discuss above. In block 501, data preprocessing performs data smoothing and outlier removal. Examples of two techniques for data preprocessing are whisker's method and moving median filtering or whisker's method and moving average filtering. After data smoothing by whisker's method, the moving median filter or moving average filter removes small fluctuations from the data. When the number of outliers removed by whisker's method is large (e.g., more than 5%) one of the moving filters is applied. Whisker's method is carried out to remove abnormally high-value data points. Whisker's method calculates two different quantiles of historical data $q_a$ and $q_b$, where $0 \le a < b \le 1$. Every data point that lies outside the interval:

$$(q_a - c(q_b - q_a), q_b + c(q_b - q_a)) \qquad (2)$$

where c is a positive parameter, is an abnormal outlier to be removed. For example, letting c equal 1.5, data points greater than an upper whisker given by:

$$q_{0.75} + 1.5 iqr \qquad (3a)$$

and less than a lower whisker given by:

$$q_a = q_{0.25} - 1.5 iqr \qquad (3b)$$

are removed, were iqr represents the interquartile range given by:

$$iqr = q_{0.75} - q_{0.25} \qquad (3c)$$

Figure 6:
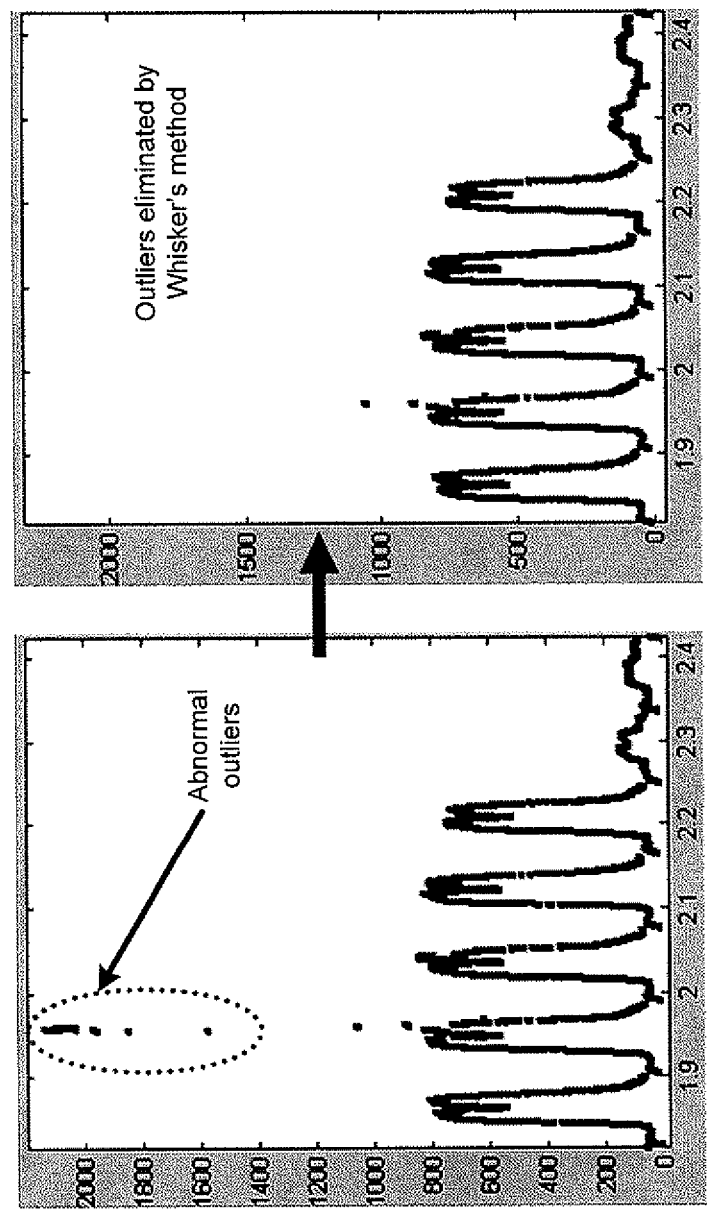
FIG. 6 shows an example plot of elimination of outlier data.

FIG. 6 shows an example plot of elimination of outliers 601 by whisker's method. After whisker's method, the moving median or average filter smooths the data by replacing each data point with a median or average of the neighboring data points. The moving average filter is given by:

$$y_s(i) = \frac{1}{2N+1} \sum_{k=-N}^{N} y(i+k) \qquad (4a)$$

where
$y_s(i)$ is the smoothed value for the ith data point $y(i)$;
N is the number of neighboring data points of $y(i)$; and
2N+1 is the span.

A moving average filter can be implemented by recursion. Moving average filter are trend following indicators that can be used to reduce random noise. The moving median filter also smooths the data by replacing each data point with a median of the neighboring data points and is given by:

$$y_s(i) = \text{median}\{y(i+k)\}_{k=-N}^{N} \qquad (4b)$$

where
$y_s(i)$ is the smoothed value for the ith data point $y(i)$;
N is the number of neighboring data points of $y(i)$; and
2N+1 is the span.

Figures 7A, 7B:
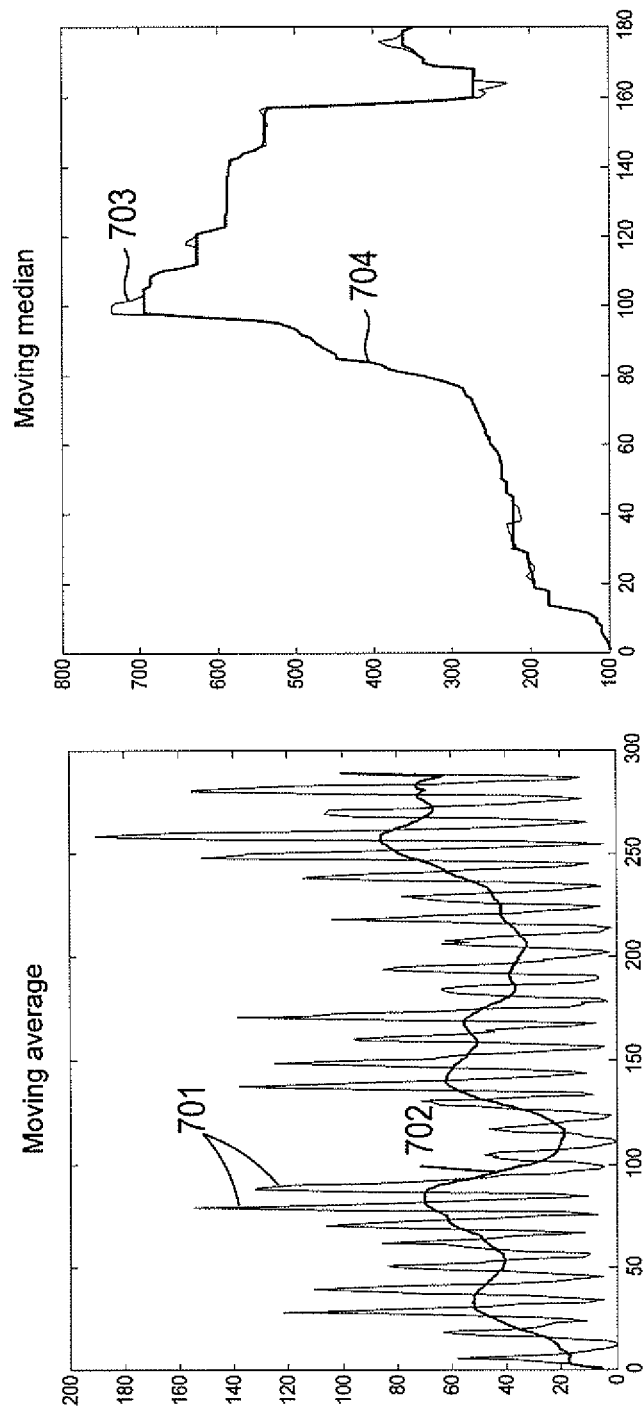
FIGS. 7A-7C shows three example plots of filtering using a moving average filter and a median filter.
Figure 7C:
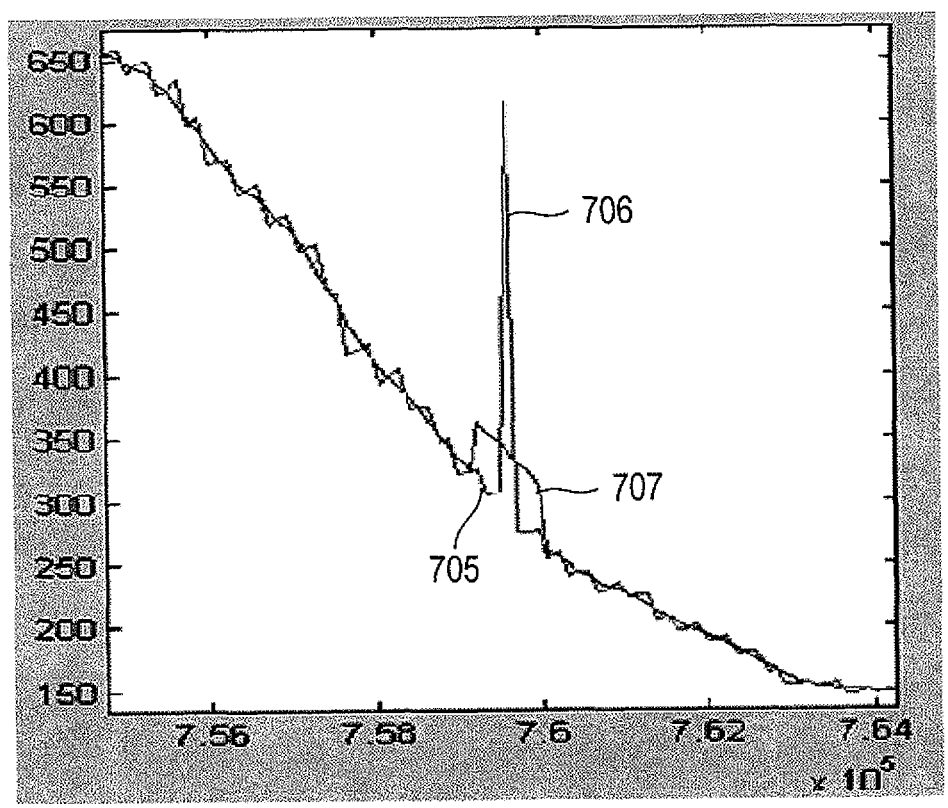

FIGS. 7A-7C shows three example plots of filtering using a moving average filter and a median filter. In FIG. 7A, a moving average is applied to the highly oscillatory data represented by light curve 701 to obtain smoothed data represented by heavy curve 702. In FIG. 7B, a moving median is applied to data represented by light curve 703 to obtain smoothed data represented by heavy curve 704. In FIG. 7C, a moving average filter is applied to data represented by an oscillatory curve 705 of small fluctuations and a spike 706 to obtain smoothed data represented by curve 707.

Figure 8:
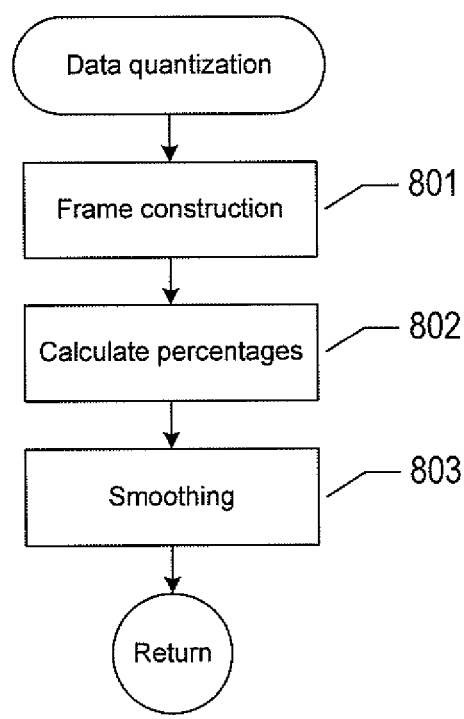
FIG. 8 shows a flow diagram of the routine "data quantization" called in block 502 of FIG. 5.

Returning to FIG. 5, in block 502 a routine "data quantization" is called to construct a footprint of historical data. FIG. 8 shows a flow diagram of the routine "data quantization" called in block 502 of FIG. 5. In block 802, the range of the data is divided into intervals by the $q_k$ quantiles with $k = k_1, \ldots, k_m$ and $0 \le k_1 < \ldots < k_m \le 100$, where the parameter m and the values for $k_j$ are user-defined. The data may be divided into non-uniform intervals identified by grid lines. The grid lines are close where the data is dense and the grid lines are spread out where the data is sparse. For division of data into parts by time, two user defined parameters "time_unit" and "time_unit_parts" are used. "Time_unit" is a parameter that defines a minimal length of possible cycles that can be found and any cycle can be a factor only of the length of the "time_unit". The parameter "time_unit_parts" represents the number of subintervals the "time_unit" is divided by and is the measure of resolution. The larger the value of "time_unit_parts", the more sensitive or higher resolution of the footprint of historical data.

Figure 9:
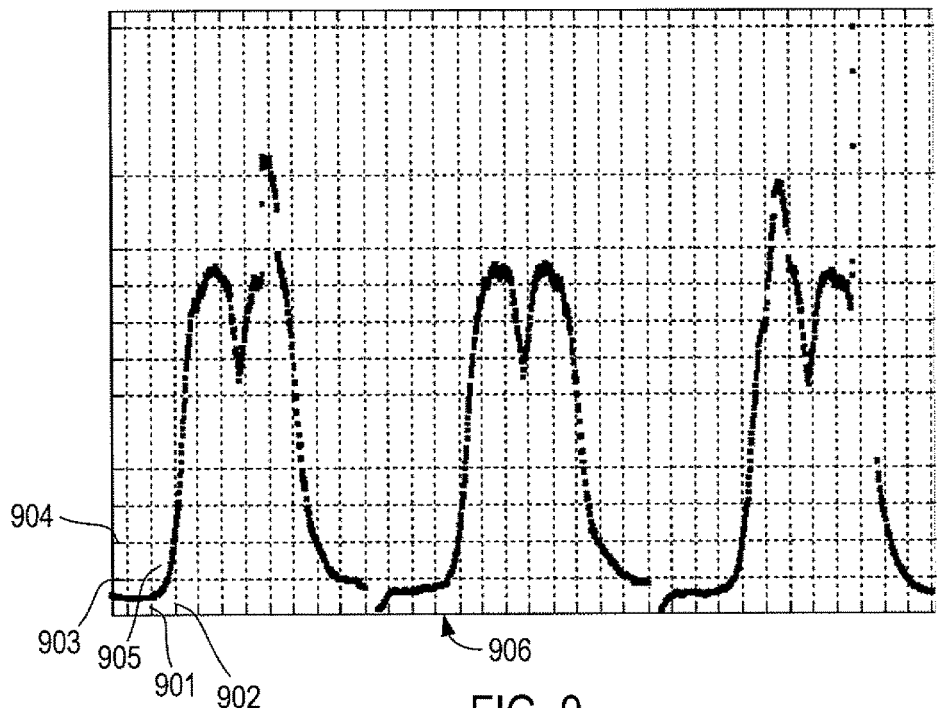
FIG. 9 shows an example of a frame with grid lines.

FIG. 9 shows an example of a frame with grid lines. Vertical grid lines, such as grid line 901, are regularly spaced along the horizontal or time axis and vertical grid lines, such as grid line 903, are non-uniformly spaced along the range axis. The region between any two neighboring horizontal grid lines that intersect any two neighboring vertical grid lines is called a grid cell. For example, a grid cell 905 is the region between vertical grid lines 901 and 902 and horizontal grid lines 903 and 904. One possibility is parameters $q_k$, "time_unit" and "time_unit_parts" with an estimated monitoring time Δt that allows sufficient statistics for normal statistical analysis. For example, the monitoring time Δt can be given by:

$$\Delta t = \text{median}(\Delta t_k) \quad (5)$$

where $\Delta t_k = t_{k+1} - t_k$.

Examples of possible settings for "time_unit" are $$\begin{cases} \Delta t > 1 \text{ day} & \text{"time\_unit"} = 1 \text{ week} \\ \Delta t \leq 1 \text{ day} & \text{"time\_unit"} = 1 \text{ day} \end{cases}$$

and an example of the following settings for $q_k$ and "time_unit_parts" are:

$$\begin{cases} \Delta t \leq 20 \text{ minutes} & \text{"time\_unit\_parts"} = 12 & q_k = 5\% \\ 20 \text{ minutes} < \Delta t \leq 1 \text{ hour} & \text{"time\_unit\_parts"} = 6 & q_k = 5\% \\ 1 \text{ hour} < \Delta t \leq 2 \text{ hours} & \text{"time\_unit\_parts"} = 4 & q_k = 10\% \\ 2 \text{ hour} < \Delta t \leq 4 \text{ hours} & \text{"time\_unit\_parts"} = 3 & q_k = 10\% \\ 4 \text{ hour} < \Delta t \leq 12 \text{ hours} & \text{"time\_unit\_parts"} = 1 & q_k = 20\% \\ 12 \text{ hour} < \Delta t \leq 24 \text{ hours} & \text{"time\_unit\_parts"} = 1 & q_k = 25\% \\ \Delta t > 1 \text{ day} & \text{"time\_unit\_parts"} = 7 & q_k = 25\% \end{cases}$$

Figure 10:
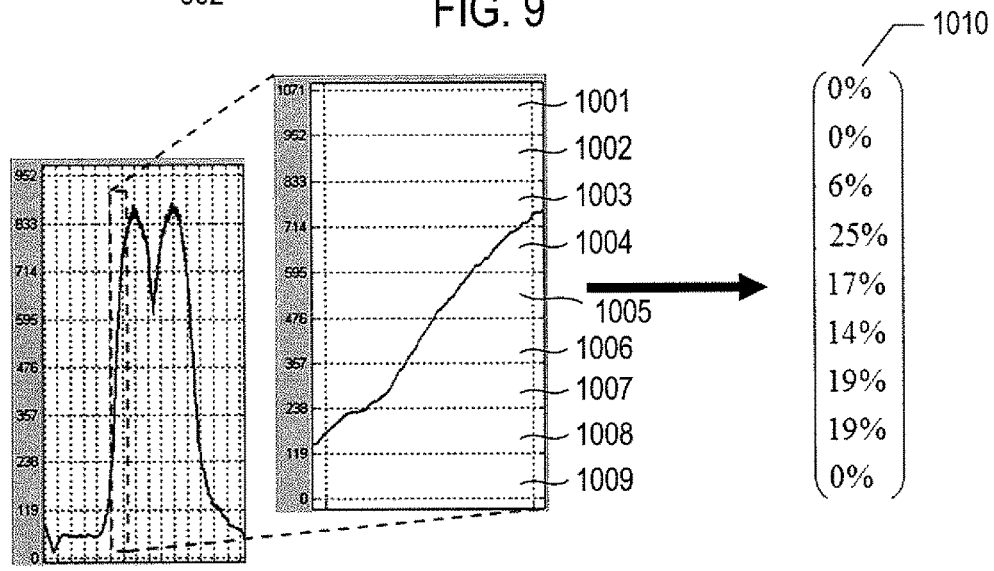
FIG. 10 shows calculation of the percentages of data in the grid cells arranged in a column.

Returning to FIG. 8, in block 802, percentages are calculated for each column of grid cells. Each column corresponds to a time interval. For a given framework the percentage of the data in each grid-cell of a column of grid cells associated with a given time interval are calculated. FIG. 10 shows calculation of the percentages of data in the grid cells comprising the column of grid cells 1001-1009 arranged in a column of percentages 1010. For example, grid cells 1001, 1002, and 1009 are empty, which correspond to 0% elements in the column 1010. Grid cells 1003-1008 have data which corresponds to the percentages in the column 1010. The percentages in the column 1010 correspond to the data in the column of grid cells 906 in FIG. 9. Collecting all columns percentages produces a matrix of percentages for that particular framework. The final matrix is a two-dimensional ("2D") histogram of historical data.

Figures 11A, 11B, 12:
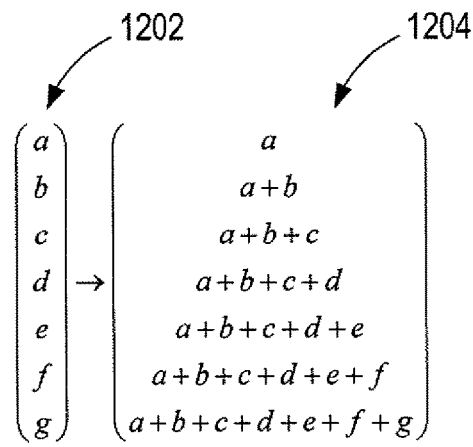
FIGS. 11A-11B show an example of smoothing a grid cell.
FIG. 12 shows an example of a cumulative summation of a sequence of values arranged in a column.

Returning to FIG. 8, in block 803, the 2D histogram of historical data is smoothed. Smoothing can be a weighted averaging based of the percentages associated with the neighbors. For example, FIGS. 11A-11B show an example of smoothing a grid cell 1101 based on a weighted average of the percentage of the grid cell 1101 and the percentages of eight surrounding grid cells. Suppose that grid cell 1101 has P % of data and the eight neighboring grid cells have the percentages A %, B %, C %, D %, E %, F %, G %, H % as represented by the nine grid cells shown in FIG. 11A. FIG. 11B shows an example of a 3×3 grid-cell window of weights assigned to each of the corresponding grid cells shown in FIG. 11A. The resulting smoothed percentage or weighted average of the grid cell 1101 can be calculated as follows:

$$P_{new} = \frac{4P + A + 2B + C + 2D + F + 2E + H + 2G}{1+1+1+1+2+2+2+2+4} \quad (6)$$

Applying Equation (6) to all of the grid cell percentages comprising a 2D matrix gives a smoothed matrix that is less sensitive to time and value shifts. For grid cells located in end columns of the matrix, virtual columns of neighboring cells with zeros may be added to the matrix in order to apply Equation (6) to grid cells located in the end columns. Embodiments are not limited to 3×3 grid-cell windows and the weights presented in Equation (6) and FIG. 11B. In other embodiments, 4×4 and 5×5, or even larger, grid-cell windows can be used with any desired weights. After the weighted averages have been obtained, cumulative sums are calculated for each column of the 2D matrix. A cumulative sum is a sequence of partial sums applied to a column of smoothed grid cell values. FIG. 12 shows an example of a cumulative summation of a sequence of values arranged in a column 1202. Column 1204 represents the resulting cumulative sum of the values in the column 1202.

Figure 13:
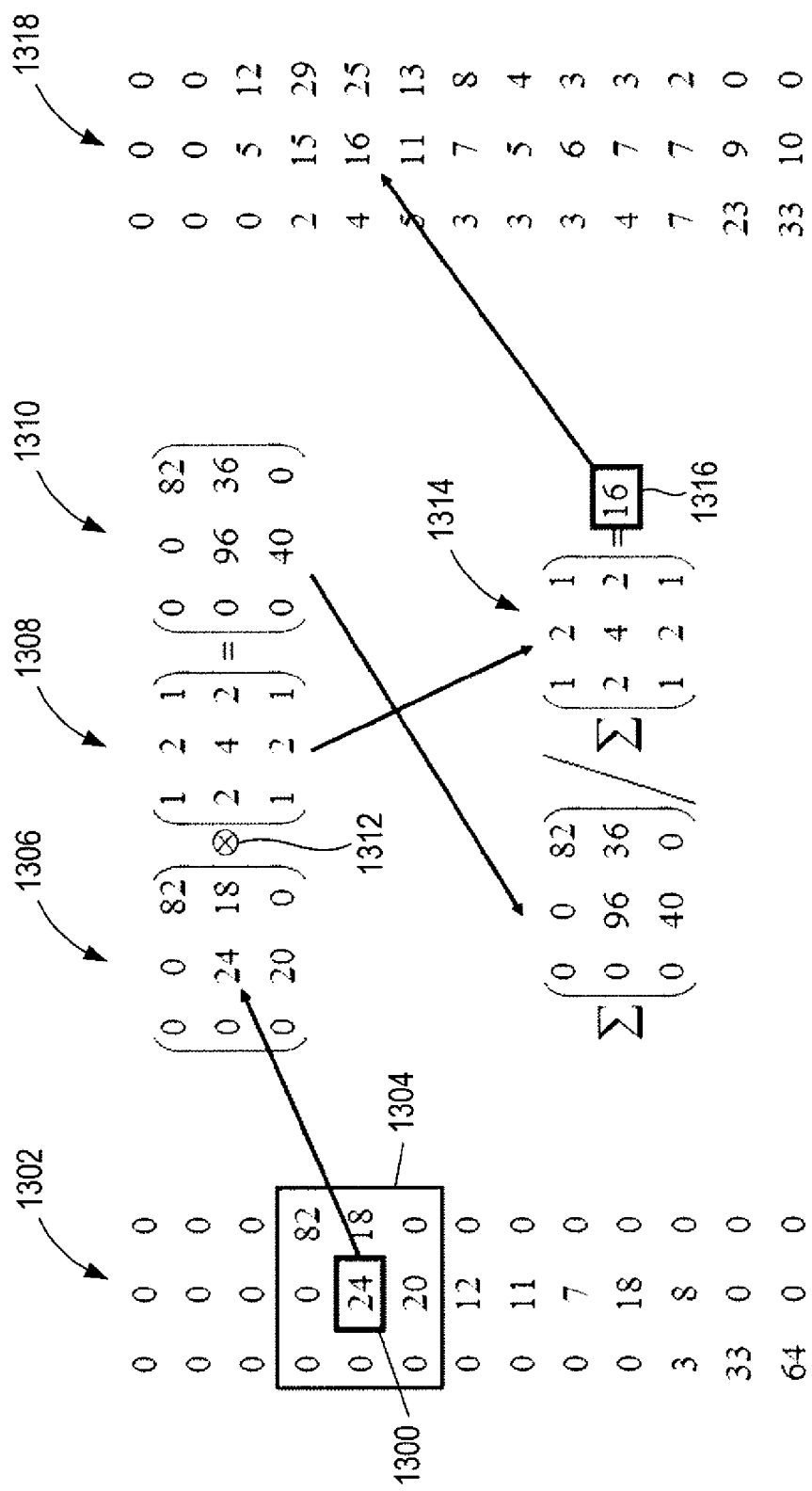
FIG. 13 shows an example of a 3×3 grid-cell window of grid-cell values.
Figure 14:
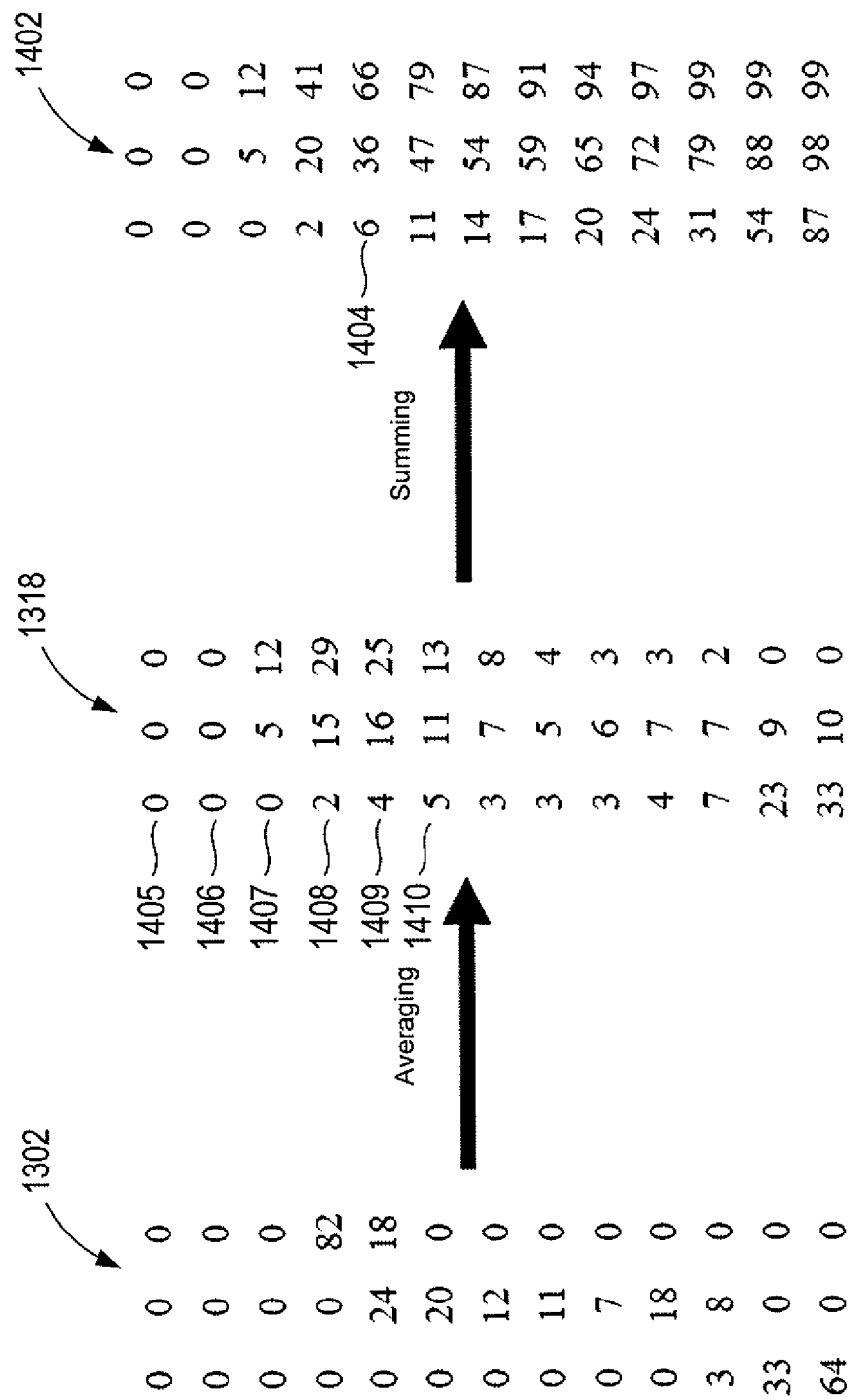
FIG. 14 shows an example of cumulative summation of a weighted average of grid cells.

FIGS. 13 and 14 show the procedure of weighted averaging and cumulative summing, respectively, applied to an example 2D matrix of grid-cell percentage values acquired as described above with reference to FIGS. 9 and 10. FIG. 13 shows an example of a 3×3 grid-cell window 1304 of grid-cell values surrounding the grid cell 1300. Matrix 1306 represents the grid-cell values in the window 1304 and matrix 1308 represents the weights shown in FIG. 11B. Matrix 1310 is a product matrix produced by element-wise multiplication 1312 of the matrix 1306 by the weights in the matrix 1308. Equation 1314 represents the mathematical operation of Equation (6), which gives a weighted average percentage 1316 for the grid cell 1300. Applying the weighted average to each of the grid-cell values in the matrix 1302 in the same manner gives a 2D weighted-average grid-cell matrix 1318.

FIG. 14 shows an example of cumulative summation of the weighted average grid cells 1306 in the matrix 1318. 2D matrix 1402 represents grid-cell values generated by a cumulative summation of the grid-cell values in each column of the matrix 1318. For example, the grid cell 1404 has the value "11" which is a cumulative sum of the grid-cell values 1405-1410 in the matrix 1318. Each element in the matrix 1402 is an approximate cumulative distribution function of the data in that column. The resulting 2D matrix 1402 is an example of a "footprint" matrix of historical data.

Figure 15:
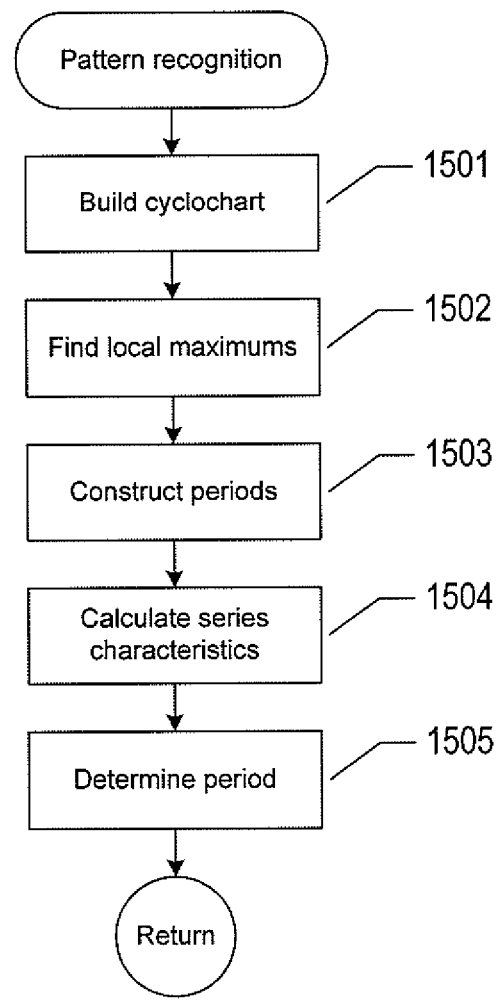
FIG. 15 shows a flow diagram of a method for pattern recognition called in block 503 of FIG. 5.
Figure 19:
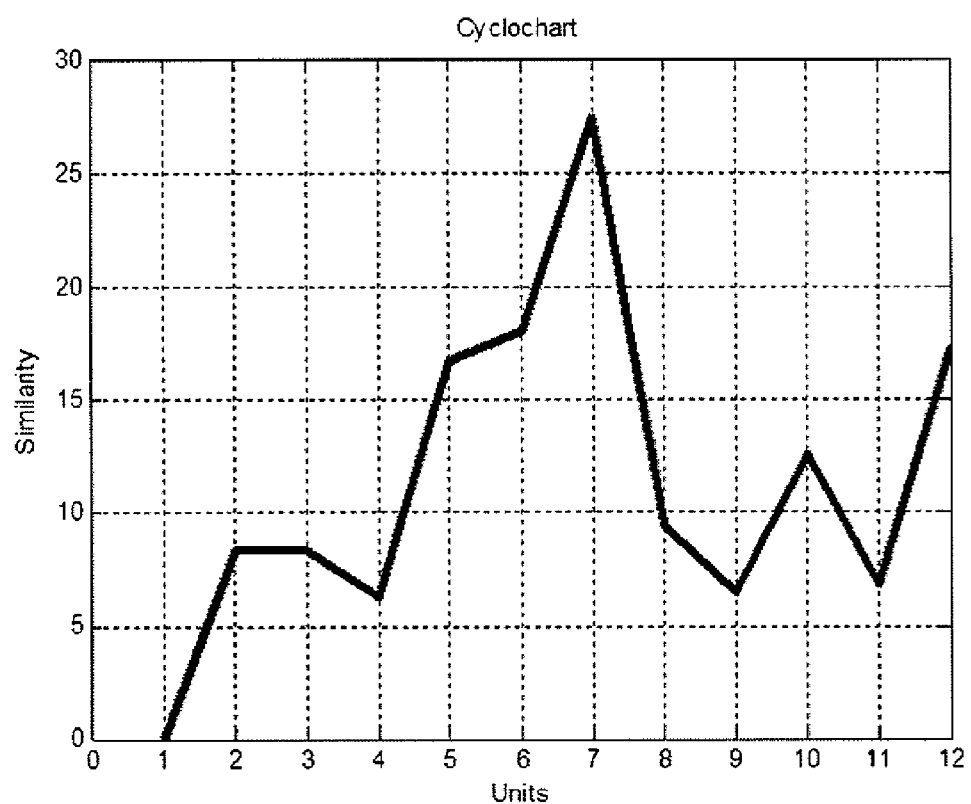
FIG. 19 shows an example cyclochart.
Figure 20:
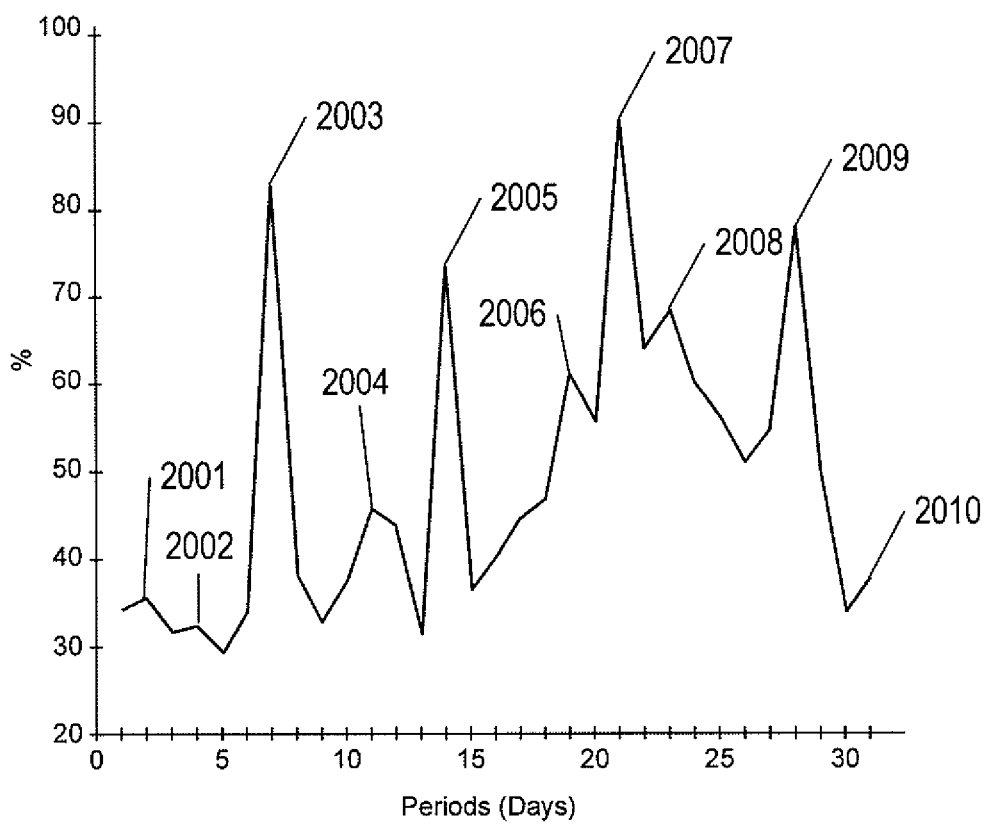
FIG. 20 shows an example cyclochart.

Returning to FIG. 5, in block 503, a routine "pattern recognition" is is called. FIG. 15 shows a flow diagram of a method for pattern recognition called in block 503 of FIG. 5. In block 1501, a cyclochart of the 2D footprint matrix output from data quantization 502 in FIG. 5 is constructed. Suppose T=N×time_unit cycle checking procedure, where N is a positive integer. The columns of the footprint matrix are collected into subgroups where L=N×time_unit×time_unit_parts is the number of columns in every subgroup. The total number of subgroups is M=length(footprint)/L. The footprint matrix can be extended by adding columns of zeros. The distance between any two columns is checked using a relative $L_2$-norm given by:

$$d(A, B) = \frac{\left(\sum_{k=1}^{n}(a_k - b_k)^2\right)^{1/2}}{\max(\|a\|, \|b\|)} \quad (7)$$

where $$A = \begin{pmatrix} a_1 \\ a_2 \\ \vdots \\ a_n \end{pmatrix}, B = \begin{pmatrix} b_1 \\ b_2 \\ \vdots \\ a_n \end{pmatrix}$$

are any two columns in the footprint matrix. When $$d(A,B) \leq \text{closeness} \quad (8)$$

for some user-defined parameter called "closeness," it is assumed that the two columns A and B are similar. For example, suppose a user defines a closeness parameter equal to 0.2 and a similarity parameter called "similarity" equal to 75%. FIG. 16 shows an example of a T-cycle checking procedure where columns of a footprint matrix are labeled A through P and are divided into T-cycles composed of four columns. Note that a number of the columns are identified as zero-data columns with the number "0" and columns with data are identified with the number "1." For this particular example, suppose $d(A,E)>closeness, d(A,I)>closeness, d(A,M)>closeness$ In other words, column A is not similar to columns E, I, and M. Now suppose that for column E $d(E,I)\leq closeness, d(E,M)\leq closeness$ In other words, column E is similar to columns I and M. Because 3 out of 4 possible columns compose 75% or greater similarity, the first column of the T-cycle is assumed to be periodic. If during comparison only p % of the columns are similar where p %<similarity then the associated column is considered non-periodic. For example, FIG. 17 shows the periodic columns are marked by "1" and the non-periodic columns are marked by "0." Repeating this procedure for all possible T-cycles produces a Cyclochart of the footprint data. FIG. 18 shows a cyclochart in tabular format, and FIG. 19 shows a corresponding plot of the same cyclochart data. Next, the method of pattern recognition includes a period determination procedure of the cyclochart data, composed of the four operations represented by blocks 1502-1505. The operations of blocks 1502-1505 are now described with reference to the data presented in an example cyclochart shown in FIG. 20. In block 1502, local maximums in the cyclochart are identified according to their corresponding similarities. For example, peaks 2001-2010 are local maximum similarities. Table 1 displays the local maximum time units and the corresponding local maximum similarities represented by the peaks 2001-2010 in the cyclochart of FIG. 20.

TABLE 1

| Local maximum time units (days) | Local maximum Similarities |
|---|---|
| 2 | 34.7% |
| 4 | 31.3% |
| 7 | 82.5% |
| 11 | 44.9% |
| 14 | 73.28% |
| 19 | 60.5% |
| 21 | 90.3% |
| 23 | 68.1% |
| 28 | 78% |
| 31 | 37% |

Returning to FIG. 15, in block 1503, periods for each of the local maxima are constructed. For example, the data associated with each T-cycle has a kT cycle for every natural number k. So the local maximum with a 2-day period creates the following periodic series $2 \rightarrow 2,4,6,8,10,12,14,16,18,20,22,24,26,28,30.$ The local maximum with a 4-day period creates another periodic series $4 \rightarrow 4,8,12,16,20,24,28.$ Similarly, local maximums 7, 11, 14, 19, 21, 23, 28, and 31 day periods create periodic series given by:

$7 \rightarrow 7,14,21,28,$ $11 \rightarrow 11,22,$ $14 \rightarrow 14,28,$ $19 \rightarrow 19,$ $21 \rightarrow 21,$ $23 \rightarrow 23,$ $28 \rightarrow 28,$ $31 \rightarrow 31.$ In block 1504, the series characteristics are calculated for each of the period series. The following series characteristics can be:

Positive factor of a period series is the number of peaks in the period series; and Negative factor of a period series is the number of members in the period series that are not peaks; and the strength of the time unit can be calculated using:

Strength=Positive factor−Negative factor

Table 2 shows positive factors, negative factors, and strengths for the data represented in Table 1.

TABLE 2

| Local maximum | Positive factor | Negative factor | Strength | Similarity |
|---|---|---|---|---|
| 2 | 4 | 11 | −7 | 34.7% |
| 4 | 2 | 5 | −3 | 31.3% |
| 7 | 4 | 0 | 4 | 82.5% |
| 11 | 1 | 1 | 0 | 44.9% |
| 14 | 2 | 0 | 2 | 73.28% |
| 19 | 1 | 0 | 1 | 60.5% |
| 21 | 1 | 0 | 1 | 90.3% |
| 23 | 1 | 0 | 1 | 68.1% |
| 28 | 1 | 0 | 1 | 78% |
| 31 | 1 | 0 | 1 | 37% |

In bock 1505, a period is determined by selecting the periods with maximum strength. From that list the periods with minimum negative factor are selected. From that list, periods with maximum similarity are selected. Finally, the period with minimum length is selected. A user can define different limitations on the calculated period. For example, when the similarity of the determined period is small (e.g., less than 20%), the data may be considered non-periodic. This procedure applied to the cyclochart data shown in FIG. 20 leads to the 7-day period having the maximum Strength=4.

Figure 21:
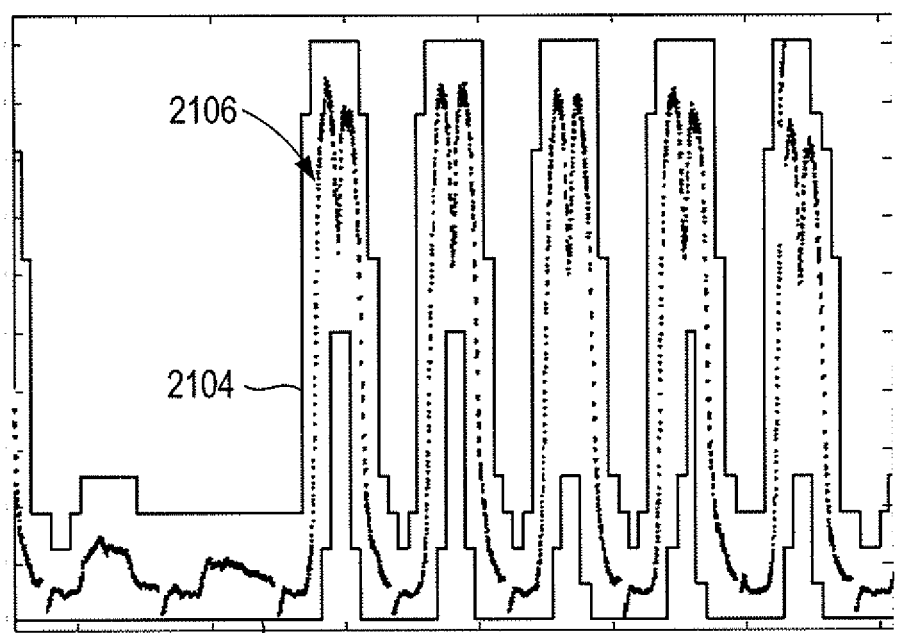
FIG. 21 shows a plot of lower and upper normalcy bounds for periodic data.

Returning to FIG. 5, in general, the period detector classifies data as periodic data 504 and non-periodic data 505. The general procedure of normalcy bounds determination is described below for each of the different data categories. Determination of normalcy bounds for both types of data takes into account the specific data categories. For non-periodic data 505, one approach to determining normalcy bounds may be to apply whisker's method, and another approach may be to utilize an objective function based on data range or variability calculation. On the other hand, for periodic data 504, normalcy bounds may be calculated column-wise for every "time_unit_parts" by the same procedure and then normalcy is extended into the future based on the cycle information. FIG. 21 shows a plot of lower and upper normalcy bounds 2102 and 2104 for periodic data 2106. More specifically, consider the case of cyclical data and the following four columns of data from a footprint matrix, which are shifted one from another by the period of data $$A = \begin{pmatrix} a_1 \\ a_2 \\ a_3 \\ a_4 \end{pmatrix}, B = \begin{pmatrix} b_1 \\ b_2 \\ b_3 \\ b_4 \end{pmatrix}, C = \begin{pmatrix} c_1 \\ c_2 \\ c_3 \\ c_4 \end{pmatrix}, D = \begin{pmatrix} d_1 \\ d_2 \\ d_3 \\ d_4 \end{pmatrix}$$

Figure 22:
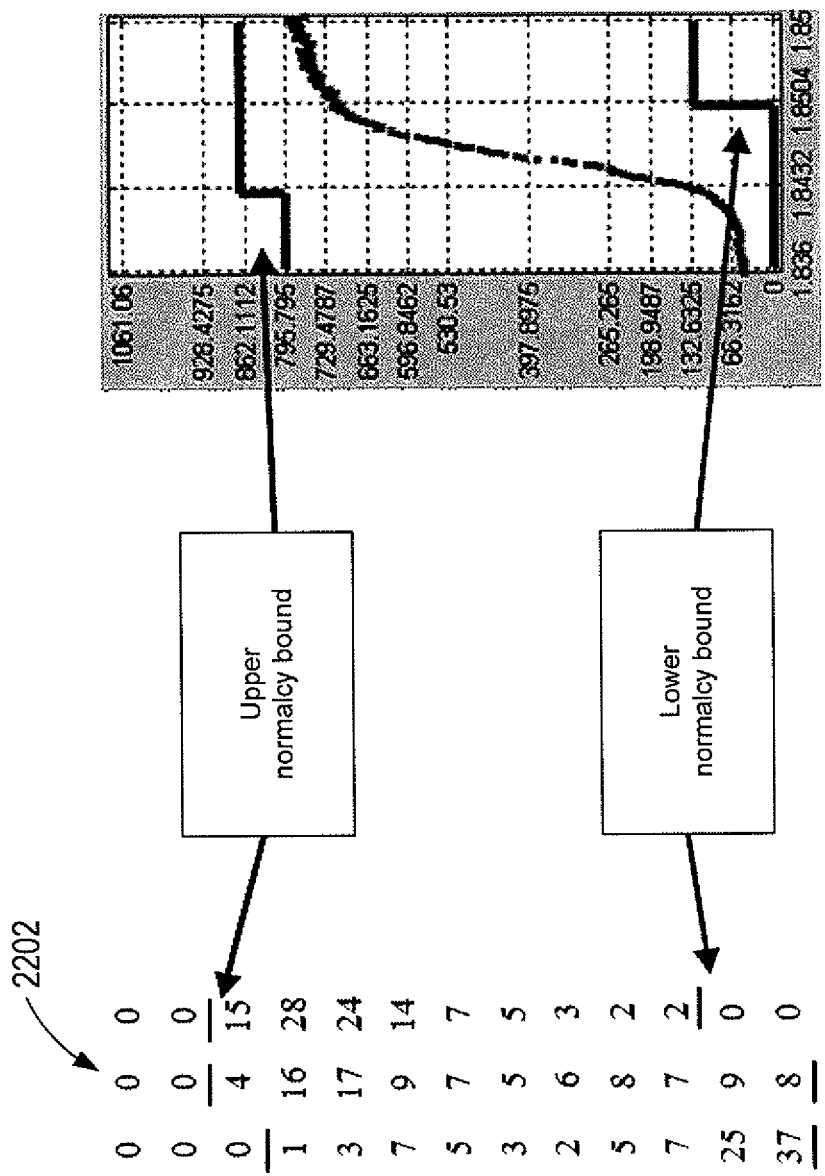
FIG. 22 shows normalcy bounds constructed of an example footprint matrix.

If d(A,B)≤closeness, d(A,C)≤closeness, and d(A,D)→closeness, then the columns form a cyclical subgroup and the normalcy bounds, also called dynamic thresholds ("DTs"), are calculated based on the four data columns. On the other hand, if d(A,B)≤closeness, d(A,C)≤closeness but d(A,D)>closeness, then only the columns A, B, and C form a cyclical subgroup. If d(A,D)≤closeness and d(A,B)>closeness then column A is discarded. If less than 75% of the four columns A, B, C, and D are similar, then the columns A, B, C, and D for a non-cyclical subgroup. From each group of columns, DTs are calculated using whisker's method, or by taking min or max values of the data, or by maximization of the objective function described below with reference to Equation (34). FIG. 22 shows an example of upper and lower normalcy bounds constructed from an example footprint matrix 2202 by taking into account the information on cycles.

Figure 23:
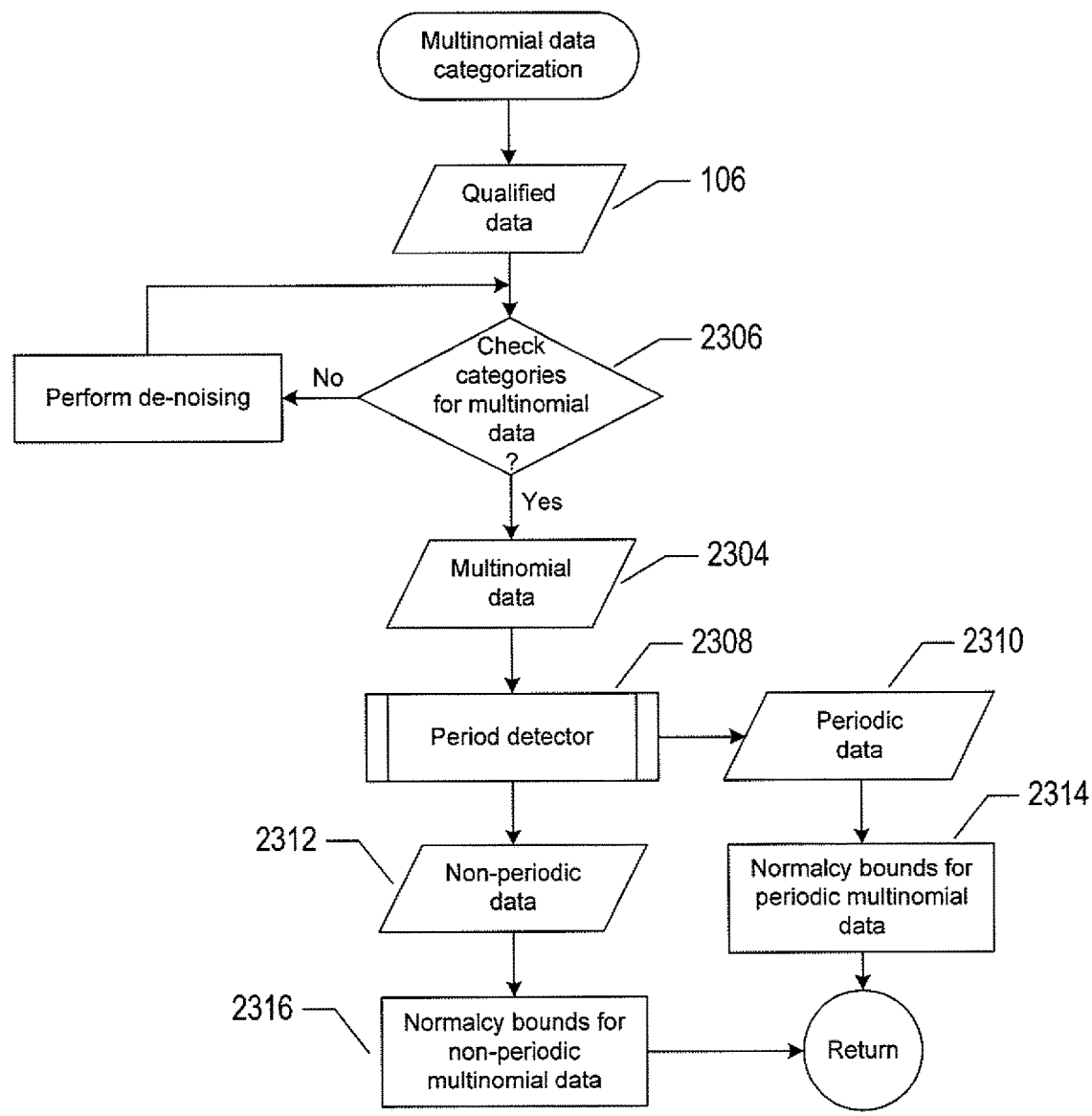
FIG. 23 shows a flow-control diagram of a method for multinomial data categorization called in block 401 of FIG. 4.

Returning to FIG. 4, in block 401, the routine "multinomial data categorization" is called. FIG. 23 shows a flow-control diagram of a method for multinomial data ("MD") categorization. In block 2302, the routine receives the qualified data 106 and calculates statistical parameters that are compared with predefined statistical parameters that may be calculated as follows. The qualified data can take different values, such as $a_1$, $a_2$, $a_3$, etc. The number of times each data value occurs is given by $n_j$. For example, $n_1$ is the number times $a_1$ occurs and $n_2$ is the number of times $a_2$ occurs. Let $p_j$ be the frequency of occurrences of the integer $n_j$:

$$p_j = \frac{n_j}{N} 100 \tag{9}$$

where
j=1, ... , m;
N is the total number of integer values; and
m is the number of different integer values.

In block 2302, the qualified data 106 is multinomial data 2304 when it takes less than m different integer values and at least s of the integer values have frequencies greater than a user defined parameter $H_1$. Otherwise, in block 2306, de-noising is performed on the qualified data 106 with sequential checking of predefined parameters. Block 2306 may be implemented using one or two different de-noising procedures:

1) The de-noising procedure is filtering against non-integer values that are smaller than an $H_2$ percentage ($H_2 < H_1$), where $H_2$ is a user defined parameter. When the condition $H_2 < H_1$ is satisfied, the non-integer numbers are discarded.

2) The de-noising procedure is filtering against integer values with a small cumulative percentage. Sorting the percentages $p_j$ in descending order, the cumulative sum of percentages $c_j$ is given by:

$c_1 = 100$, $c_j = p_j + \ldots + p_m$, $c_m = p_m$ \hfill (9)

When $c_k < H_3$, $C_{k-1} \geq H_3$, the integer values $n_k$, $n_{k+1}$, ... $n_m$ can be discarded from further analysis, where $H_3$ is a user defined parameter. The user defined parameters, $H_1$, $H_2$, and $H_3$ can be assigned the values 2.5%, 0.5%, and 0.5%, respectively.

Blocks 2308, 2314 and 2316 comprise normalcy analysis for the multinomial data 2304 represented by block 410 in FIG. 4. In block 2308, the routine "period detector" described above with reference to FIG. 5 is called to identify periodic multinomial data 2310 and non-periodic multinomial data 2312, which are then subject to determination of normalcy bounds for the periodic multinomial data 2314 and determination of normalcy bounds for the non-periodic multinomial data 2316, respectively. Note that while constructing the footprint matrix in block 2308, instead of using the percentages of data in every grid cell as described above with reference to FIG. 5, the cumulative sum of percentage values $c_k$, described in Equation (9), are used to construct the footprint matrix. In block 2314 and 2316, when multinomial data is periodic, the normalcy set for similar columns are calculated as follows. Data points in similar columns are collected and new values for the numbers $c_k$ are calculated. When $c_{k+1} < H$, $c_k \geq H$, the values $n_1$, $n_2$, ..., $n_k$ are the most probable set (i.e., normalcy set) of similar columns, where H is a user defined parameter, typically equal to about 20%. When data is determined to be non-periodic, the numbers $c_k$ are calculated for all data points and the normalcy set is determined similarly.

Figure 24:
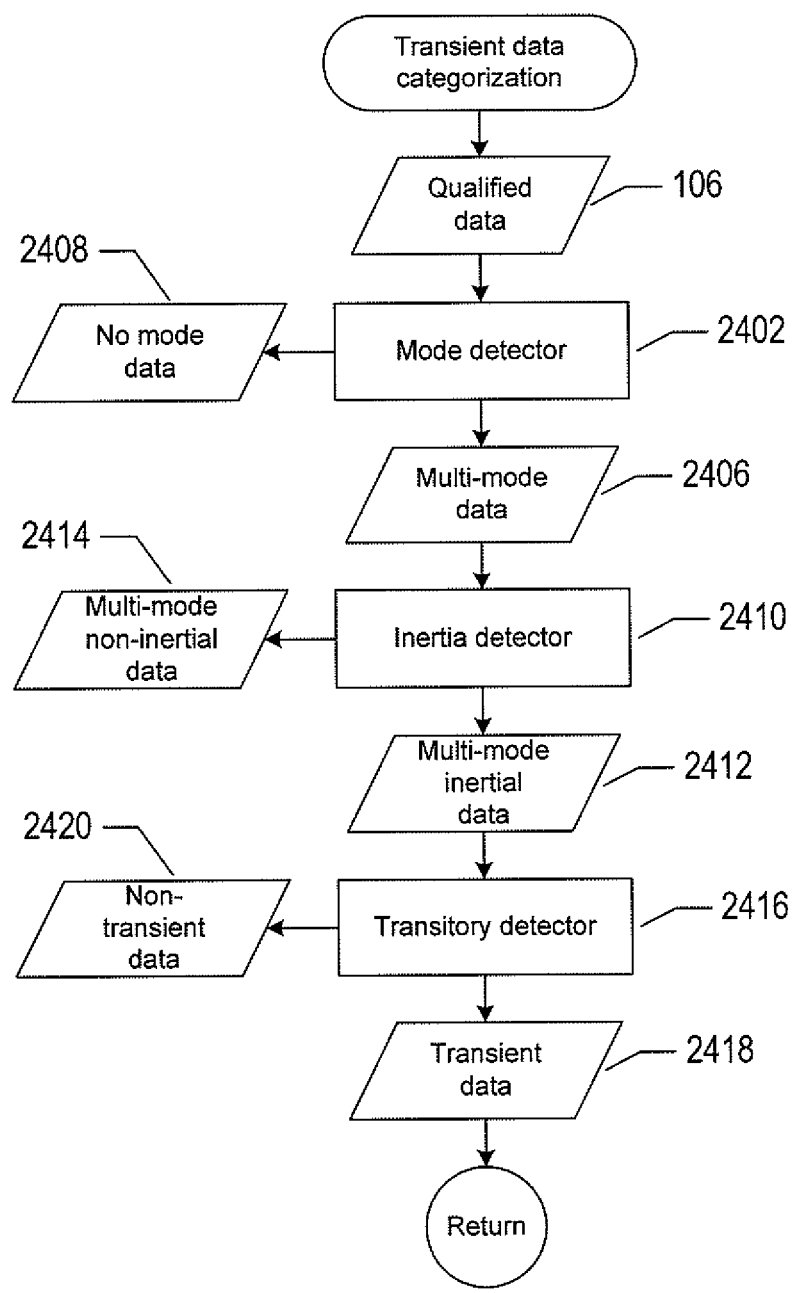
FIG. 24 shows a flow-control diagram of a method for transient data categorization called in block 402 of FIG. 4.

Returning to FIG. 4, in block 402, the routine "transient data categorization" is called. FIG. 24 shows a flow-control diagram of a method for transient data categorization called in block 402 of FIG. 4. Transient data can be described in terms of a transformation operator that converts the original qualified time series data into a different type of time series data for which the final categorization can be performed. Normalcy bounds of the transient data are determined for different data characteristics, such as range, variability, and distribution/structure. The concept of transiency is that a transformation operator, denoted by T, transforms original qualified time series data, denoted by Y(t), into different time series data, denoted by X(t), as follows:

$T: Y(t) \to X(t)$ \hfill (10)

The operator T can be the identity operator E (i.e., T≡E):

$E: Y(t) \to Y(t)$ \hfill (11)

which represents the case where no transformation is performed. Two different types of operators T can be used. The operator T can be a point-wise operator or a time-window operator. The identity operator actually is an example of a point-wise operator. The differentiation operator (or its discrete analogue which reveals the variability of data) is also an example of point-wise operator. Smoothing operators are examples of time-window operators. The time series data Y(t) is called transient in terms of operator T when the transformed data X(t) is transient. Transiency of X(t) can be confirmed by checking multimodality of the data, inertia of each mode of the data, and randomness of modes appearing along the time axis. Normalcy bounds for the transient data are determined separately for each mode as described in the flow-control diagram shown in FIG. 26. In block 2402, a mode detector checks the multimodality of the qualified data 106 and separates the qualified data 106 into multimode data 2406 and no mode data 2408 that may be discarded. Transient data has at least two modes. A mode that corresponds to lower data values is called low mode ("LM") data, and a mode that correspond to higher data values is called high mode ("HM") data. When the data is multimodal, the lowest of the data values is the LM data and the other modes correspond to HM data. In block 2410, the multimode data is separated in multi-mode data with inertia 2412 and multi-mode data with no inertia 2414. Inertia refers to data that maintains are range of values for a period of time before switching to a different range of values. In other words, inertia can be associated with the time duration that data points remain in the selected mode. For example, the data cannot oscillate from one mode to the other too quickly.

FIGS. 25A-25C show example plots of three types of bimodal data. FIG. 25A shows an example plot of bimodal data without a random distribution of modes along the time axis. FIG. 25B shows an example plot of bimodal data without inertia of data points. FIG. 25C shows an example plot of transient data. The data plotted in FIG. 25B is an example of multimode data (i.e., modes 1 and 5) without mode inertia. Because the LM data and HM data oscillate between 1 and 5, neither the LM data nor the HM data exhibit inertia with respect to either of the modes. By contrast, FIGS. 25A and 25 show examples of data with inertial modes. For example, in FIG. 25A, the LM data are between 1 and 2 for a period of time ranging from 0 to about 38 and HM data is between 9 and 12 for time greater than about 38. FIGS. 25B and 25C show examples of data with modes that randomly interchange over time. On the other hand, the data in FIG. 25A is piecewise-stable data with discoverable change points.

Returning to FIG. 24, in block 2410, the multi-mode data is searched for intervals of sparse data values and for data with some inertia concentrated in upper and lower regions of the intervals. Let numbers a, b satisfy the condition:

$$x_{min} \leq a < b \leq x_{max} \quad (12)$$

where $x_{min}$, $x_{max}$ are minimum and maximum data values, respectively, in an interval of sparse data. The numbers a and b divide the interval $[x_{min},x_{max}]$ into three regions $A \overset{def}{=} [x_{min},a]$, $B \overset{def}{=} (a,b)$, and $C \overset{def}{=} [b,x_{max}]$. Transition probabilities are given by:

$$p_{A \to A} = \frac{N_{A \to A}}{N_A} \quad (13a)$$

$$p_{B \to B} = \frac{N_{B \to B}}{N_B} \quad (13b)$$

$$p_{C \to C} = \frac{N_{C \to C}}{N_C} \quad (13c)$$

where $N_A$ is the number of data points in $[x_{min}, a)$;
$N_B$ is the number of data points in $[a,b]$;
$N_C$ is the number of data points in $(b,x_{max}]$;
$N_{A \to A}$ is the number of points with the property $x(t_i) \varepsilon A$ and $x(t_{i+1}) \varepsilon A$;
$N_{B \to B}$ is the number of points with the property $x(t_i) \varepsilon B$ and $x(t_{i+1}) \varepsilon B$;
and
$N_{C \to C}$ is the number of points with the property $x(t_i) \varepsilon C$ and $x(t_{i+1}) \varepsilon C$.

Starting from the highest possible position and shifting the region B to the lowest possible position, the three transition probabilities are calculated and the procedure is stopped when the following conditions are satisfied:

$$p_{A \to A} > H, \ p_{C \to C} > H, \ P_{B \to B} < h, \text{ and } N_A, N_C \gg 1 \quad (14)$$

where the numbers H and h are user, predefined parameters. For example, H=0.75 and h=0.25. If this process ends without finding the time interval, the region B is narrowed and the procedure is repeated. Alternatively, the interval $[x_{min}, x_{max}]$ can be divided into N+1 equally spaced subintervals given by:

$$x_{min} < x_1 < x_2 < \ldots < x_N < x_{max} \quad (15)$$

and check sequentially each of the following subintervals according to Equations (13a)-(13b) with the conditions given in Equation (14):

$$(x_{min},x_N),(x_1,x_{max}),(x_{min},x_{N-1}),(x_1,x_N),(x_2, x_{max}), \ldots ,(x_{min},x_1),(x_1,x_2), \ldots ,(x_N,x_{max}) \quad (16)$$

When an interval that satisfied the conditions in Equation (14) is found the procedure stops. The procedure may also be repeated for the lowest (A) region and the highest (C) region for finding new inertial modes if data is supposed to be multi-modal. If the interval is not found then the data is without inertial modes in terms of the given resolution. Now suppose that M inertial modes are found for the regions given by:

$$A_1 = [a_1, b_1], \ldots, A_M = [a_M, b_M] \quad (17)$$

In block 2416, for each inertial mode, the transiency is determined in order to separate the multi-mode data with inertia into transient data 2418 and non-transient data 2420. Transient data have periods where the LM data and the HM data randomly interchange over time. One of the found inertial modes is selected, and other data points outside of this region are deleted. Data points in the mode are denoted by $x(t_k)$. Suppose that time intervals with $\Delta t_k \leq c\Delta t$ are normal data intervals and time interval with $\Delta t_k > c\Delta t$ are gaps in the time interval, where $\Delta t$ is the monitoring time described above in Equation (5) and the constant c is a predefined parameter for gap determination. It is assumed that for transient data the gaps are substantially uniformly distributed along the time axis, which can be checked by applying the transition probabilities given in Equations (13a)-(13c). Let $T_k$ be the duration (in milliseconds, seconds, minutes, etc., but in the same measures as the monitoring time) of the kth gapless data portion. For data without gaps only one portion exists and $T_k = t_N - t_1$. The sum $T = \Sigma_{k=1}^{N_T} T_k$ is the duration of the gapless data, where $N_T$ is the number of gapless data portions. Let $G_k$ be the duration (in the same measures as $T_k$) of the kth gap. The sum $G = \Sigma_{k=1}^{N_G} G_k$ is the duration of gaps in the data, where $N_G$ is the number of gap portions. As a result, $G+T = t_N - t_1$. The percentage of gaps in the data is given by:

$$\rho = \frac{G}{G+T} 100\% \quad (19)$$

where $p_{11}$, $p_{10}$, $p_{00}$, $p_{01}$ are the probabilities of data-to-data, data-to-gap, gap-to-gap and gap-to-data transitions, respectively, and are given by $$p_{11} = 1 - \frac{N_T}{\frac{T}{\Delta T}}, \ p_{10} = 1 - p_{11}, \ p_{00} = 1 - \frac{N_G}{G/\Delta t}, \text{ and} \quad (20)$$

$$p_{01} = 1 - p_{00}$$

When at least two inertial modes satisfy the following conditions:

$$\rho > P, \ p_{10} > \varepsilon, \ p_{01} > \varepsilon \quad (21)$$

where P and ε are user defined parameters, the multi-mode inertial data 2412 is transitory data 2418, otherwise, the multi-mode inertial data is non-transient data 2420.

Figure 26:
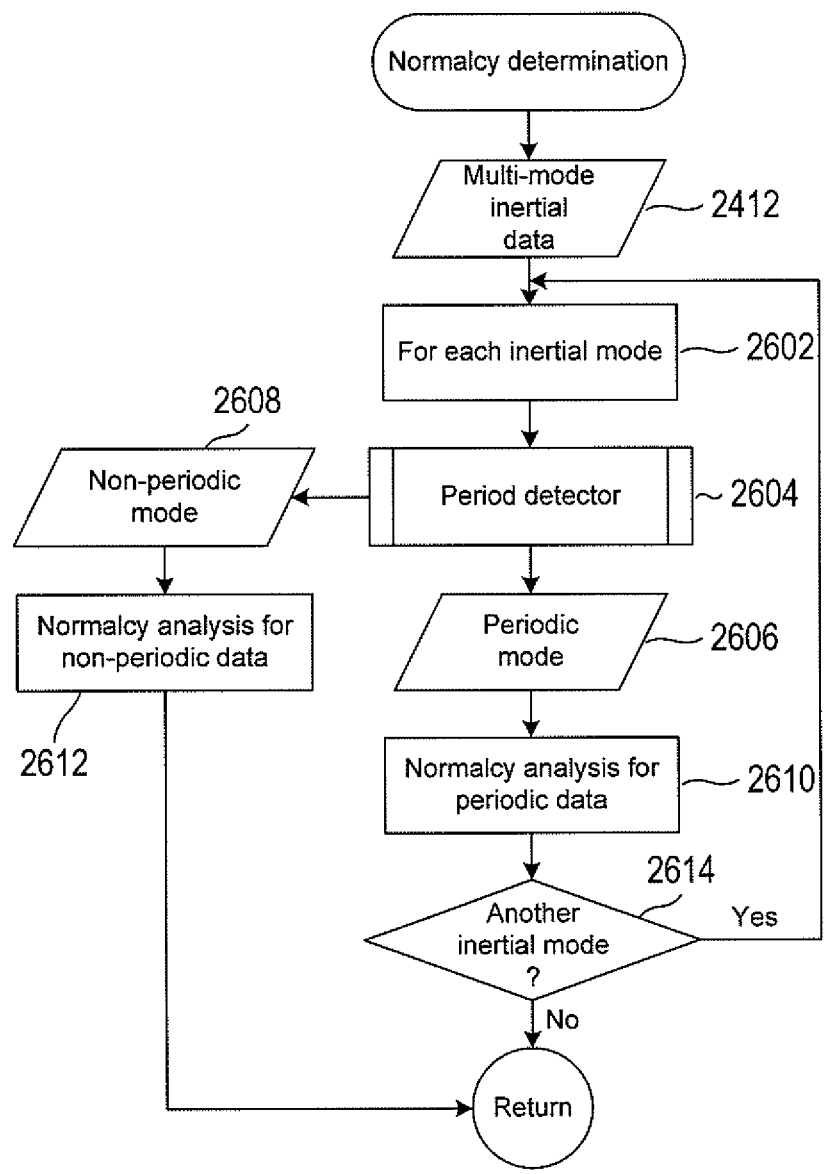
FIG. 26 shows a flow-control diagram of a method for normalcy analysis.

FIG. 26 shows a flow-control diagram of a method for normalcy analysis of multi-mode inertial data represented by block 410 in FIG. 4. In block 2602, for each inertial mode in the multi-mode inertial data 2412, the operations associated with blocks 2604, 2610, and 2610 are repeated. Different inertial modes can have different normalcy bounds. In block 2604, period detector described above with reference to FIG. 5 is used to check the existence of periodicity in a given mode. When the mode is periodic 2606, normalcy analysis 2610 is used to determine normalcy bounds along the found cycles, as described above with reference to FIG. 5. On the other hand, when the inertial mode is non-periodic different statistical measures are applied for normalcy analysis 2612. The following description is directed to normalcy analysis of non-periodic, multi-mode inertial data 2608. Normalcy bounds can be set in terms of different statistical measures, including data range, distribution, and duration. The statistical measures can be calculated and used simultaneously for abnormality detection and the information can be stored in a binary vector:

$$\alpha = (\alpha_1, \ldots, \alpha_s) \quad (22)$$

where $\alpha_j$ is either 0 or 1. When $\alpha_j = 0$ the jth statistical measure for abnormality detection is not calculated. When $\alpha_j = 1$ appropriate normalcy bounds for the jth statistical measure are calculated. Different modes may require different settings for the vector α. When no normalcy determination is wanted for a certain modes, all of the $\alpha_j$'s may be set to 0. The methods for process calculating normalcy bounds for statistical measures data range, distribution, and duration are now described. Normalcy bounds for the statistical measure data range are calculated as follows. Because each detected mode $A_j$ can be characterized by the interval $[a_j, b_j]$, the interval can be interpreted as a normalcy region for the jth mode. The interval $[a_j, b_j]$ can be divided into N+1 equally spaced intervals represented by:

$$a_j < x_1 < x_2 < \ldots < x_N < b_j \quad (23)$$

and check sequentially the subintervals $$[x_N, b_j], [x_{N-1}, b_j], [x_{N-2}, b_j], \ldots, [x_1, b_j] \quad (24)$$

by calculating transition probabilities $p_{A \to A}$, where A is the region corresponding to the given interval. Subintervals for which $p_{A \to A} < 0.1$ are discarded. Performing similar calculations and eliminations for intervals $$[a_j, x_1], [a_j, x_2], [a_j, x_3], \ldots [a_j, x_{N1}] \quad (25)$$

gives strict normalcy bounds $[a'_j, b'_j]$, where $$a_j \leq a' < b' \leq b_j \quad (26)$$

Normalcy bounds for the duration statistical measure are calculated as follows. Let $T_k$ be duration of the kth gapless data portion of the jth mode, then from whisker's method, the normalcy bounds for durations of the jth mode is given by:

$$[q_{0.25}(T_k) - 1.5 iqr(T_k), q_{0.75}(T_k) + 1.5 iqr(T_k)] \quad (27)$$

Normalcy bounds for the distribution statistical measure are calculated as follows. Let $C_k^j$ be a distribution of a kth gapless data portion (provided this portion has enough statistics for distribution calculation) of the jth mode. Distances $E_k = d(C_{k_1}^j, C_{k_2}^j)$ are calculated according to Equation (7) between all distributions by some measure (e.g. by mean square distance). As a result, the normalcy bounds for the interval $E_k$ can be calculated from whisker's method as follows:

$$[q_{0.25}(E_k) - 1.5 iqr(E_k), q_{0.75}(E_k) + 1.5 iqr(E_k)] \quad (28)$$

In on-line mode, when enough statistics are available for distribution calculation, the corresponding distances $\varepsilon_k$ between historical distributions and current distribution can be calculated. On-line or run-time mode refers to anomaly detection when the decision on the system abnormality state is made for real-time data monitoring. The median of $\varepsilon_k$ compared with normalcy bounds demonstrates the abnormality of the current process. Normalcy bounds for the variability statistical measure are calculated as follows. Let $x_k$ be data points of the sth gapless portion of the jth mode. The variability of the sth portion is given by:

$$R_s = \frac{iqr(\{x'_k\}_{k=1}^{N-1})}{iqr(\{x_k\}_{k=1}^{N})} 100\% \quad (29)$$

where $iqr(\{X_k\}_{k=1}^N) \neq 0;$ $x_k'$ are the absolute jumps of data points; and $x_k' = |x_{k+1} - x_k|.$ The normalcy bounds for the interval $R_s$ can be calculated from whisker's method to give:

$$[q_{0.25}(R_s) - 1.5 iqr(R_s), q_{0.75}(R_s) + 1.5 iqr(R_s)] \quad (30)$$

for the jth mode. In block 2614, when another inertial mode is available, the operations associated with blocks 2604, 2610, and 2612 are repeated.

Figure 27A:
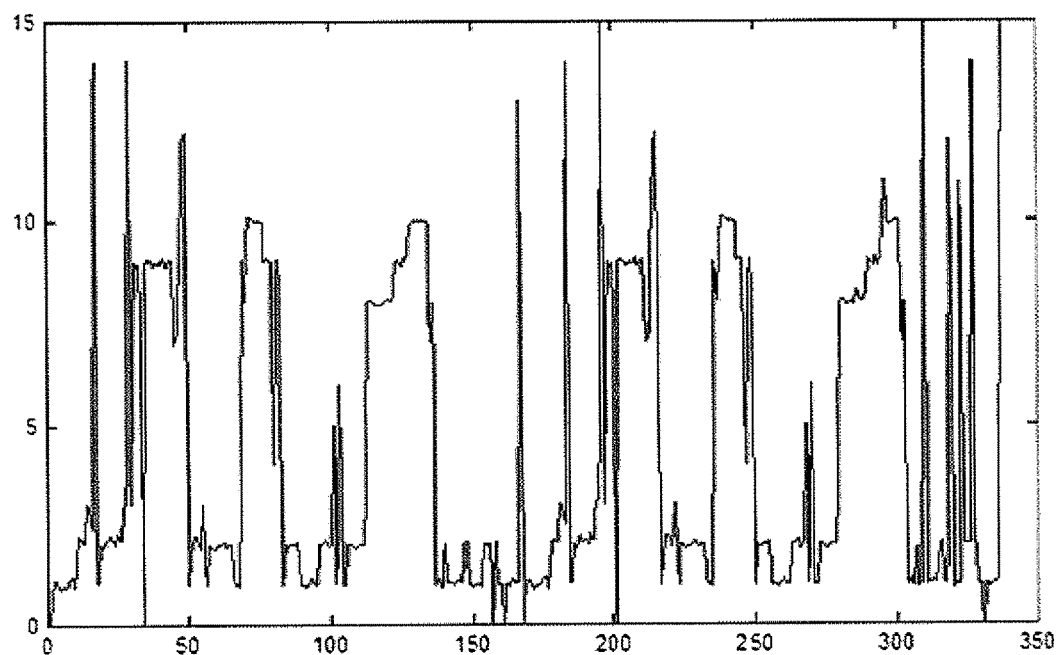
FIGS. 27A-27V show plots of experimental results for an example set of bimodal data.
Figure 27B:
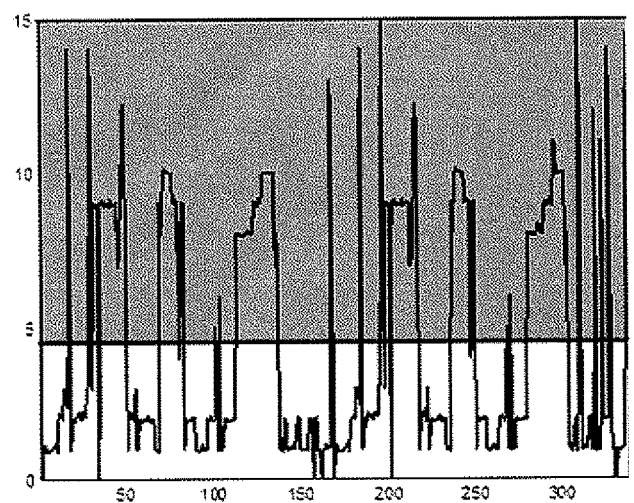
Figure 27C:
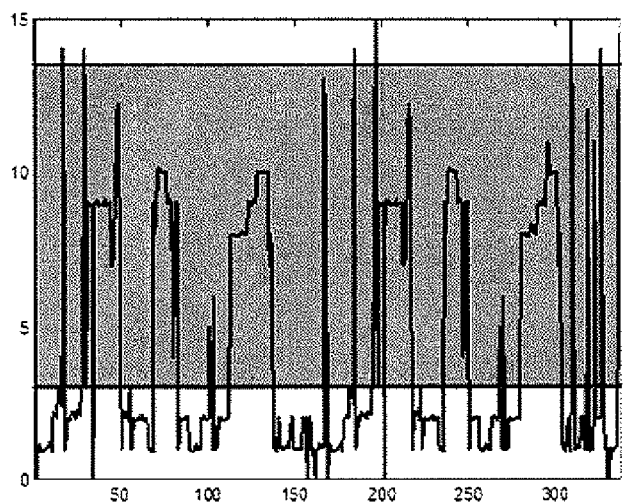
Figure 27D:
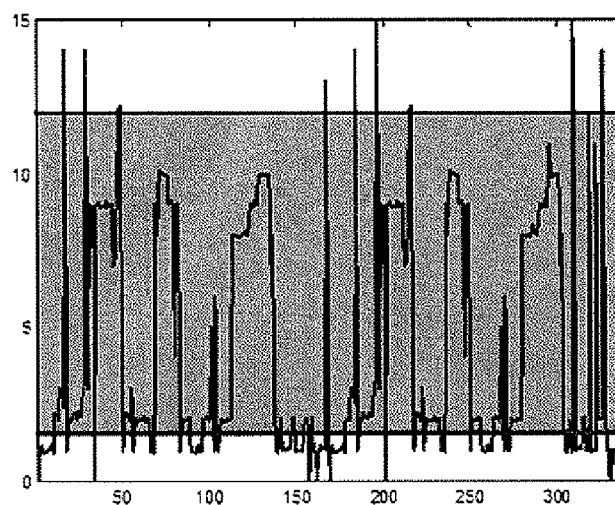
Figure 27E:
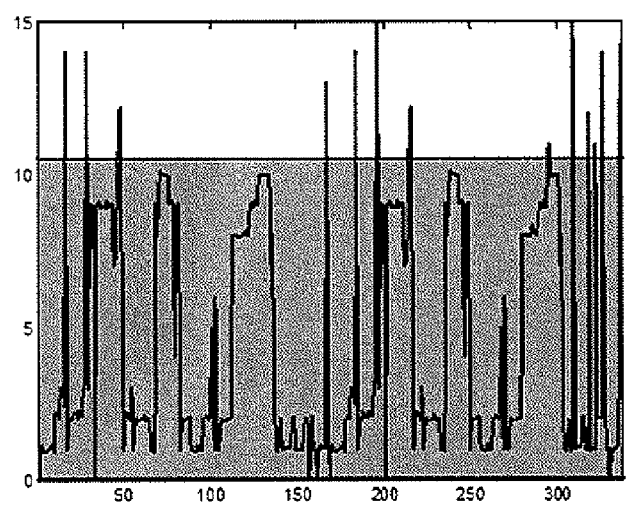
Figure 27F:
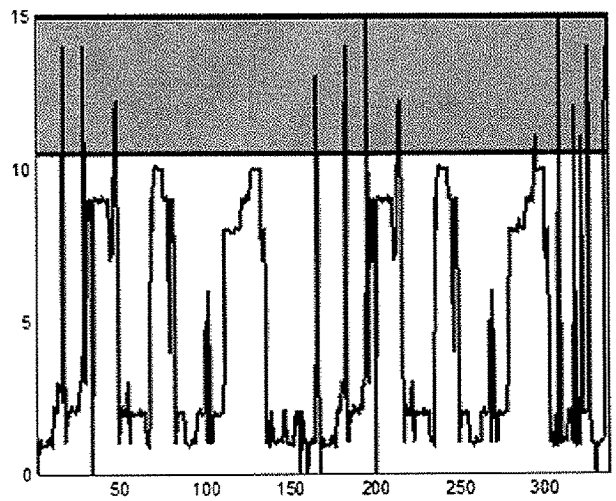
Figure 27G:
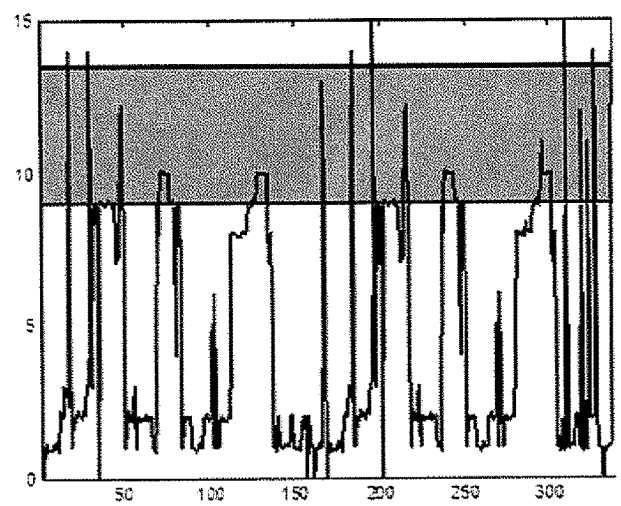
Figure 27H:
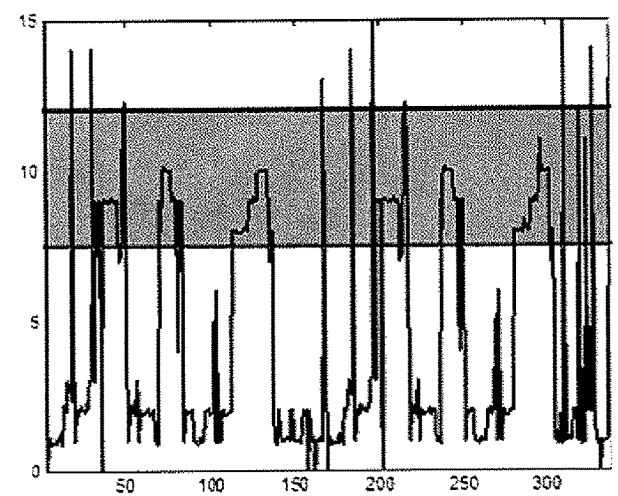
Figure 27I:
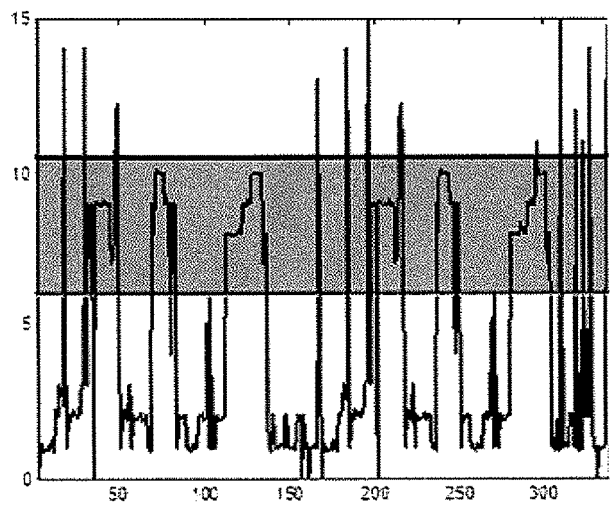
Figure 27J:
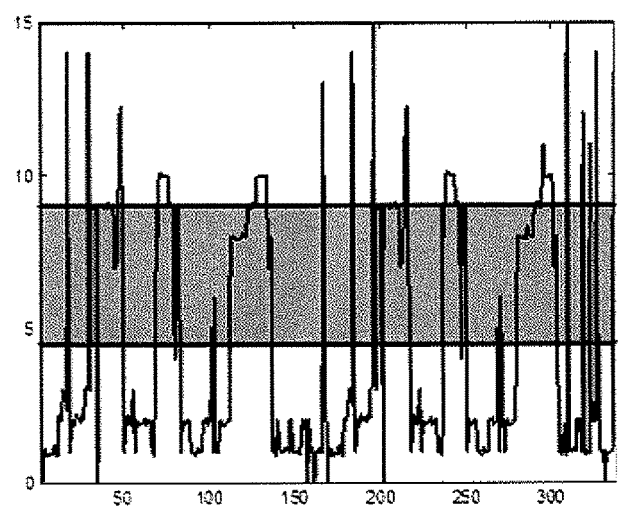
Figure 27K:
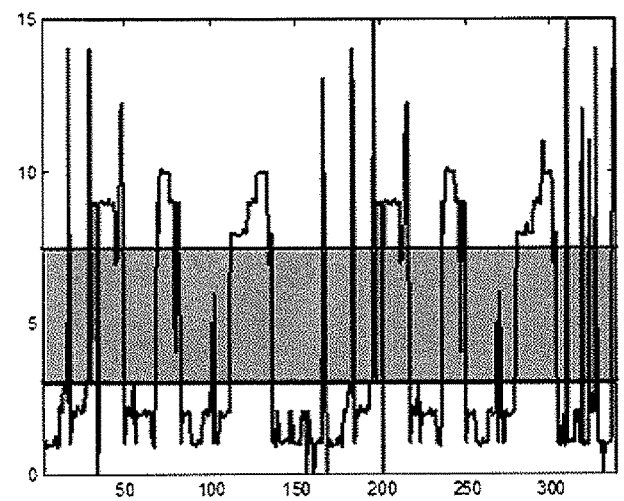
Figure 27L:
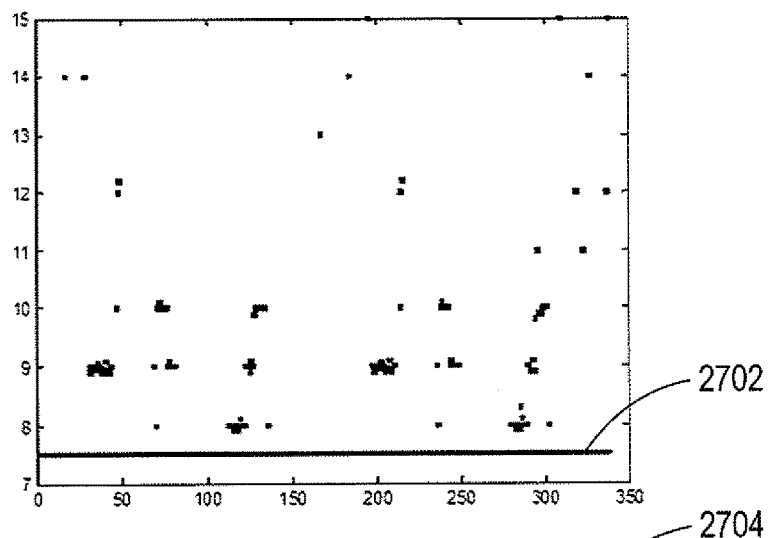
Figure 27M:
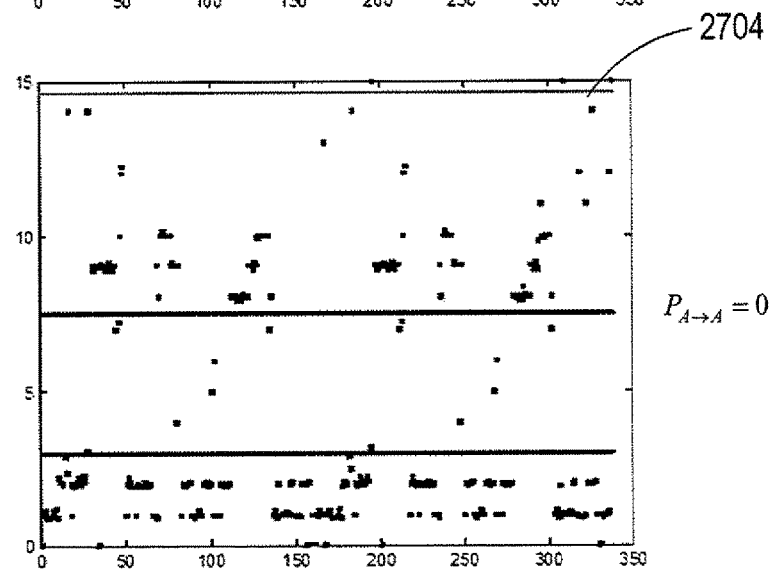
Figure 27N:
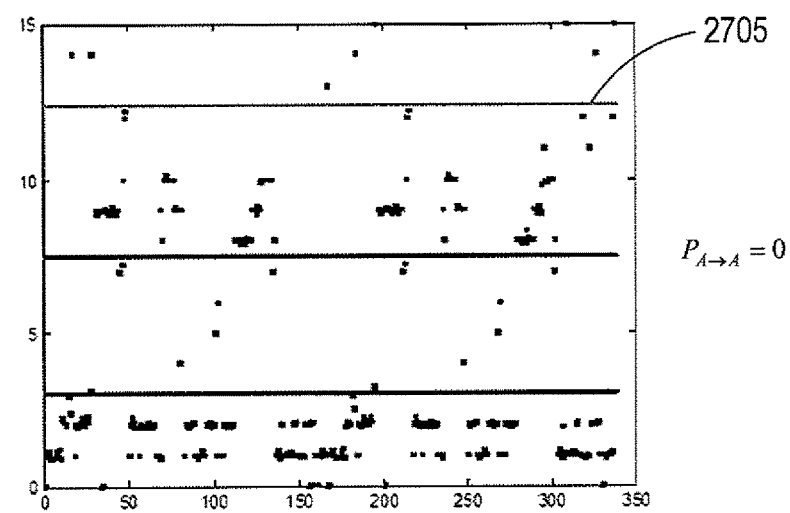
Figure 27O:
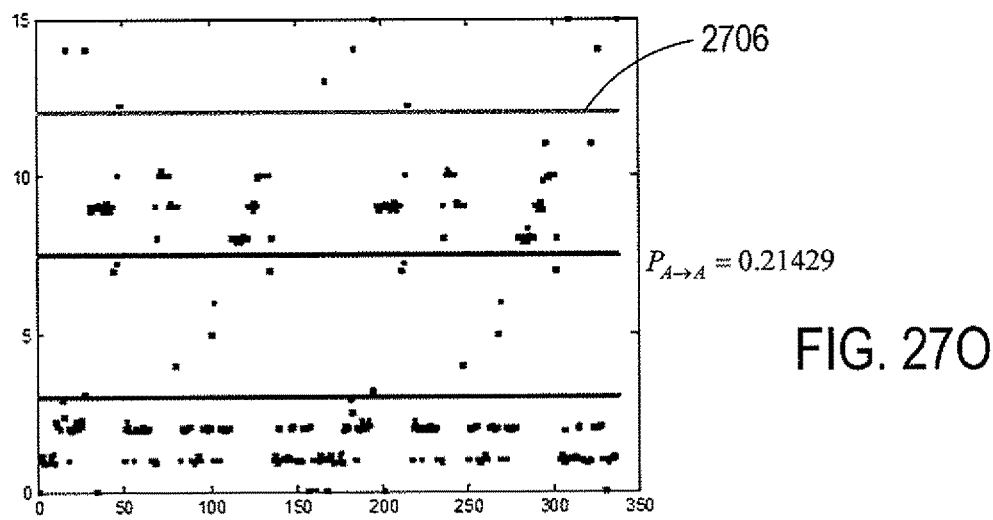
Figure 27P:
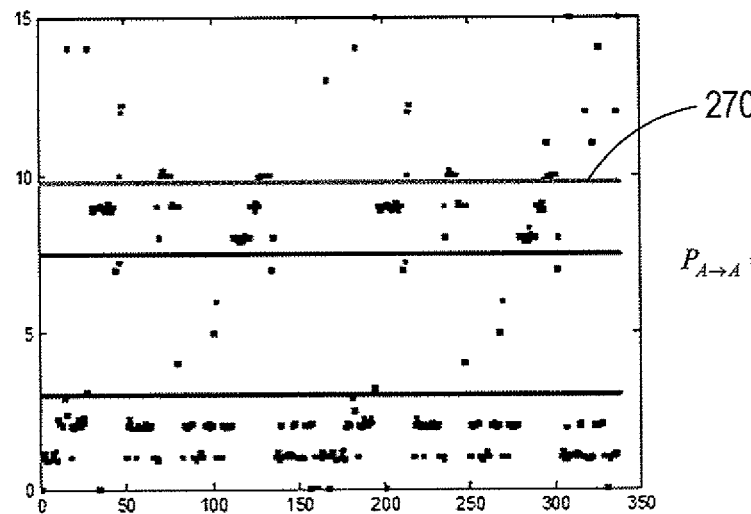
Figure 27Q:
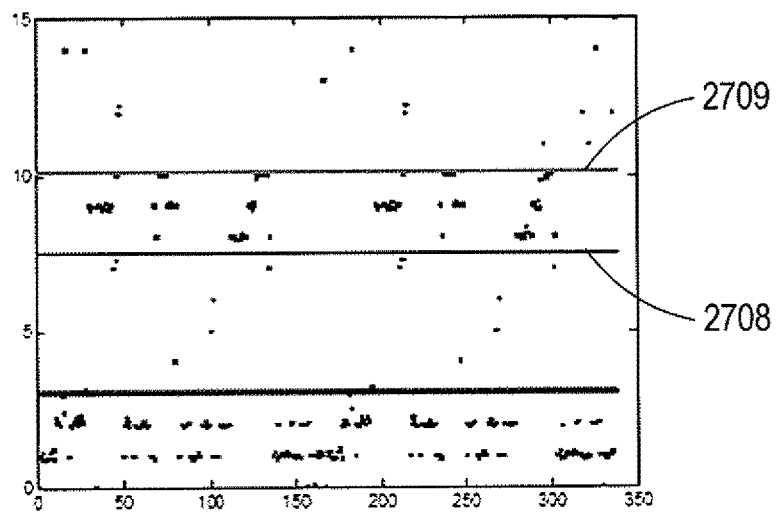
Figure 27R:
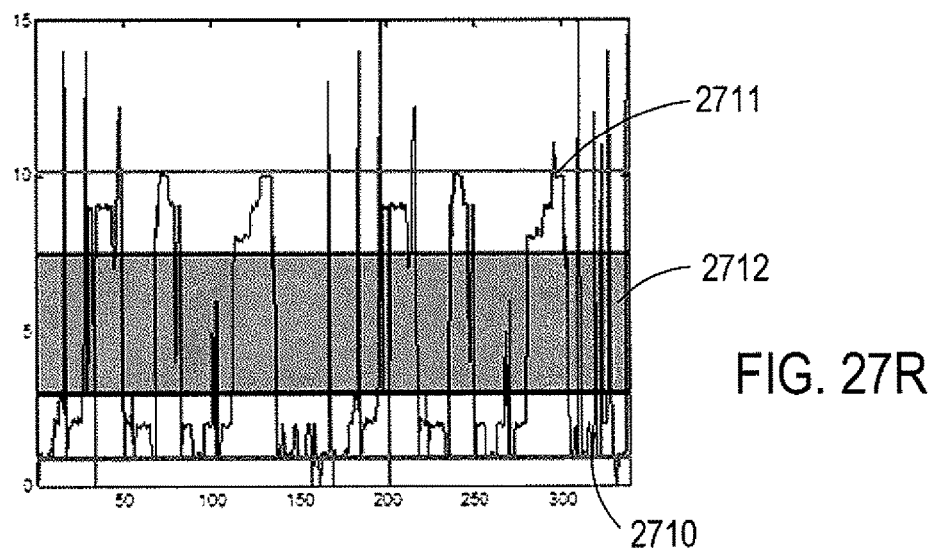
Figure 27S:
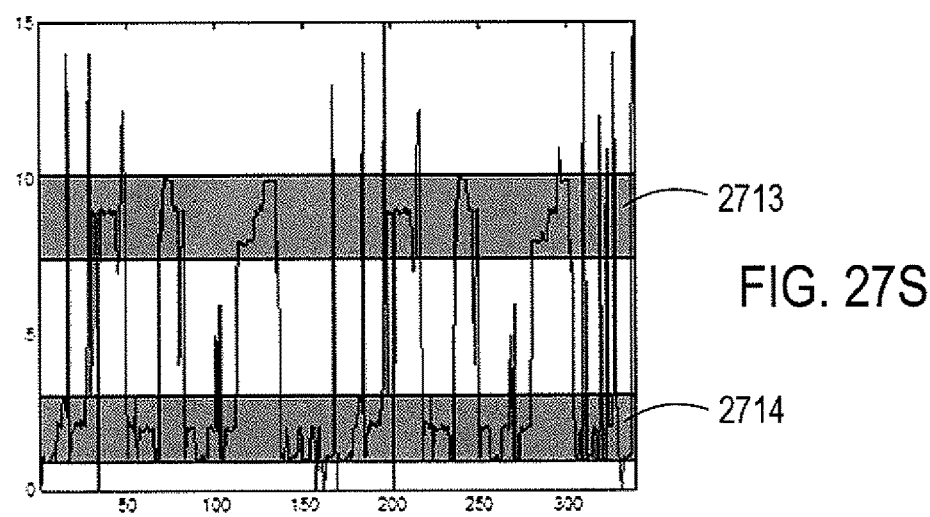
Figure 27T:
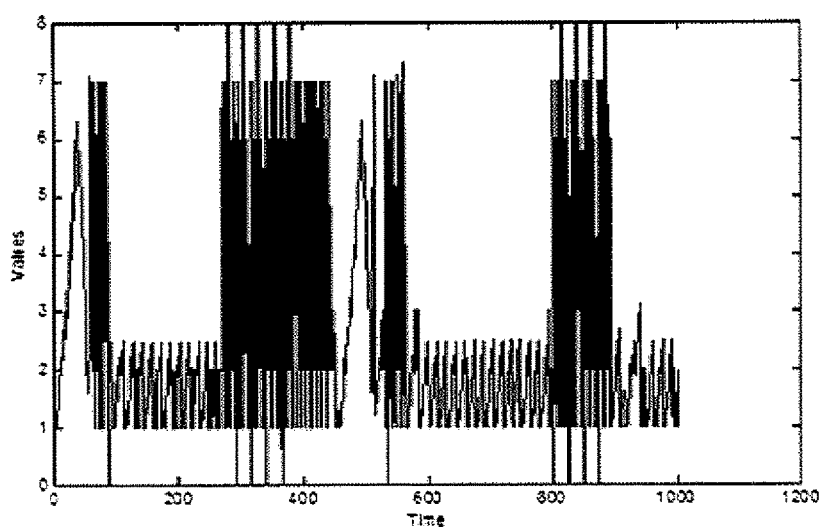
Figure 27U:
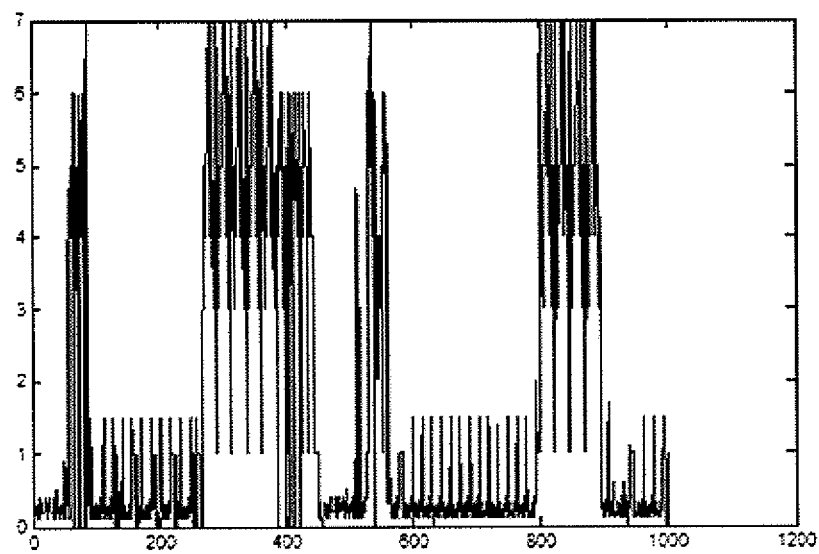
Figure 27V:
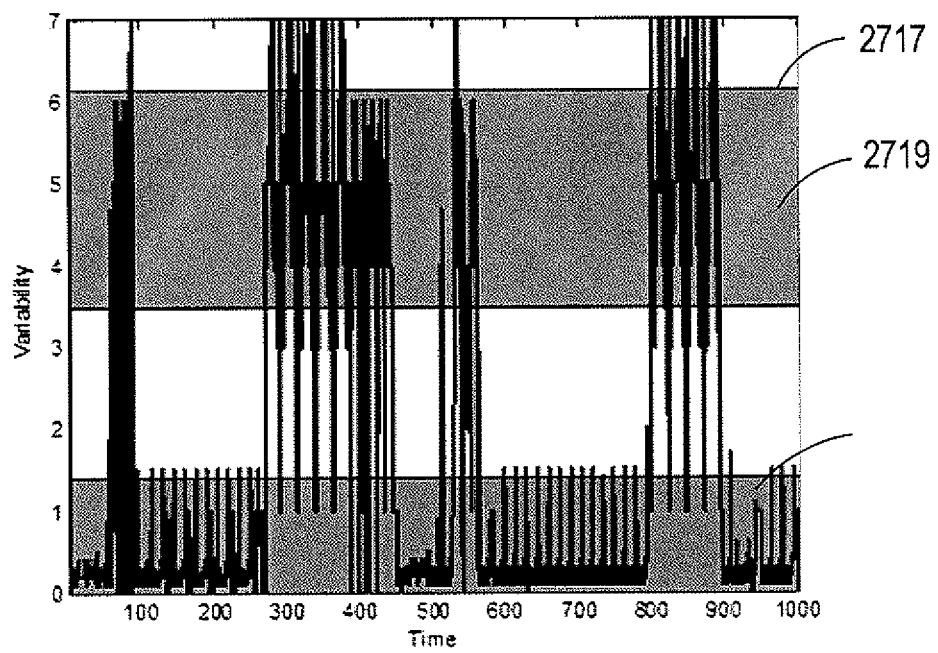

FIGS. 27A-27V show plots of experimental results for an example set of bimodal data displayed in FIG. 27A. FIGS. 27B-27E show different [a,b] data value intervals represented by shaded rectangles with tables of corresponding transition probabilities calculated according to Equations (13a)-(13c). No inertial modes are present with this resolution for the [a,b] intervals selected in FIGS. 27B-27E. FIGS. 27F-27K show different [a,b] intervals with tables of corresponding transition probabilities calculated according to Equations (13a)-(13c). The transition probabilities for the [a,b] intervals in FIGS. 27F-27K are collected and displayed in Table 3.

TABLE 3

| P_CC | 0 | 0 | 0.21429 | 0.1875 | 0.58108 | 0.7913 | x | x |
|---|---|---|---|---|---|---|---|---|
| P_BB | 0.15385 | 0.59091 | 0.85149 | 0.89524 | 0.54902 | 0.125 | x | x |
| P_AA | 0.95963 | 0.91638 | 0.89238 | 0.90783 | 0.88732 | 0.90338 | x | x |
| b | 15 | 13.5 | 12 | 10.5 | 9 | 7.5 | 6 | 4.5 |
| a | 10.5 | 9 | 7.5 | 6 | 4.5 | 3 | 1.5 | 0 |

The seventh column of the data displayed in Table 3 reveals an interval[3,7.5] (see FIG. 27K) with a small transition probability $P_{B \to B}=0.125$ while transition probabilities for upper and lower regions are $P_{C \to C}=0.7913$ and $P_{A \to A}=0.90338$, respectively, which are indicators of inertial modes.

For transiency checking according to block 2416 described above, calculations were performed for an estimated monitoring time of $\Delta t=1$ minute. As a result, every duration time of 5 minutes or more in an interval without data points is considered a gap. The percentage of gaps calculated according to Equation (19) is $\rho=62.3\%$ and the probabilities given by Equations (20) are $$p_{11}=0.93, p_{10}=0.067, p_{00}=0.965, p_{01}=0.035$$

Therefore, the data is bimodal transient according to the given resolution.

FIGS. 27M-27Q show plots of data used in the determination of normalcy bounds for upper and lower inertial modes. In FIG. 27L, the upper region is the interval [7.5,15] identified by a line 2702 that corresponds to the value 7.5. In FIGS. 27M-27P, lines 2704-2707 represent values for the constant c described above with reference to Equation (18). For data values greater than corresponding lines 2704-2707, transition probabilities $p_{A \to A}$ are displayed for the intervals [c,15], $7.5 \le c < 15$ in Table 4.

TABLE 4

| $p_{A \to A}$ | 0 | 0 | 0 | 0 | 0 | 0 | 0 |
|---|---|---|---|---|---|---|---|
| c | 15 | 14.625 | 14.25 | 13.875 | 13.5 | 13.125 | 12.75 |
| $p_{A \to A}$ | 0.21 | 0.21 | 0.21 | 0.19 | 0.19 | 0.19 | 0.63 |
| c | 12.375 | 12 | 11.625 | 11.25 | 10.875 | 10.5 | 10.125 |
| $p_{A \to A}$ | 0.63 | 0.58 | 0.74 | 0.73 | 0.79 | 0.79 | 0.79 |
| c | 9.75 | 9.375 | 9 | 8.625 | 8.25 | 7.875 | 7.5 |

Eliminating all regions with probabilities $p_{A \to A} \le 0.25$ gives the normalcy region [7.5,10.125] also identified in FIG. 27Q by lines 2708 and 2709. Similar calculations for the lower region lead to FIG. 27R where lines 2710 and 2711 represent the normalcy bounds and shaded interval 2712 represents an intermediate region within the inertial modes. FIG. 27S shows the normalcy regions 2713 and 2714 for the lowest and highest inertial modes. FIG. 27T shows another example of bimodal experiments. Computational experiments show that the data represented in FIG. 27T is not transient, because the upper mode is not inertial in terms of the identity operator, but it is transient in terms of the differentiator operator. FIG. 27U shows a plot of X(t) after differentiation of the data represented in FIG. 27T, which gives bimodal data. FIG. 27V shows associated normalcy bounds represented by lines 2716 and 2717 and inertial modes with normalcy regions 2718 and 2719 for the data displayed in FIG. 27U.

Figure 28:
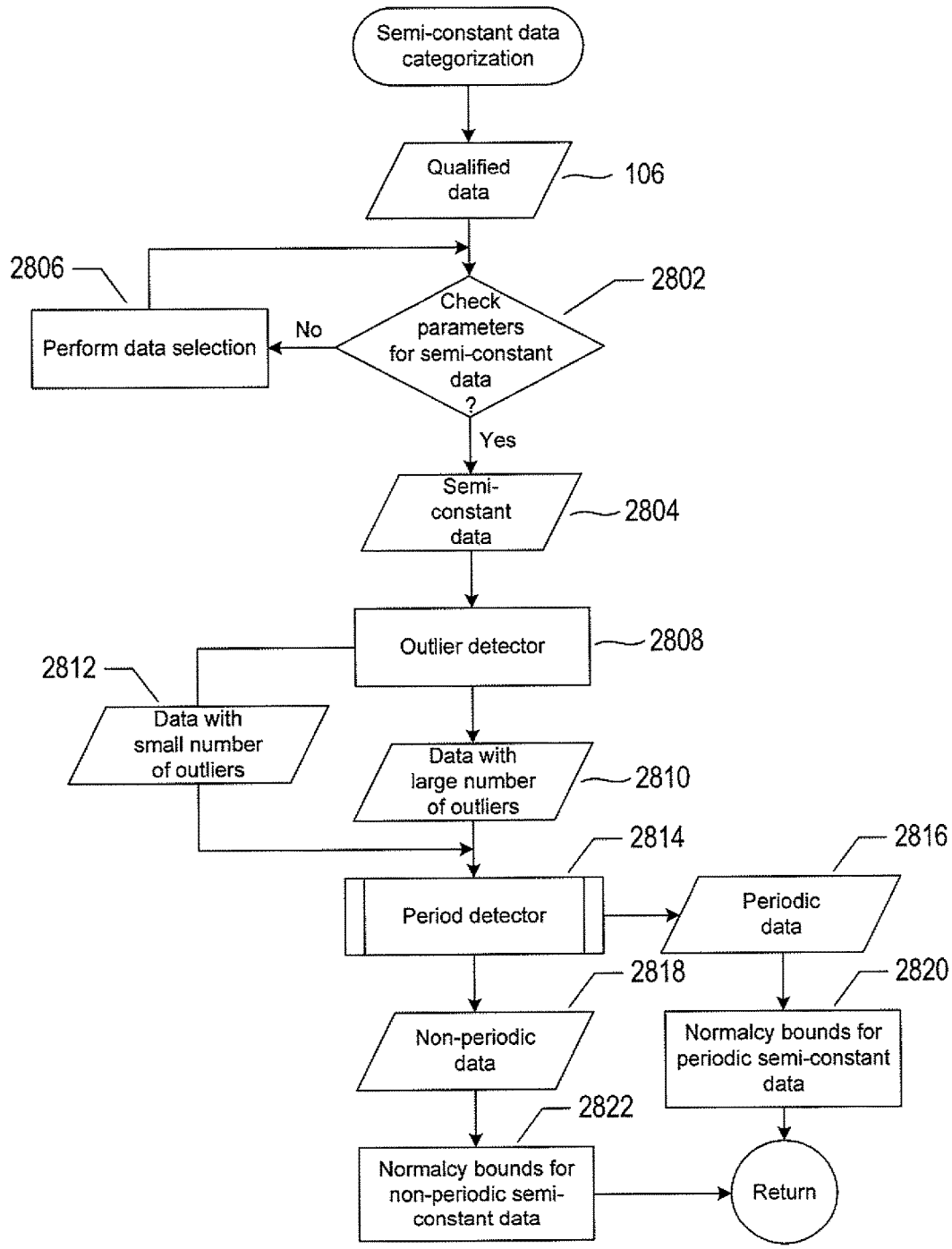
FIG. 28 shows a flow-control diagram of a method for semi-constant data categorization called in block 403 of FIG. 4.

Returning to FIG. 4, in block 403, a routine "semi-constant categorization" is called. FIG. 28 shows a flow-control diagram of a method for semi-constant data categorization called in block 403 of FIG. 4. In block 2802, the qualified data 106 is considered semi-constant data 2804 when $$iqr(\{x_k\}_{k=1}^{N})=0 \tag{31}$$

where
N corresponds to data length; and
iqr stands for interquartile range of the qualified data $x_k=x(t_k)$.
Otherwise, control flows to block 2806 in which data selection is performed to search the qualified data 106 for the longest data portion of the data that is semi-constant. In particular, block 2806 performs an iterative data selection process by cutting off the last portion of data and returning the data back to block 2802. When this iterative process between blocks 2802 and 2806 fails to reveal semi-constant data, the qualified data 106 is considered non-semi-constant data. In other words, when after cutting the next portion of the remaining data has insufficient statistics or when the remaining data is shorter than some user defined smallest portion, control flows to block 2808. Formally, in block 2802, when $$iqr(\{x_k\}_{k=1}^{N}) \ne 0 \tag{32}$$

control flows to block 2806 where cut data $\{x_k\}_{k=m_0}^{N_0}$ is determined for $1 < m \le N_0 < N$. In block 2802, the interquartile range is calculated for $$s_m = iqr(\{x_k\}_{k=m}^{N_0}) \tag{33}$$

When $s_m=0$ for $m=m_0$ the cut data $\{x_k\}_{k=m_0}^{N_0}$ is semi-constant data and this portion of the qualified data 106 flows to the process in block 2808.

Figure 29A:
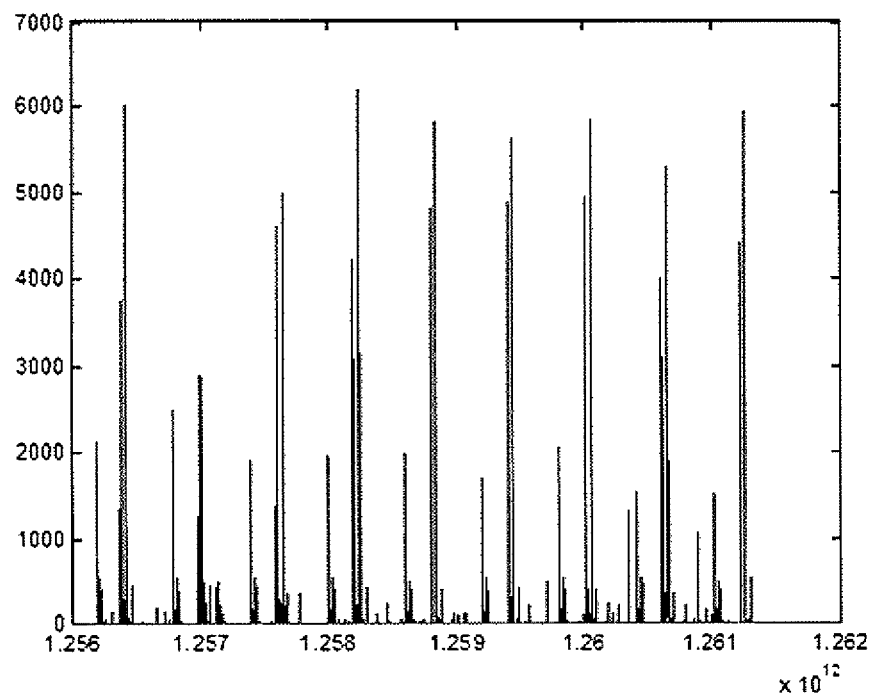
FIG. 29A shows an example plot of semi-constant data.
Figure 29B:
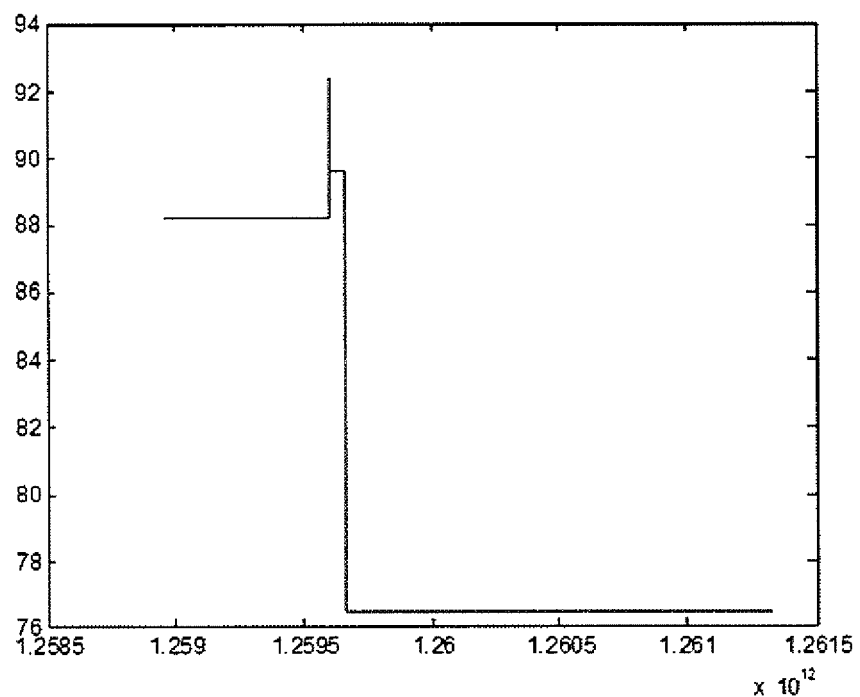
FIG. 29B shows an example plot of piecewise semi-constant data.

FIG. 29A shows an example plot of semi-constant data. The operations associated with blocks 2802 and 2806 can also identify piecewise semi-constant data. FIG. 29B shows an example plot of piecewise semi-constant data.

Figure 30:
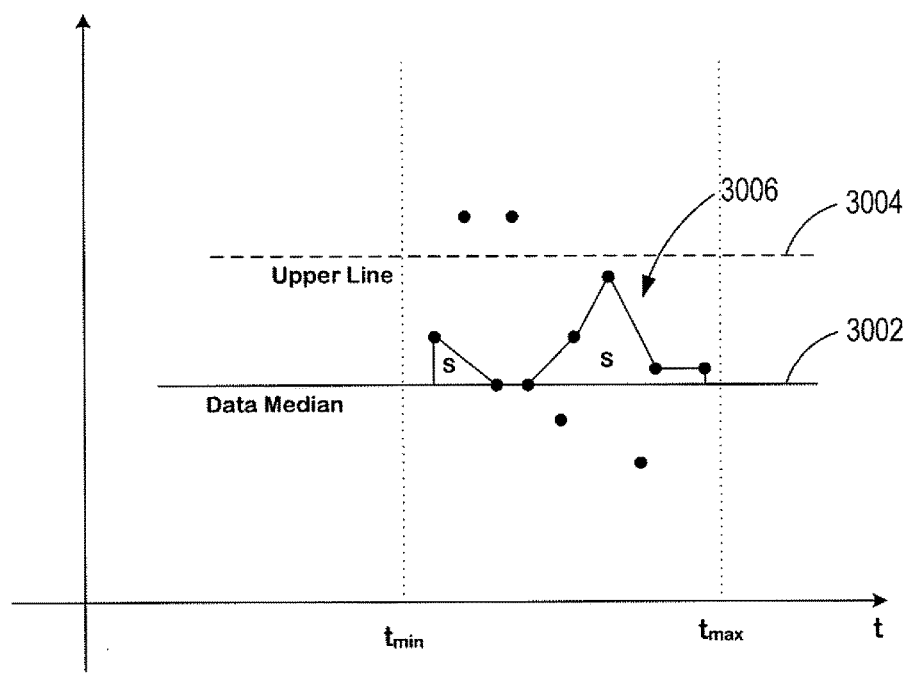
FIG. 30 shows an example plot of a number of data points between a median line and an upper line.

Returning to FIG. 28, blocks 2808, 2814, 2820, and 2822 are used to carry out normalcy analysis on the semi-constant data as described in block 410 of FIG. 4. In block 2808, outlier detection is used to check the percentage of outliers in the semi-constant data 2804. For semi-constant data every data point greater than $q_{0.75}$ or less than $q_{0.25}$ is identified as an outlier. When the percentage of outliers is greater than a user defined percentage $p\%$ (e.g., $p=15\%$), the semi-constant data is identified as semi-constant data with a large number of outliers 2810; otherwise, the semi-constant data is identified as semi-constant data with a small number of outliers 2812. The outlier data 2810 or 2812 is passed to block 2814 to identify periodic semi-constant data 2816. When no periods are detected, the semi-constant data is declared non-periodic data 2818. Periodicity analysis of outlier data 2810 in block 2814 is performed using the period detector described above with reference to FIG. 5, excluding the data points equal to the median of the original qualified data 106. In block 2820, normalcy bounds are determined for periodic semi-constant data 2816, and in block 2822, normalcy bounds are determined for non-periodic semi-constant data 2818. Normalcy bounds determination is performed separately for upper (for data points that are greater or equal to the median) and lower (for data points that are less than or equal to the median) parts of data. Because the computational operation for determining both upper and lower bounds are similar, for the sake of brevity, determination of the upper bound is now described. The process includes maximization of an objective function given by:

$$f(P, S) = e^{aP} \frac{S}{S_{max}} \tag{34}$$

where
$a > 0$ is a sensitivity parameter; and
P is the percentage of data points between the median of data and an upper line higher than the median.
The sensitivity parameter may be user selected. For example, the sensitivity parameter can be $a=0.9$. FIG. 30 shows an example plot of a number of data points between a median line 3002 and an upper line 3004. The denominator of equation (34) is given by:

$$S_{max}=(t_{max}-t_{min})(\text{Upper Line}-\text{Data Median}) \quad (35)$$

and the numerator S of Equation (34) is the square of the area within data points, such as data points 3006, and the data median 3002. In the data-range-based analysis, the range within the median line and maximum of the data is divided into m parts and for each level values $g_k$ for k=1, 2, ... m of the objective function are calculated. The level that corresponds to a maximum of $g_k$ is the upper bound. The same procedure is valid for determination of the lower bound with the minimum of $g_k$ corresponding to the lower bound. Instead of dividing the range into equal parts, the range can also be divided by corresponding quantiles that give unequal division according to the density of data points along the range. In the data-range-based approach, preliminary abnormality cleaning of data can also be performed. Data points with abnormal concentrations are removed in a given time window. Abnormal concentrations can be detected as follows. For a given time window (e.g., 10% of data length) the percentage of data points with values greater than the 0.75 quantile are calculated. As the window is moved along the data, corresponding percentages are calculated. Any percentage greater than the upper whisker indicates an abnormal concentration of data, which is discarded. The same abnormality cleaning procedure is repeated for data points lower than the 0.25 quantile.

Figure 31A:
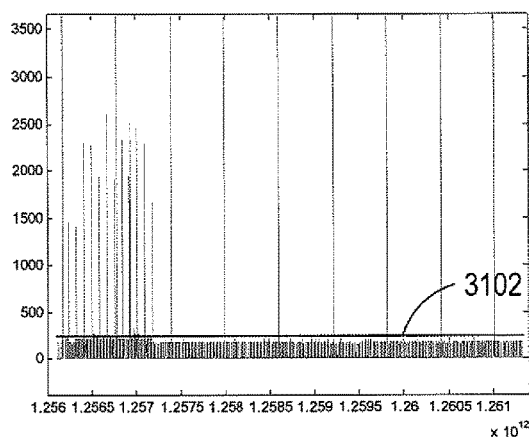
FIG. 31A shows an example plot of qualified data.
Figure 31B:
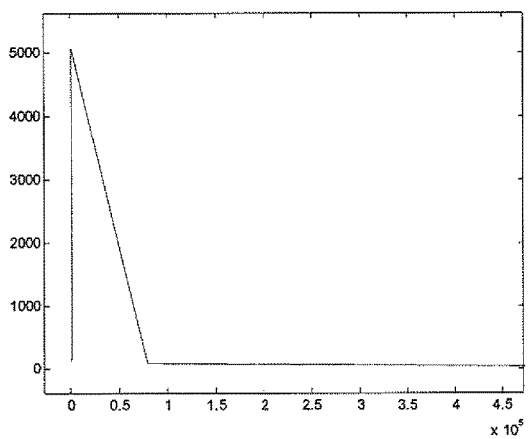
FIG. 31B shows an example plot of the objective function calculated for the data shown in FIG. 31A.

FIG. 31A shows an example plot of qualified data with iqr=0 and with an upper bound 3102. FIG. 31B shows an example plot of the objective function calculated for the data in FIG. 31A using Equation (34). Abnormality cleaning was also performed for the data represented in FIG. 31B.

In the data-variability-based approach for determining normalcy bounds, the variability of data points $x_k$ against median of data $\mu$ is calculated according to $$v = \left(\frac{1}{N-1}\sum_{k=1}^{N}(x_k-\mu)^2\right)^{1/2} \quad (36)$$

Consider the following set of upper lines $$[\mu+z_j v]$$

where j is a positive integer. For each interval j, the corresponding values $g_j$ of the objective function are calculated and the max($g_j$) is taken as the appropriate normalcy upper bound. For example, experimental values for $z_j$ were $$z_1=1, z_2=1.5, z_3=2, z_4=3, z_5=4$$

Normalcy bounds are determined for semi-constant periodic data 2816 as follows. Period detection as described above with reference to FIG. 5 is a way to get the period of the data and similar columns. For normalcy bounds (i.e., dynamic thresholds) determination of similar columns, the discarded data points (recall that the periodicity procedure was performed only for outliers in block 2808) are returned, the variability $v_k$ is calculated for each column against the global data median $\mu$ and the normalcy bounds are determined for each column, as described above for the non-periodic case.

Figure 32:
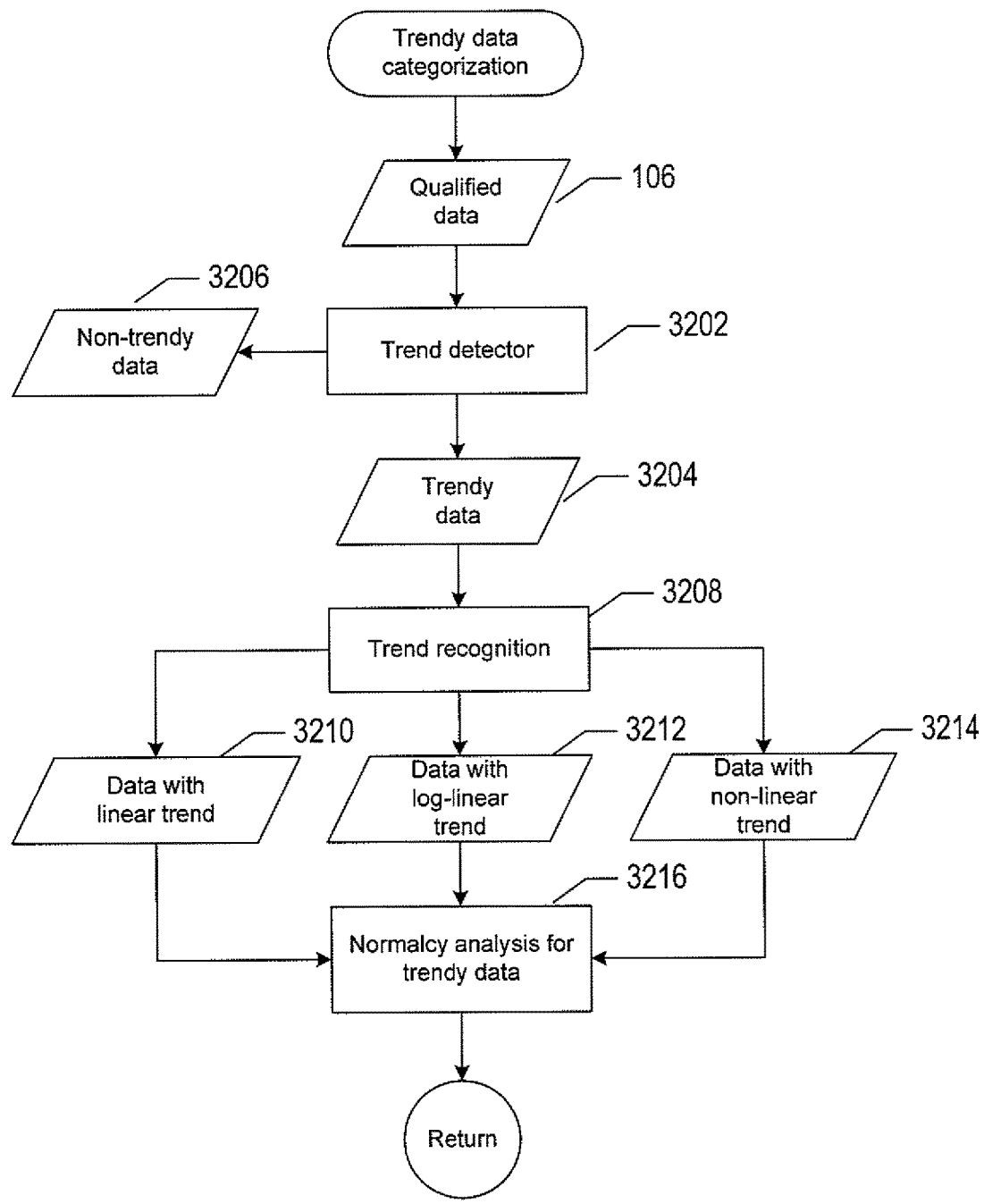
FIG. 32 shows a flow-control diagram of a method for trendy data categorization called in block 404 of FIG. 4.

Returning to FIG. 4, in block 404, a routine "trendy data categorization" is called. FIG. 32 shows a flow-control diagram of a method for trendy data categorization called in block 404 of FIG. 4. In block 3202, a trend detector is used to separate the qualified data 106 into trendy data 3204 and non-trendy data 3206. In block 3208, trend recognition identifies the trendy data 3204 as linear data 3210, log-linear data 3212, or non-linear data 3214. The operation in block 3208 is to decompose the original time series $f_0(t)$ of N data points into a sum of non-trendy time series, f(t), and trend component trend(t) as follows:

$$f_0(t)=f(t)+\text{trend}(t) \quad (37)$$

Equation (37) provides normalcy analysis based on f(t). In block 3216, specific normalcy bounds are calculated for each of the categories 3210, 3212, and 3214.

The trend detector in block 3202 performs a number of different trend detection tests. For example, the Mann-Kendall ("MK") test can be used to calculate an MK statistic given by:

$$S_0 = \sum_{k=1}^{N-1}\sum_{j=k+1}^{N}\text{sign}(x_j-x_k) \quad (38)$$

The trend detector 3202 performs the following three operations:

1. Data smoothing as described above with reference to block 501 in FIG. 5.
2. Calculation of the MK statistic $S_0$ for the smoothed data. When $S_0>0$ a trend is identified as increasing, and when $S_0<0$ the trend is identified as decreasing.
3. A trend measure is calculated according to $$p = \left|\frac{S_0}{S_{max}}\right|100\% \quad (39)$$

where $$S_{max} = \sum_{k=1}^{N-1}\sum_{j=k+1}^{N} 1$$

When the trend measure p is greater than a user defined threshold, for example p>40%, the data is trendy data 3204.

Trend recognition in block 3208 reveals the nature (i.e., linear, log-linear or non-linear) of the trendy data 3204. Linear and log-linear trends can be checked using linear regression analysis. Trend recognition includes determining a goodness of fit given by:

$$R = 1 - \frac{R_{regression}}{R_0} \quad (40)$$

where
$R_{regression}$ is the sum of squares of the vertical distances of the points from the regression line; and
$R_0$ is the sum of squares of the vertical distances of the points from the line with zero slop and passing through the mean of data (i.e., the null hypothesis).

When R is, for example, greater than a user defined parameter 0.6 it is assumed that the trend is linear, otherwise the log-linearity is checked by the same procedure for $f(e^{ct})$, where c is a constant. When the goodness of fit given by Equation (40) is greater than 0.6 the data is assumed to be log-linear. If the data is not linear or not log-linear, the data is assumed to be non-linear trendy data.

Figure 33A:
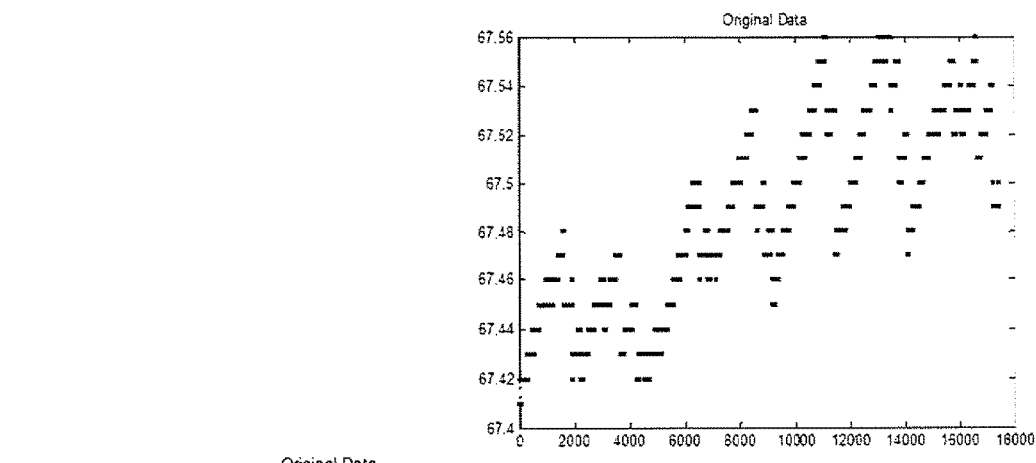
FIGS. 33A-33C show plots of trendy data and non-trendy data.
Figure 33B:
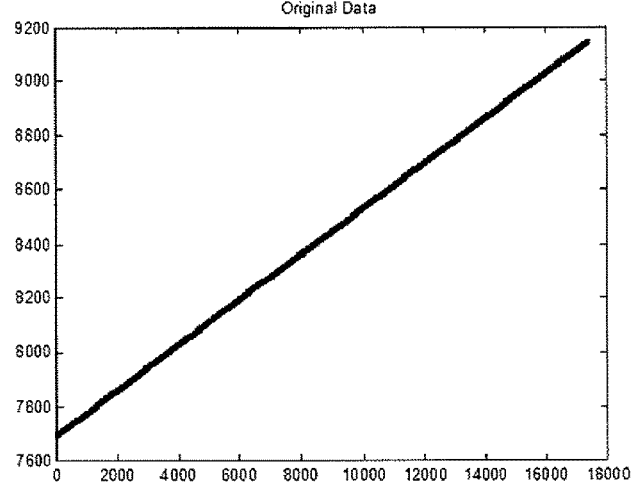
Figure 33C:
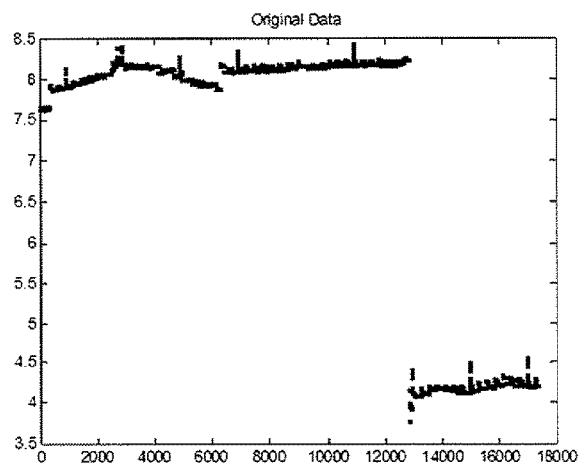

FIG. 33A shows a plot of increasing trendy data with $S_0$=48464, $S_{max}$=77421, p=62.6%>40%. In this example, R=0.44<0.6. FIG. 33B also shows a plot of increasing trendy data with $S_0$=77421, $S_{max}$=77421, p=100%>40%. The trend is linear because R=0.999>0.6. FIG. 33C shows a plot of non-trendy data with $S_0$=−3504, $S_{max}$=77421, and p=4.5%<40%.

Block 3216 is the normalcy analysis represented by block 410 in FIG. 4 performed on the different categories of trendy data 3210, 3212, and 3214 to calculate the normalcy bounds for each category. When the data has a linear trend, the data $f_0(t)$ is decomposed into $$f_0(t)=f(t)+\text{trend}(t) \quad (41)$$

where trend(t)=kt+b is a linear function with coefficients k and b determined by linear regression analysis. When f(t) is non-periodic, normalcy bounds of $f_0(t)$ are straight lines with upper and lower dynamic thresholds that are determined by maximizing the objective function given by:

$$g(P,S) = \frac{e^{aP}-1}{e^a-1}\frac{S}{S_{max}} \quad (42)$$

where

Figure 34:
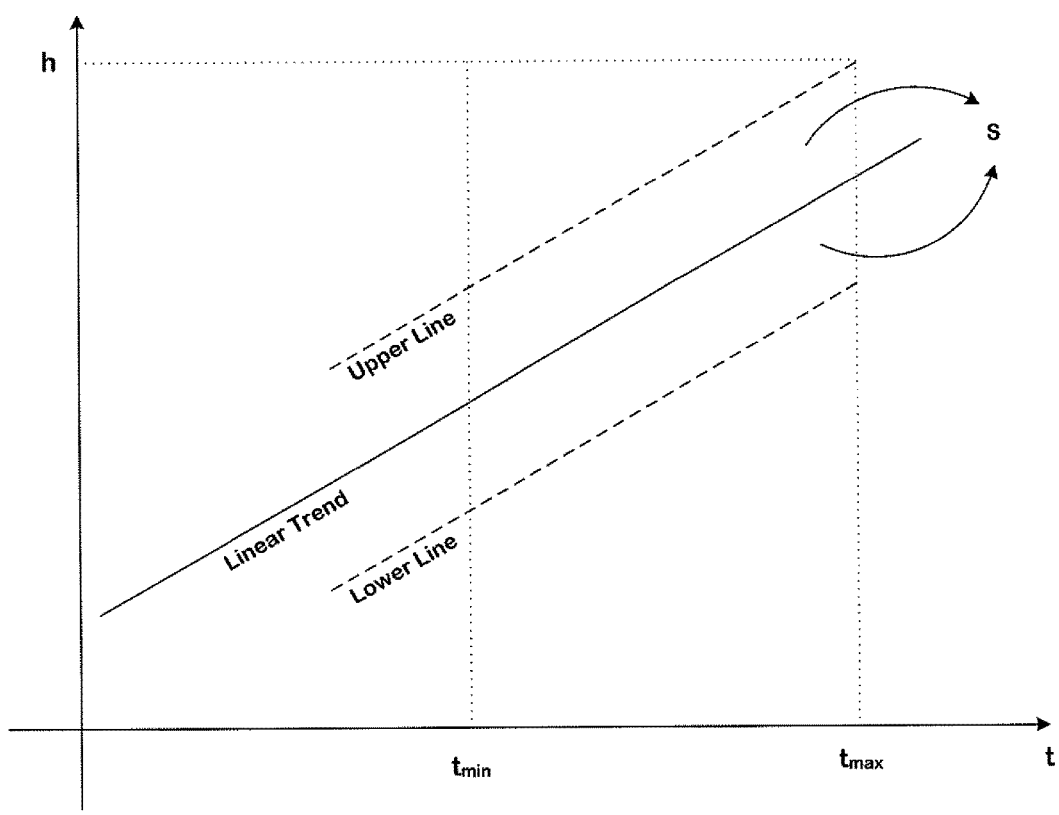
FIG. 34 shows lower and upper lines associated with a linear trend.

S is the square of the area limited by $t_{min}$ and $t_{max}$ and lower and upper lines as shown in the example of plot of FIG. 34;

$$S_{max}=h(t_{max}-t_{min}); \text{ and}$$

P is the fraction of data within the upper and lower lines and a is a user defined parameter.

Variability (i.e., standard deviation) of f(t) is calculated by:

$$\sigma=\text{std}(f(t)) \quad (43)$$

The upper and lower lines are given by:

$$[kt+b-z_j\sigma, kt+b+z_j\sigma] \quad (44)$$

where j is a positive integer. The corresponding value $g_j$ of the objective function is calculated for each time. Lines that correspond to $\max(g_j)$ are appropriate normalcy bounds. Experimentally determined values for $z_j$ are given by:

$$z_1=1, z_2=1.5, z_3=2, z_4=3, z_5=4$$

When f(t) is periodic, the variability $\sigma_m$ of the mth is calculated for each set of similar columns and the normalcy bounds are given by $$[kt+b-z_j\sigma_m, kt+b+z_j\sigma_m] \quad (45)$$

The maximum of the objective function gives the normalcy bounds of the mth set. When the data has a log-linear trend, the time series $f(e^{ct})$ is data with a linear trend using the same procedure in Equations (41)-(45). For data with a non-Linear trend, the last portion of data is selected and normalcy bounds are calculated according to the above described procedure for non-periodic case.

Figure 35A:
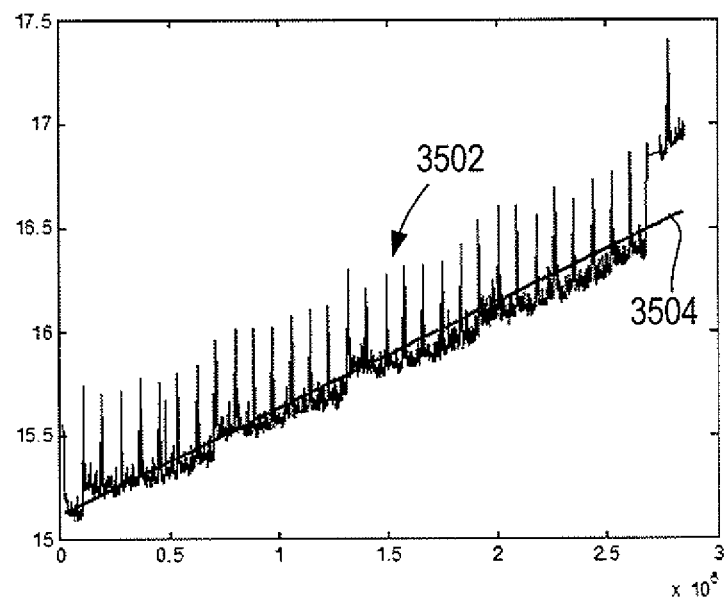
FIGS. 35A-35D show example plots of periodic data with linear trends.
Figure 35B:
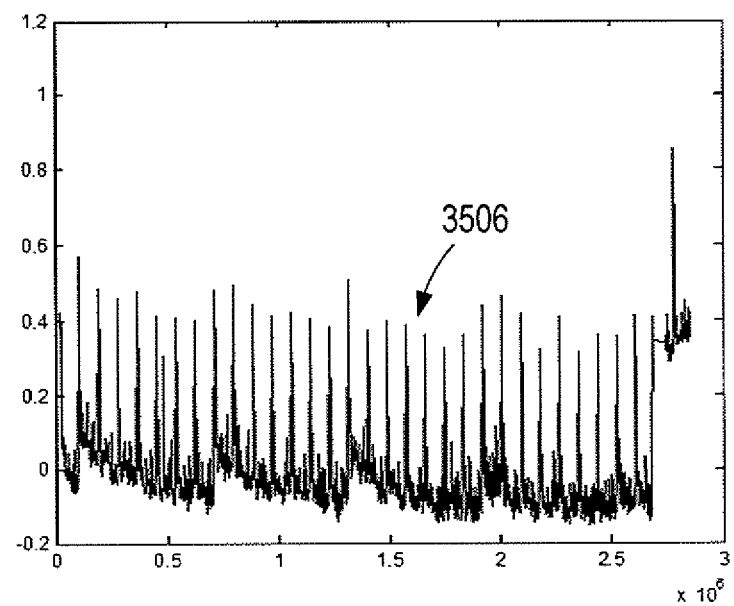
Figure 35C:
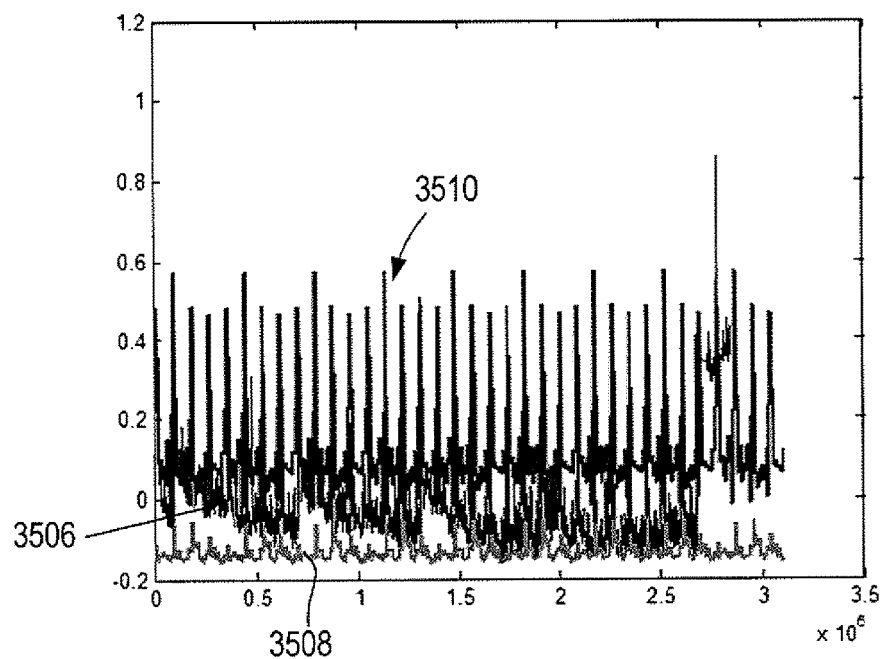
Figure 35D:
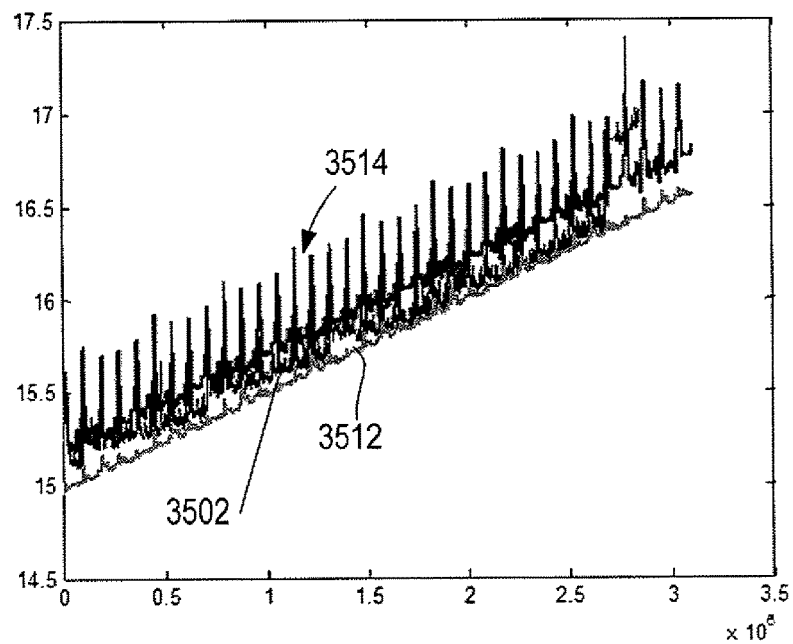

FIGS. 35A-35D show example plots of periodic with linear trends. FIG. 35A shows periodic data 3502 that follows and a linear regression line 3504. For this example, the goodness of fit is R=0.7, which indicates a linear trend as shown. FIG. 35B shows the periodic data 3506 after subtraction of the linear trend shown in FIG. 35A. FIG. 35C shows an example of dynamic thresholds 3508 and 3510 for periodic data 3506 shown in FIG. 35B. FIG. 35D shows normalcy bounds 3512 and 3514 for the original periodic data 3503 after reconstruction of the linear trend.

Figure 35E:
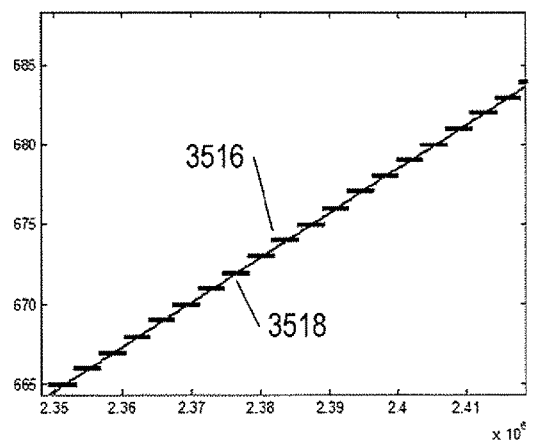
FIGS. 35E-35G show example plots of data with a non-periodic base and linear trends.
Figure 35F:
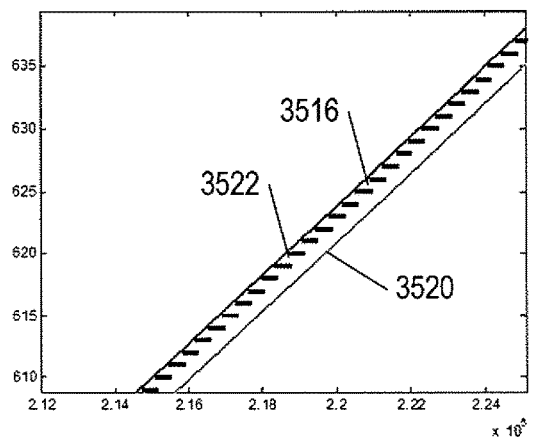
Figure 35G:
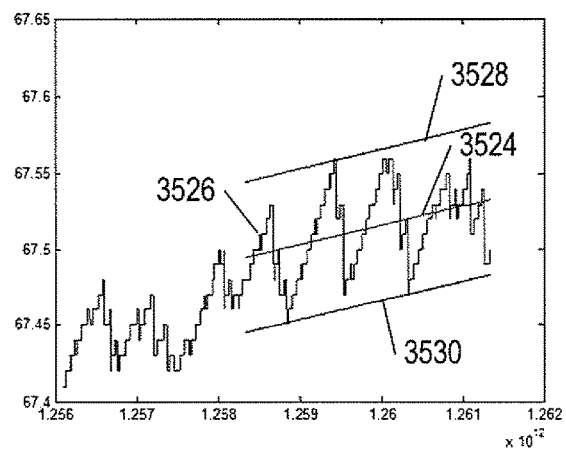

FIGS. 35E-35G show example plots of data with a non-periodic base but also have linear trends. FIG. 35E shows data 3516 with a linear trend represented by linear regression line 3518. In this example, the goodness of fit is R=0.99, which indicates a linear trend. FIG. 35F shows the data 3516 with final DTs represented by lines 3520 and 3522. In this example, no periods were found and the DTs are straight lines. The lines 3520 and 3522 can be constructed by maximization of objective function. FIG. 35G shows an example plots of data with a non-linear trend base. Line 3524 is a regression line for the last portion of the data 3526 and boundary lines 3528 and 3530 are upper and lower thresholds for the same portion.

Figure 36:
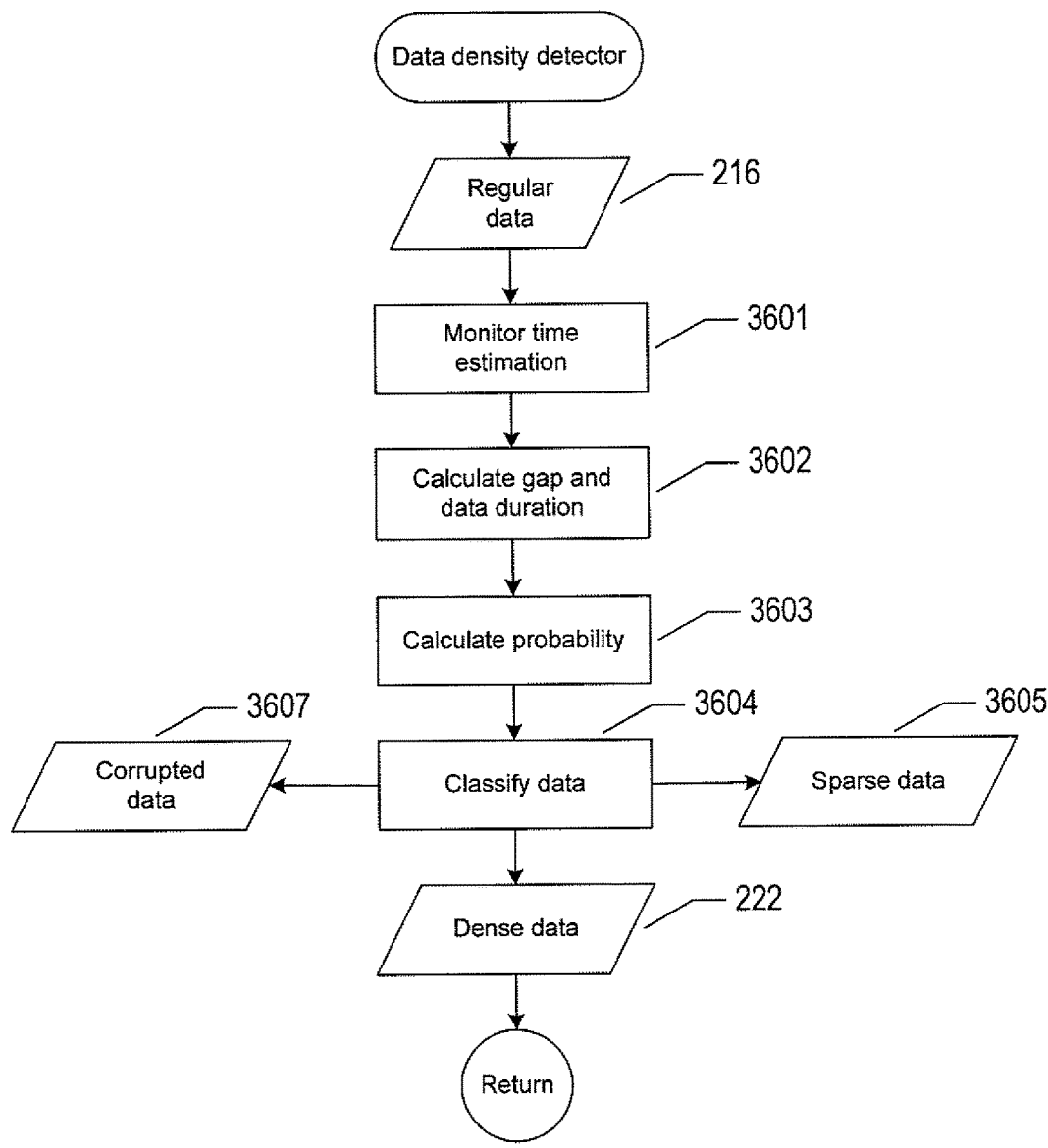
FIG. 36 shows a flow-control diagram of the data density detector called in block 203 of FIG. 2.

Returning to FIG. 2, in block 203, a routine "data density detector" is called. FIG. 36 shows a flow-control diagram of the data density detector called in block 203 of FIG. 2. The data density detector performs data density recognition based on probability calculations that reveal the distribution of gaps in the data. Gaps in the regular data 216 are determined relative to data monitoring time Δt, which is estimated statistically from data time stamps. For categorization purposes, the following measures characterize the nature of the gaps present in the data 216: 1) percentage of gaps, 2) probabilities of gap-to-gap, data-to-data, gap-to-data and data-to-gap transitions. When the total percentage of gaps is acceptable, the data is categorized as dense data. When the total percentage of gaps is greater than a user defined limit and the percentage of gags have a non-uniform distribution in time then a gap clean-up procedure gives dense data. When gaps in data have a uniform distribution in time, the data belongs to a sparse data cluster. When gaps in the data occur with an extremely high percentage, further analysis is not typically possible, and the data is identified as corrupted data. In block 3601, as described above, an estimate of the monitoring time Δt is calculated according Equation (18) as the median of $\Delta t_k = t_{k+1} - t_k$. In block 3602, time intervals with $\Delta t_k \leq c\Delta t$ are normal data intervals while $\Delta t_k > c\Delta t$ are gaps are calculated, where c is user predefined gap parameter. As also described above with reference to Equation (19), the percentage of gaps are represented by ρ. In block 3603, the probabilities $p_{11}$, $p_{10}$, $p_{00}$, and $p_{01}$ in Equations (20) are calculated for data-to-data, data-to-gap, gap-to-gap and gap-to-data transitions. In block 3604, the percentage of gaps ρ, and the probabilities $p_{11}$, $p_{10}$, $p_{00}$, and $p_{01}$ are used to classify the data. For example, dense data 222 with gaps non-uniformly distributed in time can be specified by the condition:

$$\begin{cases} \rho > H_1 \\ p_{10} < \varepsilon \\ p_{01} < \varepsilon \end{cases} \quad (46)$$

where $H_1$ and ε are user defined parameters, and E is a small parameter. For example, $H_1$=25% and ε=0.0005. The main reason for smallness of $p_{10}$ and $p_{01}$ is the smallness of the numbers $N_T$ and $N_G$, while G and T are as large as ρ. The data of this category can be further processed via data selection procedure to eliminate concentration of gaps, which can be done as follows. The total percentage of gaps in the series of data $\{x_k\}_{k=i}^j$, j=$j_1$, $j_2$, ..., $j_s$, i=$i_1$, $i_2$, ..., $i_r$ is calculated and the portion for which $\rho \leq H_r$ is selected. Sparse data 3606 has gaps that are uniformly distributed in time and are specified by the condition $$\begin{cases} \rho > H_2 \geq H_1 \\ p_{10} \geq \varepsilon \\ p_{01} \geq \varepsilon \end{cases} \quad (47)$$

where $H_2$ is a user defined parameter. For example, $H_2=60\%$. The second condition $p_{10} \geq \varepsilon$ and third condition $p_{01} \geq \varepsilon$ indicate that the gaps are uniform in time and cleanup is not possible. Corrupted data 3607 is identified when $\rho > H_3$, where $H_3$ is a user defined parameter, such as $H_3=95\%$.

Figure 37A:
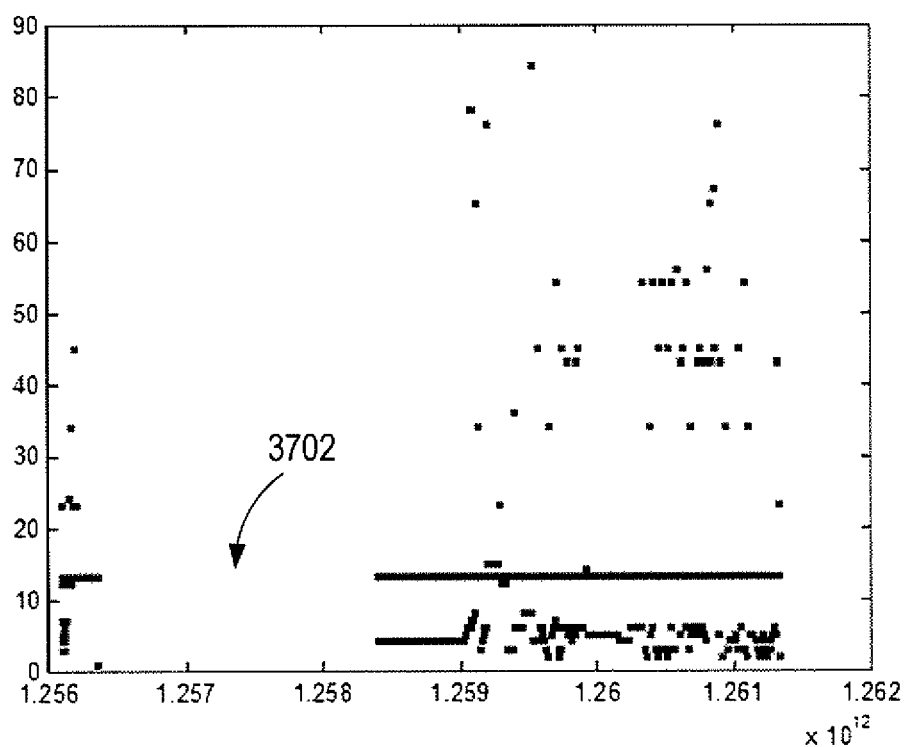
FIGS. 37A-37D show example plots of non-uniform data with and without gaps.
Figure 37B:
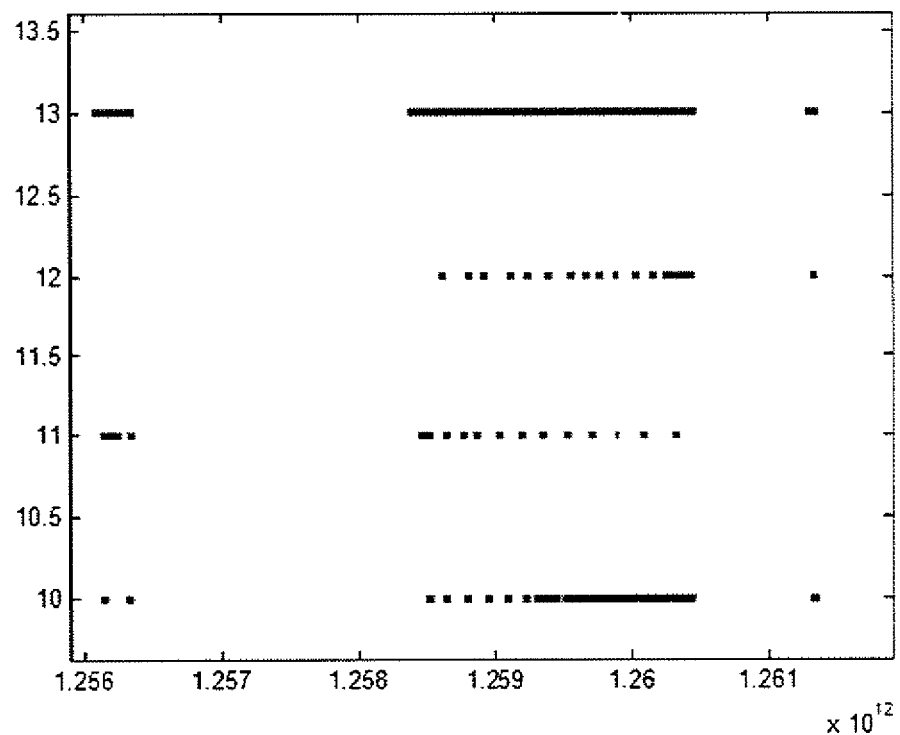
Figure 37C:
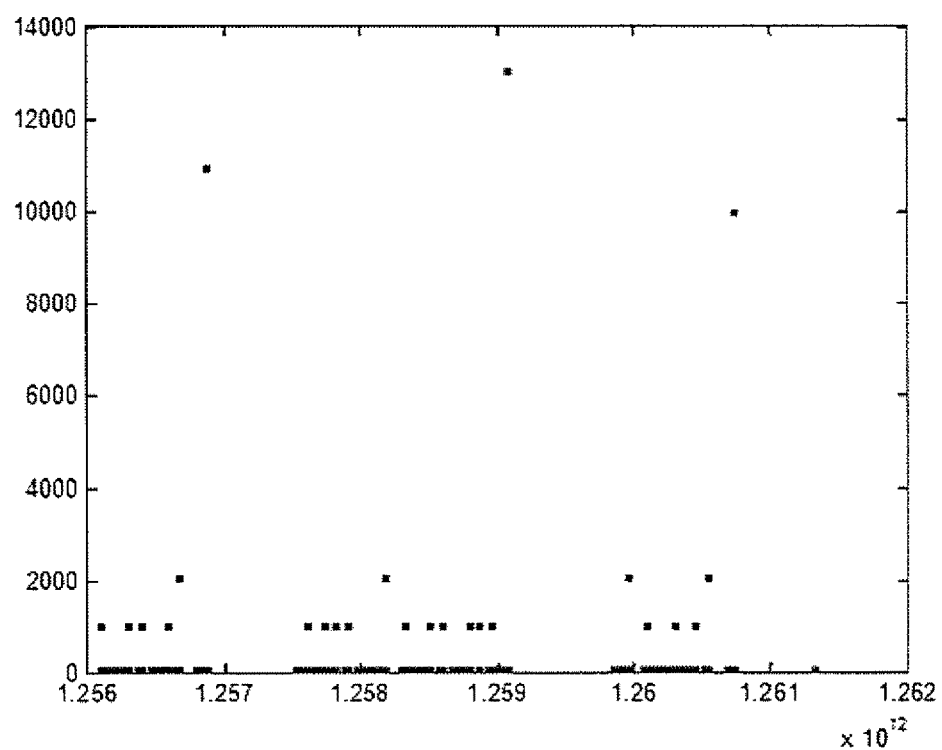
Figure 37D:
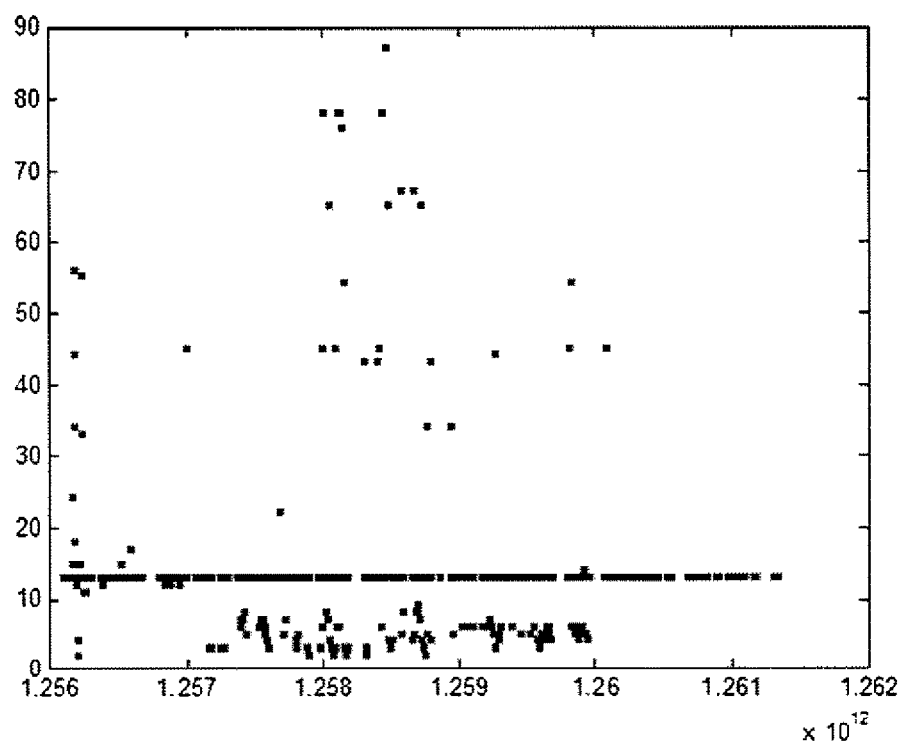

FIG. 37A shows an example plot of data that is non-uniform in time and has a gap 3702. The data is considered dense data with $\rho=39\%$, $p_{11}=0.99991$, $p_{10}=9.4e-05$, $p_{00}=0.99985$, $p_{01}=0.00015$. FIG. 37B shows a plot of example data that is non-uniform in time gaps. The data is also considered dense data $\rho=55\%$, $p_{11}=0.99974$, $p_{10}=0.00026$, $P_{00}=0.9998$, $p_{01}=0.00021$. FIG. 37C shows an example plot of sparse data with $p=68\%$, $p_{11}=0.9957$, $p_{10}=0.0043$, $p_{00}=0.9979$, $p_{01}=0.0020$. FIG. 37D shows an example of dense data with $\rho=48\%$, $p_{11}=0.9962$, $p_{10}=0.0038$, $P_{00}=0.9958$, $p_{01}=0.0042$.

Period determination of normalcy bounds is performed using a standard described above with reference to FIG. 5, where the parameter "time_unit_parts" is given by:

$$\text{"time\_unit\_parts"} = \left[ \frac{\text{"time\_unit"}}{\text{median}(T_k) + \text{median}(G_k)} \right]$$

The data may be periodic or non-periodic. In both cases, the normalcy bounds are determined as described above with reference to FIG. 5 for classifying the data as periodic or non-periodic.

Figure 38:
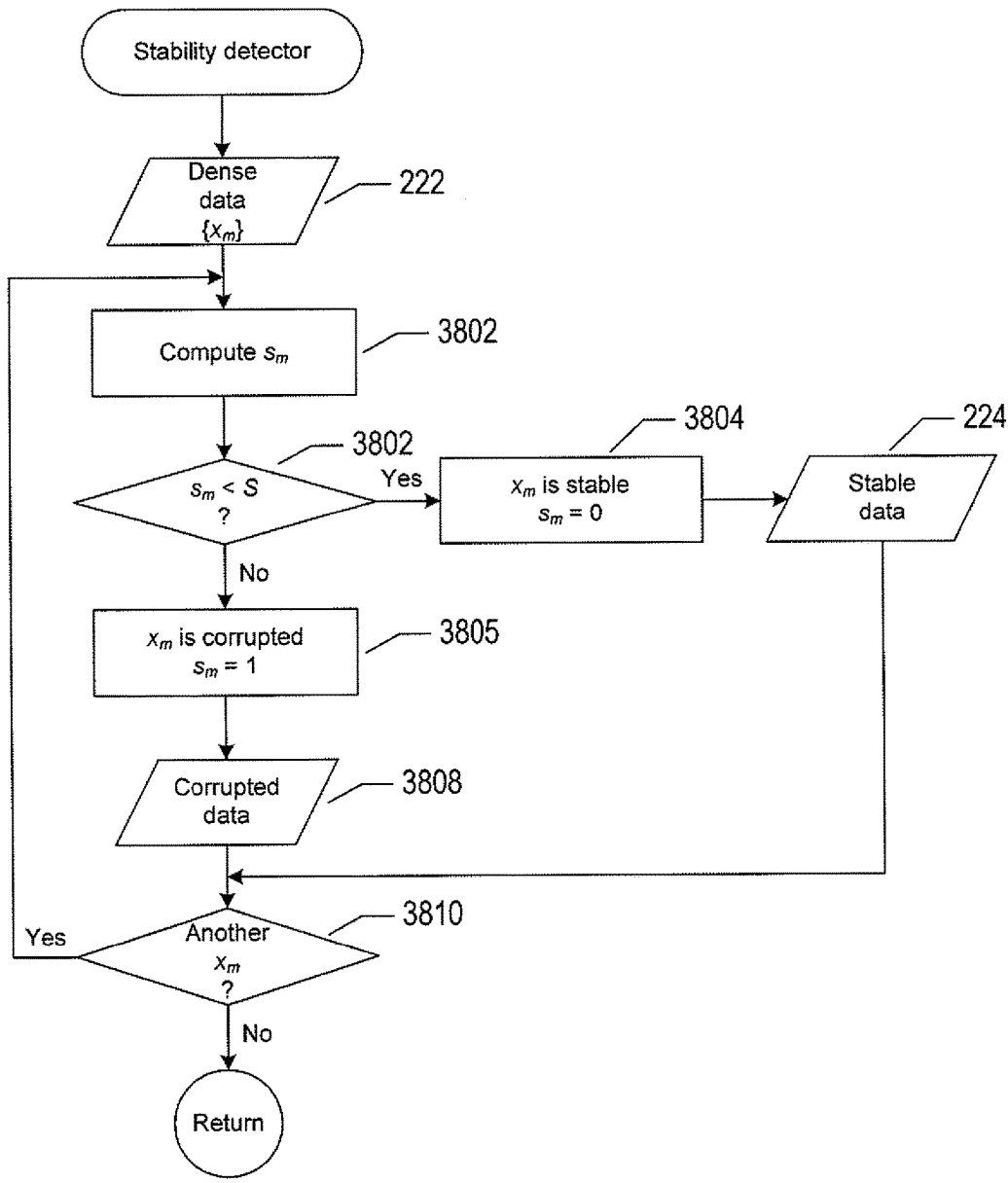
FIG. 38 shows a flow-control diagram of a stability detector method called in block 204 of FIG. 2.

Returning to FIG. 2, in block 204, a routine "stability detector" is called to check the stability of the dense data 222 output from the routine "data density detector." FIG. 38 shows a flow-control diagram of a stability detector method called in block 204 of FIG. 2. The stability detector performs statistical stability recognition of dense data 222. When the dense data 222 is stable or a stable portion of the data can be identified, the data, or a selected portion, is categorized as stable data, otherwise the data is categorized as corrupted. Stability categorization may be accomplished by construction a "stabilochart" that represents stability intervals of time series and allows for selection of recent and sufficiently long data regions for further analysis. Blocks 3802-3805 are repeated for every m. In block 3802, calculate the quantity $$s_m = \frac{|iqr(\{x_k\}_{k=m-n}^{m}) - iqr(\{x_k\}_{k=m}^{m+n})|}{iqr(\{x_k\}_{k=1}^{N})} 100\% \quad (48)$$

where n is a user defined parameter. For example, $$n = \left[ \frac{T}{4} \right],$$

where T is the length of data. In block 3803, when $s_m < S$, control flows to block 3805, otherwise control flows to block 3805. The parameter S can be set to 50%. In block 3804, $s_m$ is set to zero and the associated datum $x_m$ is identified as stable data 3807. In block 3805, $s_m$ is set to one and the associated datum $x_m$ is identified as corrupted data 3808. In block 3810, when another datum $x_m$ is available the operations of blocks 3802-3805 are repeated. The collection of data $\{s_m\}$ is the stabilochart of the set of data $\{x_m\}$.

Figure 39C:
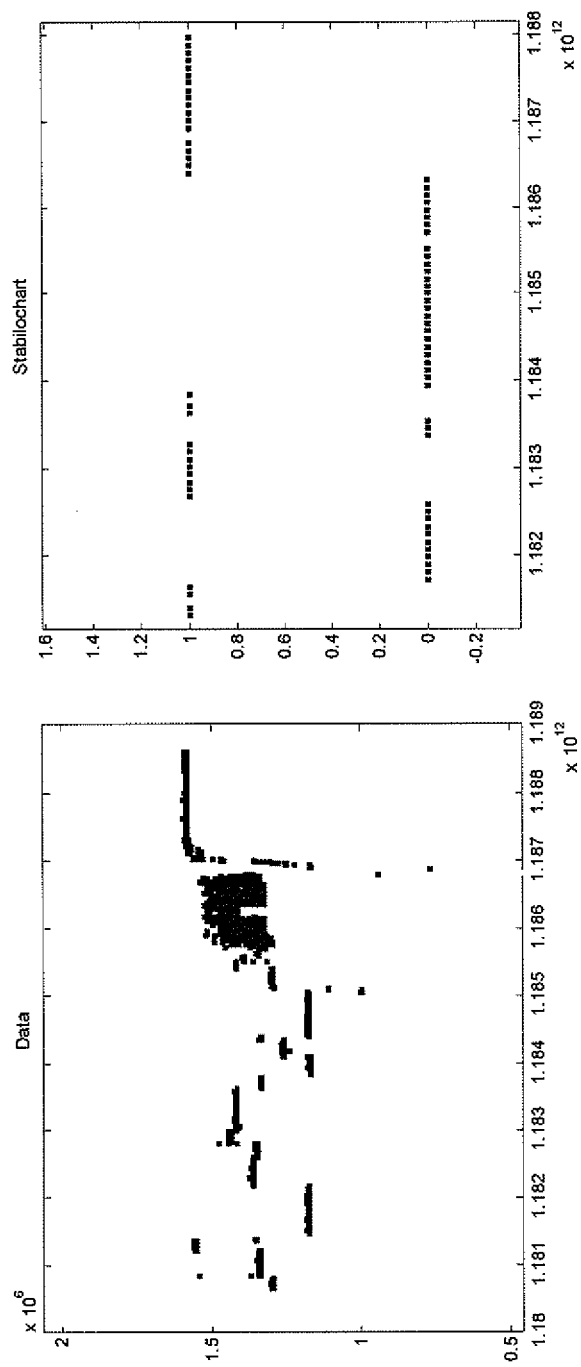

FIGS. 39A-39C shows example plots stabilocharts of data calculated for S=50%. FIG. 39A shows an example of stable data. FIG. 39B shows an example plot of data where the portion of data beyond about $1.186 \times 10^{12}$ is considered stable. FIG. 39C shows an example plot of unstable data.

In other embodiments, the method in FIG. 38 can be carried out for the data tail $\{x_k\}_{k=m}^{N}$ with a corresponding stabilochart denoted by $S_m$. The start time of the latest stable portion of the data is denoted by $T_m$. A series of stabilocharts $\{S_m\}_{m=1}^{n}$ are generated for each of the series of start times $\{T_m\}_{m=1}^{n}$ showing the start times of the latest stability portions of data tails. The minimum time $\min(T_m)$ indicates the start time of the longest stable portion. Note that the set $\{T_m\}_{m=1}^{n}$ can be empty, which indicates the data is corrupted.

Figure 40:
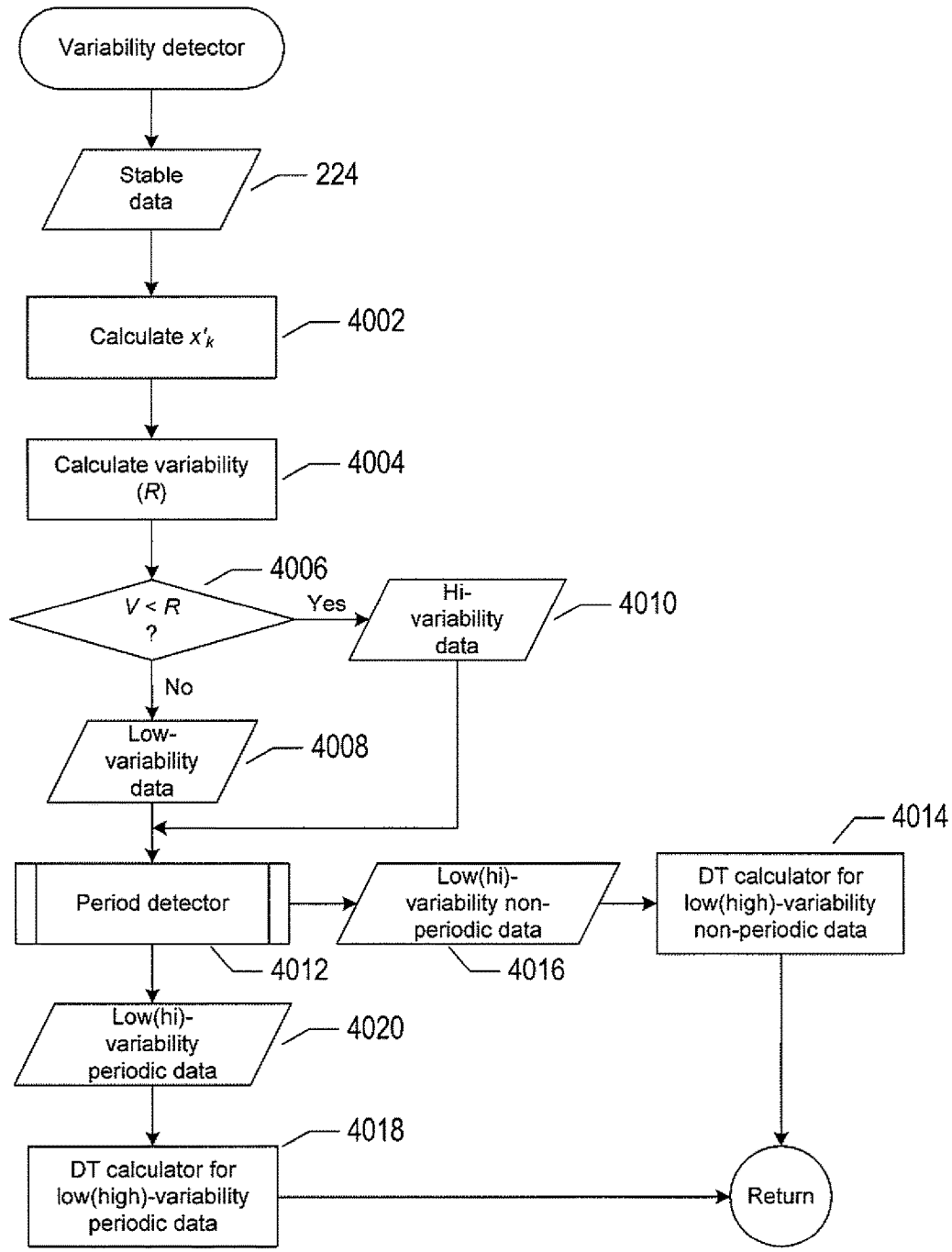
FIG. 40 shows a flow-control diagram of a variability detector method called in block 205 of FIG. 2.

Returning to FIG. 2, in block 205, a routine "variability detector" is called to assess the variability of the stable data 224 output from the stability detector 204. FIG. 40 shows a flow-control diagram of a variability detector method called in block 205 of FIG. 2. The variability detector performs variability recognition of input stable data 224. In block 4002, absolute jumps $x_k'$ of data points are computed according to $$x_k' = |x_{k+1} - x_k| \quad (49)$$

where $x_k$ belongs to the set of data $\{x_k\}_{k=1}^{N}$. Low-variability and high-variability data categories are recognized based on the size of the jumps $x_k'$. In block 4004, a measure R of variability is calculated according to $$R = \frac{iqr(\{x_k'\}_{k=1}^{N-1})}{iqr(\{x_k\}_{k=1}^{N})} 100\% \quad (50)$$

where $iqr(\{x_k\}_{k=1}^{N}) \neq 0$. In block 4006, data clustering is determined by comparing the measure R with a user defined threshold parameter V. For example, the threshold parameter V can be 20%. When $$R \leq V$$

the data is categorized as low-variability data 4008, otherwise when $$R > V$$

the data is categorized as high-variability data 4010.

Figure 41A:
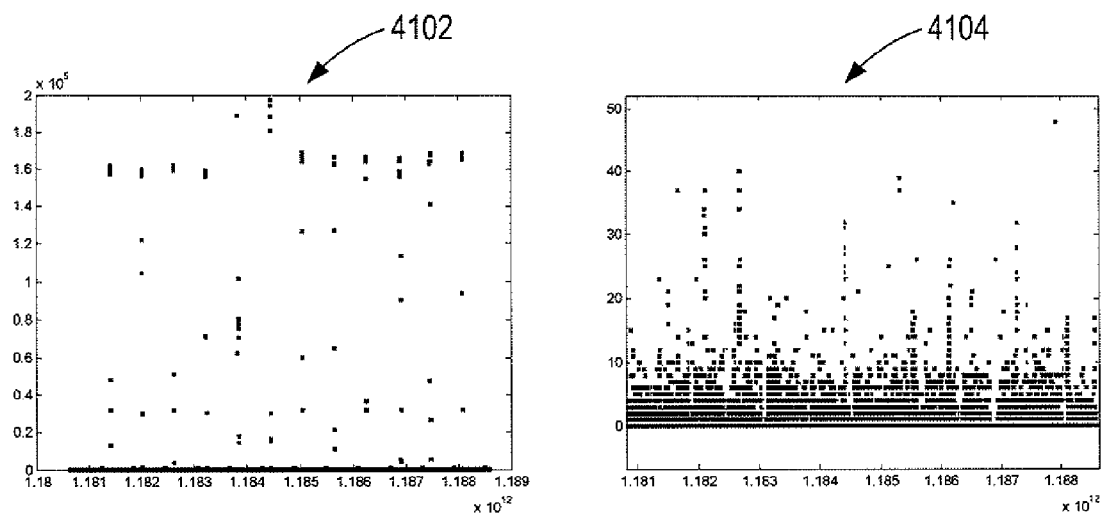
FIGS. 41A-41B show plots of low- and high-variability categories of data.
Figure 41B:
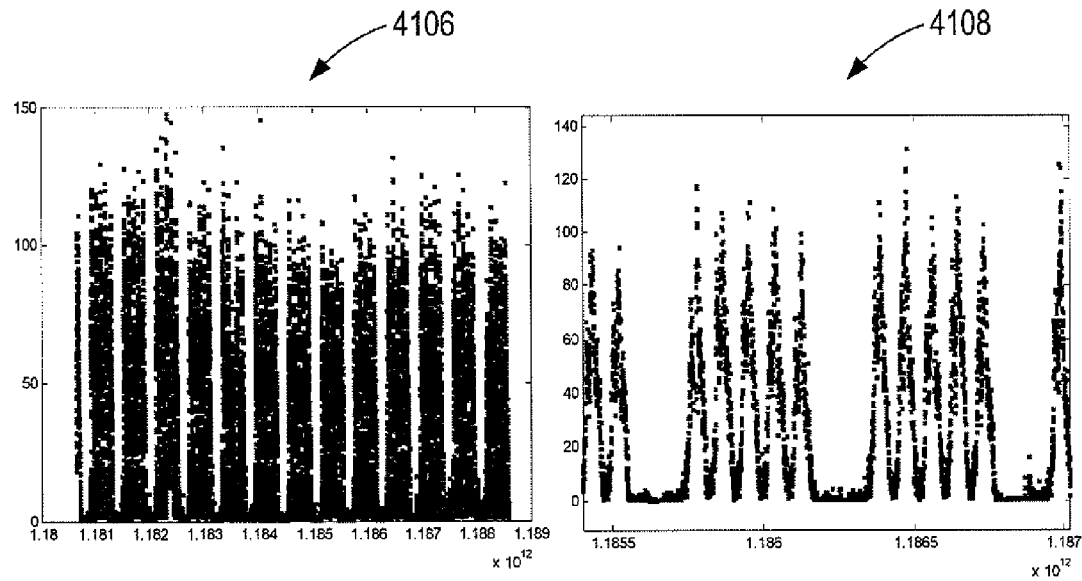

FIGS. 41A-41B shows data from low- and high-variability categories for a threshold V=20%. In FIG. 41A, R=200%. Because $R \geq 20\%$, the data is from a high-variability cluster of data. Plot 4102 shows original data and plot 4104 shows a zoom in of the data values shown in plot 4102, which reveals the high-variability of the data. In FIG. 41B, R=12%. Because R<20%, the data is from a low-variability cluster. Plot 4106 shows the original data, and plot 4108 shows a zoom in of the data shown in plot 4108. The data exhibits a regularly spaced pattern of 5 peaks, which represents low-variability of the data.

Returning to FIG. 40, in block 4012, the period detector 4012 described above with reference to FIG. 5 is used to assess the periodicity and non-periodicity of the low-variability data 4008 and the high-variability data 4010. In block 4014, a normalcy boundary calculation is performed for both low- and high-variability, non-periodic data 4016. In block 4018, a normalcy boundary calculation is performed for low- and high-variability periodic data 4018. Different sets of parameters may be used in blocks 4014 and 4018 based on the variability.

Figure 42A:
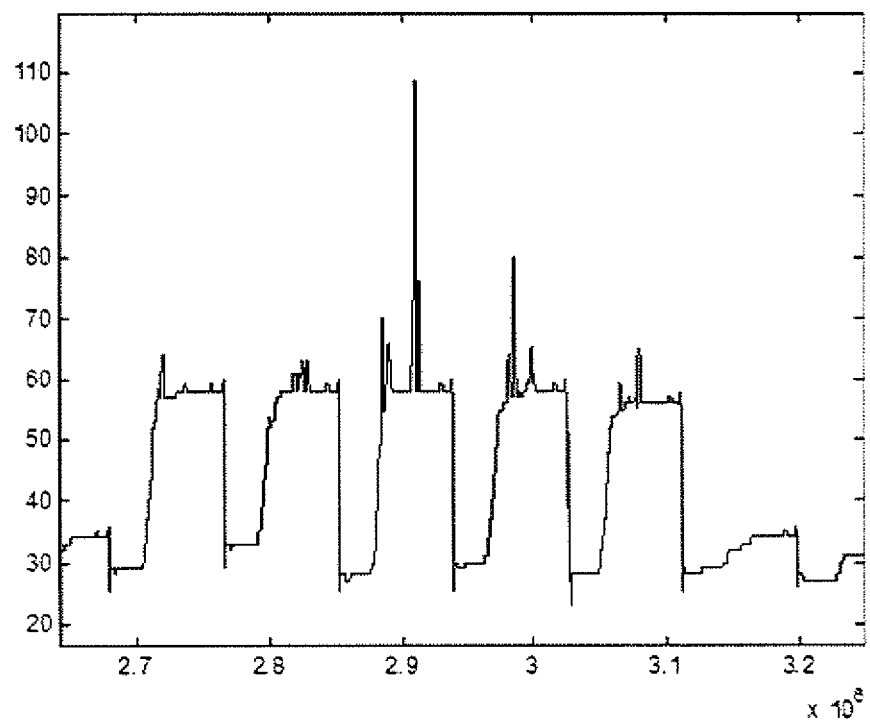
FIGS. 42A-42B show example plots of low-variability data with upper and lower normalcy bounds.
Figure 42B:
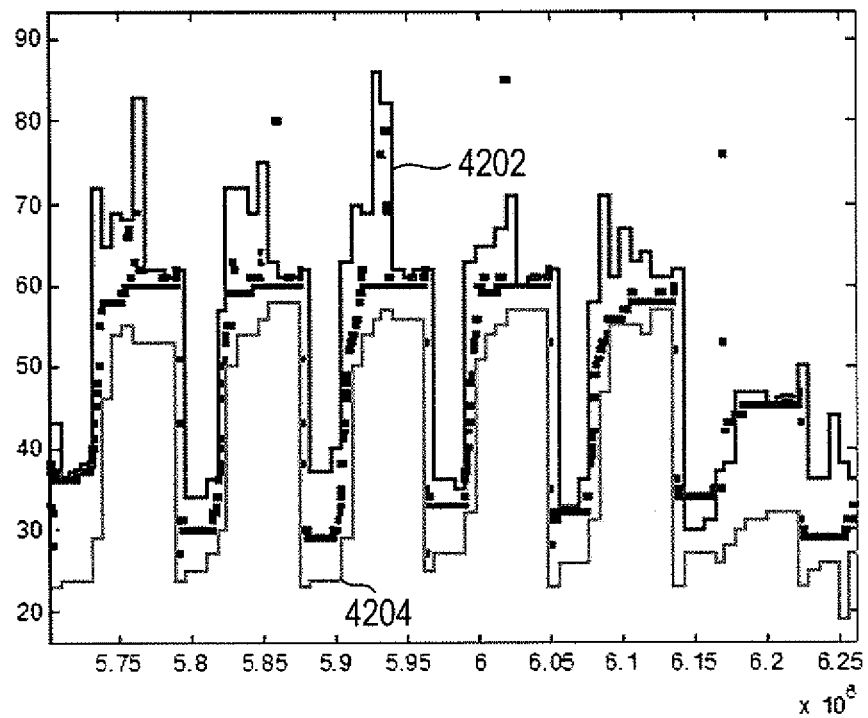

FIG. 42A shows an example plot of low-variability data with R=0%. FIG. 42B shows an example plot of the low-variability data shown in FIG. 42A with upper and lower normalcy bounds 4202 and 4204, respectively. The low-variability data in FIG. 42A is periodic with corresponding normalcy bounds determined using a parameter "time_unit_parts"=12, which divides a day into 12 parts and hence is used to calculate separate dynamic thresholds on 2-hour intervals as shown in FIG. 42B.

Figure 43A:
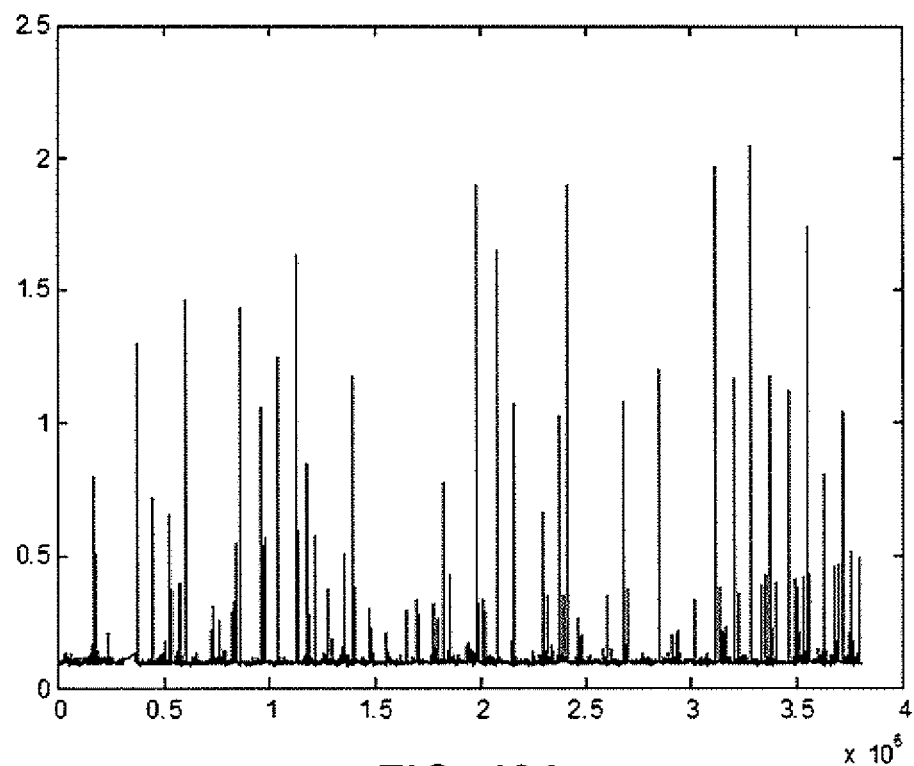
FIGS. 43A-43B show example plots of high-variability data with with upper and lower normalcy bounds.
Figure 43B:
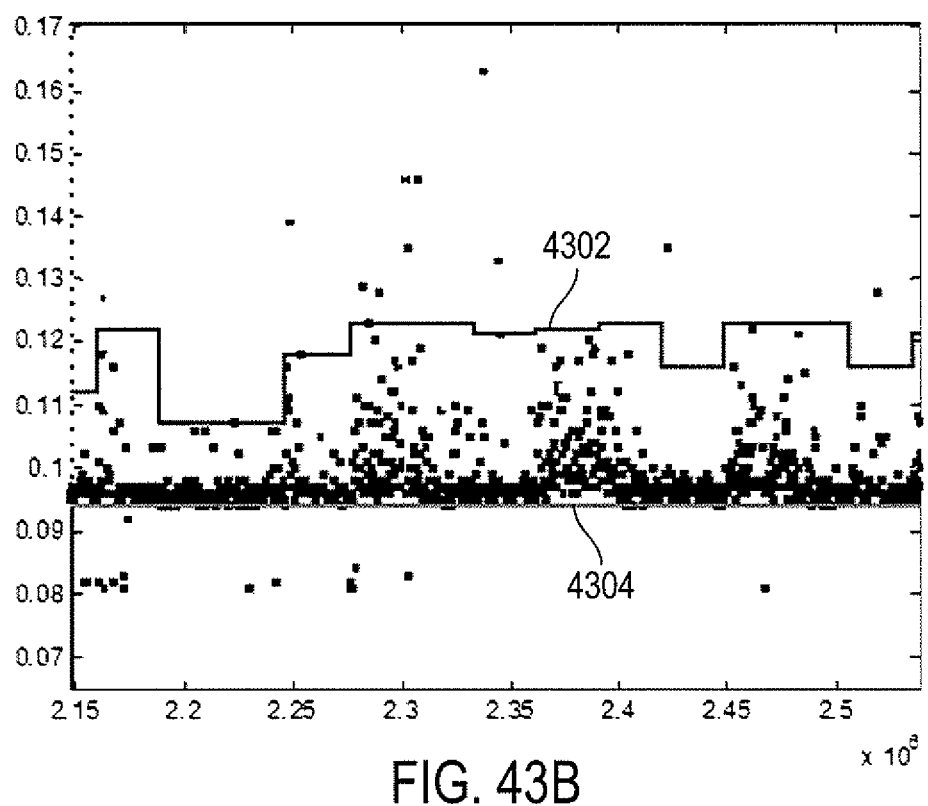

FIG. 43A shows an example plot of high-variability data with R=100%. FIG. 43B shows an example plot of the high-variability data shown in FIG. 43B with upper and lower normalcy bounds 4302 and 4304, respectively. The high-variability data shown in FIG. 43A is periodic with corresponding normalcy bounds determined using a parameter "time_unit_parts"=3, which divides a day into 3 parts and hence is used to calculate separate thresholds on 8-hour intervals as shown in FIG. 43B.

Figure 44:
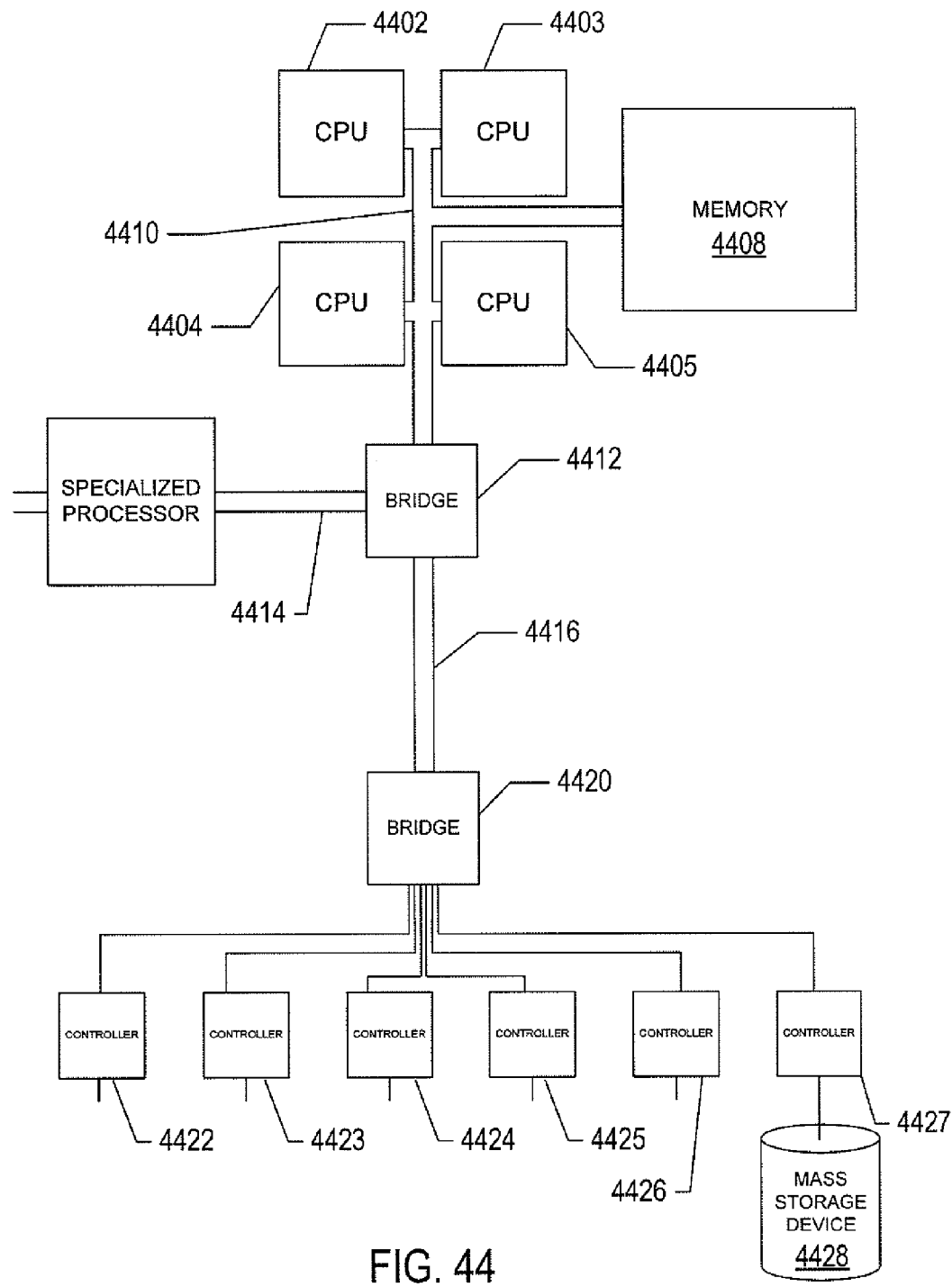
FIG. 44 shows an example of a generalized computer system that executes efficient methods for anomaly detection.

FIG. 44 shows an example of a generalized computer system that executes efficient methods for anomaly detection and therefore represents a data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 4402-4405, one or more electronic memories 4408 interconnected with the CPUs by a CPU/memory-subsystem bus 4410 or multiple busses, a first bridge 4412 that interconnects the CPU/memory-subsystem bus 4410 with additional busses 4414 and 4416, or other types of high-speed interconnection media, including multiple, high-speed serial interconnects. The busses or serial interconnections, in turn, connect the CPUs and memory with specialized processors, such as a graphics processor 4418, and with one or more additional bridges 4420, which are interconnected with high-speed serial links or with multiple controllers 4422-4427, such as controller 4427, that provide access to various different types of computer-readable media, such as computer-readable medium 4428, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 4428 is a data-storage device, including electronic memory, optical or magnetic disk drive, USB drive, flash memory and other such data-storage device. The computer-readable medium 4428 can be used to store machine-readable instructions that encode the computational methods described above and can be used to store encoded data, during store operations, and from which encoded data can be retrieved, during read operations, by computer systems, data-storage systems, and peripheral devices.

Embodiments are not intended to be limited to the descriptions above. For example, any number of different computational-processing-method implementations that carry out the methods for identifying anomalies in data may be designed and developed using various different programming languages and computer platforms and by varying different implementation parameters, including control structures, variables, data structures, modular organization, and other such parameters. The systems and methods can be executed in near-real time. The term "near-real time" refers to a time delay due to data transmission and data processing that is short enough to allow timely use of the data generated by the methods and systems described above.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A data-anomaly detection system comprising:
one or more processors;
one or more computer-readable media; and
a routine that executes on the one or more processors to analyze digitally encoded data output from a system monitoring tool and stored in the computer-readable media by
identifying the output data as qualified data or corrupted data;
identifying and sorting the qualified data into categorized data;
calculating normalcy bounds for the categorized data;
discarding the corrupted data from the computer-readable media; and
inputting the categorized data and normalcy bounds to an alerting engine that generates an alert when the categorized data is outside the normalcy bounds.

2. The system of claim 1, wherein identifying qualified data further comprises
determining whether the input data is qualified data or corrupted data; and
determining whether the qualified data is dense data or sparse data.

3. The system of claim 2, wherein determining whether the qualified data is dense data or sparse data further comprises
calculating a percentage of gaps in the qualified data, based on a user defined gap parameter;
calculating data-to-data, data-to-gap, gap-to-gap, and gap-to-data transition probabilities; and
based on the transitions probabilities and the percentage of gaps, classifying the qualified data as dense data, sparse data, or corrupted data.

4. The system of claim 1, wherein identifying the qualified data further comprises
determining whether the qualified data is stable data or corrupted data; and
categorizing stable qualified data as high-variability data or low-variability data.

5. The system of claim 4, wherein determining whether the qualified data is stable data or corrupted data further comprises
generating a stabilochart for the qualified data; and
for each stabilochart value,
when the stabilochart value is less than a user defined value, the qualified data is stable data, otherwise the qualified data is corrupted data.

6. The system of claim 4, wherein categorizing stable data as high-variability data or low-variability data further comprises
calculating jumps for the stable qualified data;
calculating a measure of variability based on the jumps and the stable data; and identifying the stable data as low-variability data when the measure of variability is less than a user defined threshold, otherwise the stable data is high-variability data.

7. The system of claim 1, wherein identifying and sorting the qualified data into categorized data further comprises
determining whether the qualified data as parametric data or regular data; and
when the qualified data is parametric data, calculating normalcy bounds for the parametric data.

8. The system of claim 7, wherein determining whether the qualified data is parametric data further comprises
checking the qualified data for categories of multinomial data;
when no categories of multinomial data are found, de-noising the qualified data followed by rechecking the qualified data for categories of multinomial data;
determining whether the qualified data is periodic or non-periodic; and
calculating normalcy bounds for the qualified data based on the periodicity.

9. The system of claim 7, wherein determining whether the qualified data is parametric data further comprises
searching for two or more modes in the qualified data;
checking each mode of qualified data for inertia;
checking each mode identified as having inertia for transiency;
for each inertial mode,
determining whether the mode is periodic or non-periodic; and
calculating normalcy bounds for the inertial mode based on the periodicity of the mode.

10. The system of claim 7, wherein determining whether the qualified data is parametric data further comprises
checking parameters of the qualified data for semi-constant data;
when no semi-constant data is found, searching the qualified data for the longest data portion of the data that is semi-constant;
detecting the number of outliers in the semi-constant data;
determining whether the semi-constant data is periodic or non-periodic; and
calculating normalcy bounds for the semi-constant data based on the periodicity.

11. The system of claim 7, wherein determining whether the qualified data is parametric data further comprises
searching the qualified data for a trend;
identifying the trend of the qualified data as linear, log-linear, or non-trendy; and
calculating normalcy bounds based on the identified trend for the qualified data.

12. The system of claim 1, wherein calculating the normalcy bounds further comprises
removing abnormal outliers from the data;
smoothing the data;
generating a footprint matrix of the smooth data;
determining whether the data in the footprint matrix is periodic or non-periodic; and
calculating upper and lower normalcy bounds based on the footprint matrix.

13. A method carried out within a computer system having one or more processors and an electronic memory that analyzes digitally encoded data stored in one or more computer-readable media, the method comprising:
identifying data output from a system monitoring tool as qualified data or corrupted data;
identifying and sorting the qualified data into categorized data;
calculating normalcy bounds for the categorized data;
discarding the corrupted data from the computer-readable media; and
inputting the categorized data and normalcy bounds to an alerting engine that generates an alert when the categorized data is outside the normalcy bounds.

14. The method of claim 13, wherein identifying qualified data further comprises
determining whether the input data is qualified data or corrupted data; and
determining whether the qualified data is dense data or sparse data.

15. The method of claim 14, wherein determining whether the qualified data is dense data or sparse data further comprises
calculating a percentage of gaps in the qualified data, based on a user defined gap parameter;
calculating data-to-data, data-to-gap, gap-to-gap, and gap-to-data transition probabilities; and
based on the transitions probabilities and the percentage of gaps, classifying the qualified data as dense data, sparse data, or corrupted data.

16. The method of claim 13, wherein identifying the qualified data further comprises
determining whether the qualified data is stable data or corrupted data; and
categorizing stable qualified data as high-variability data or low-variability data.

17. The method of claim 16, wherein determining whether the qualified data is stable data or corrupted data further comprises
generating a stabilochart for the qualified data; and
for each stabilochart value,
when the stabilochart value is less than a user defined value, the qualified data is stable data, otherwise the qualified data is corrupted data.

18. The method of claim 16, wherein categorizing stable data as high-variability data or low-variability data further comprises
calculating jumps for the stable qualified data;
calculating a measure of variability based on the jumps and the stable data; and
identifying the stable data as low-variability data when the measure of variability is less than a user defined threshold, otherwise the stable data is high-variability data.

19. The method of claim 13, wherein identifying and sorting the qualified data into categorized data further comprises
determining whether the qualified data as parametric data or regular data; and
when the qualified data is parametric data, calculating normalcy bounds for the parametric data.

20. The method of claim 19, wherein determining whether the qualified data is parametric data further comprises
checking the qualified data for categories of multinomial data;
when no categories of multinomial data are found, de-noising the qualified data followed by rechecking the qualified data for categories of multinomial data;
determining whether the qualified data is periodic or non-periodic; and
calculating normalcy bounds for the qualified data based on the periodicity.

21. The method of claim 19, wherein determining whether the qualified data is parametric data further comprises
 searching for two or more modes in the qualified data;
 checking each mode of qualified data for inertia;
 checking each mode identified as having inertia for transiency;
 for each inertial mode,
  determining whether the mode is periodic or non-periodic; and
  calculating normalcy bounds for the inertial mode based on the periodicity of the mode.

22. The method of claim 19, wherein determining whether the qualified data is parametric data further comprises
 checking parameters of the qualified data for semi-constant data;
 when no semi-constant data is found, searching the qualified data for the longest data portion of the data that is semi-constant;
 detecting the number of outliers in the semi-constant data;
 determining whether the semi-constant data is periodic or non-periodic; and
 calculating normalcy bounds for the semi-constant data based on the periodicity.

23. The method of claim 19, wherein determining whether the qualified data is parametric data further comprises
 searching the qualified data for a trend;
 identifying the trend of the qualified data as linear, log-linear, or non-trendy; and
 calculating normalcy bounds based on the identified trend for the qualified data.

24. The method of claim 13, wherein calculating the normalcy bounds further comprises
 removing abnormal outliers from the data;
 smoothing the data;
 generating a footprint matrix of the smooth data;
 determining whether the data in the footprint matrix is periodic or non-periodic; and
 calculating upper and lower normalcy bounds based on the footprint matrix.

25. A non-transitory computer-readable medium encoded with machine-readable instructions that implement a method carried out by one or more processors of a computer system to perform the operations of
 identifying data output from a system monitoring tool as qualified data or corrupted data;
 identifying and sorting the qualified data into categorized data;
 calculating normalcy bounds for the categorized data;
 discarding the corrupted data from the computer-readable media; and
 inputting the categorized data and normalcy bounds to an alerting engine that generates an alert when the categorized data is outside the normalcy bounds.

26. The medium of claim 25, wherein identifying qualified data further comprises
 determining whether the input data is qualified data or corrupted data; and
 determining whether the qualified data is dense data or sparse data.

27. The medium of claim 26, wherein determining whether the qualified data is dense data or sparse data further comprises
 calculating a percentage of gaps in the qualified data, based on a user defined gap parameter;
 calculating data-to-data, data-to-gap, gap-to-gap, and gap-to-data transition probabilities; and
 based on the transitions probabilities and the percentage of gaps, classifying the qualified data as dense data, sparse data, or corrupted data.

28. The medium of claim 25, wherein identifying the qualified data further comprises
 determining whether the qualified data is stable data or corrupted data; and
 categorizing stable qualified data as high-variability data or low-variability data.

29. The medium of claim 28, wherein determining whether the qualified data is stable data or corrupted data further comprises
 generating a stabilochart for the qualified data; and
 for each stabilochart value,
  when the stabilochart value is less than a user defined value, the qualified data is stable data, otherwise the qualified data is corrupted data.

30. The medium of claim 28, wherein categorizing stable data as high-variability data or low-variability data further comprises
 calculating jumps for the stable qualified data;
 calculating a measure of variability based on the jumps and the stable data; and
 identifying the stable data as low-variability data when the measure of variability is less than a user defined threshold, otherwise the stable data is high-variability data.

31. The medium of claim 25, wherein identifying and sorting the qualified data into categorized data further comprises
 determining whether the qualified data as parametric data or regular data; and
 when the qualified data is parametric data, calculating normalcy bounds for the parametric data.

32. The medium of claim 31, wherein determining whether the qualified data is parametric data further comprises
 checking the qualified data for categories of multinomial data;
 when no categories of multinomial data are found, denoising the qualified data followed by rechecking the qualified data for categories of multinomial data;
 determining whether the qualified data is periodic or non-periodic; and
 calculating normalcy bounds for the qualified data based on the periodicity.

33. The medium of claim 31, wherein determining whether the qualified data is parametric data further comprises
 searching for two or more modes in the qualified data;
 checking each mode of qualified data for inertia;
 checking each mode identified as having inertia for transiency;
 for each inertial mode,
  determining whether the mode is periodic or non-periodic; and
  calculating normalcy bounds for the inertial mode based on the periodicity of the mode.

34. The medium of claim 31, wherein determining whether the qualified data is parametric data further comprises
 checking parameters of the qualified data for semi-constant data;
 when no semi-constant data is found, searching the qualified data for the longest data portion of the data that is semi-constant;
 detecting the number of outliers in the semi-constant data;

determining whether the semi-constant data is periodic or non-periodic; and calculating normalcy bounds for the semi-constant data based on the periodicity.

35. The medium of claim 31, wherein determining whether the qualified data is parametric data further comprises searching the qualified data for a trend;

identifying the trend of the qualified data as linear, log-linear, or non-trendy; and calculating normalcy bounds based on the identified trend for the qualified data.

36. The medium of claim 25, wherein calculating the normalcy bounds further comprises removing abnormal outliers from the data;

smoothing the data;

generating a footprint matrix of the smooth data;

determining whether the data in the footprint matrix is periodic or non-periodic; and calculating upper and lower normalcy bounds based on the footprint matrix.

\* \* \* \* \*